United States Patent
Woodgate et al.

(10) Patent No.: US 9,436,015 B2
(45) Date of Patent: Sep. 6, 2016

(54) SUPERLENS COMPONENT FOR DIRECTIONAL DISPLAY

(71) Applicant: RealD Inc., Beverly Hills, CA (US)

(72) Inventors: Graham J. Woodgate, Henley-on-Thames (GB); Jonathan Harrold, Leamington Spa (GB); Michael G. Robinson, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 235 days.

(21) Appl. No.: 14/137,569

(22) Filed: Dec. 20, 2013

(65) Prior Publication Data

US 2014/0177032 A1   Jun. 26, 2014

Related U.S. Application Data

(60) Provisional application No. 61/745,334, filed on Dec. 21, 2012.

(51) Int. Cl.
*G02B 26/08* (2006.01)
*G02F 1/29* (2006.01)
(Continued)

(52) U.S. Cl.
CPC .......... *G02B 27/2214* (2013.01); *G02B 6/002* (2013.01); *G02B 6/0048* (2013.01);
(Continued)

(58) Field of Classification Search
CPC ......... G02F 1/29; G02F 1/292; B82Y 20/00; G02B 26/0816; G02B 27/48
USPC ................. 359/237–240, 262–274, 290–298
See application file for complete search history.

(56) References Cited

U.S. PATENT DOCUMENTS

| 2,133,121 A | 10/1938 | Stearns |
| 2,351,034 A | 6/1944 | Gabor |

(Continued)

FOREIGN PATENT DOCUMENTS

| CN | 1142869 A | 2/1997 |
| CN | 1377453 A | 10/2002 |

(Continued)

OTHER PUBLICATIONS

International search report and written opinion of international searching authority in co-pending PCT/US2013/077288, mailed Apr. 18, 2014.

(Continued)

*Primary Examiner* — Bumsuk Won
*Assistant Examiner* — Tamara Y Washington
(74) *Attorney, Agent, or Firm* — Neil G. J. Mothew; Penny L. Lowry

(57) ABSTRACT

Disclosed is an imaging directional backlight apparatus comprising a waveguide, a light source array, and a further optical element for providing large area directed illumination from localized light sources. The imaging directional backlight may comprise a stepped waveguide that may include a stepped structure, in which the steps may further include extraction features optically hidden to guided light, propagating in a first forward direction. Returning light propagating in a second backward direction may be refracted, diffracted, or reflected by the features to provide discrete illumination beams exiting from the top surface of the waveguide. Viewing windows are formed through imaging individual light sources. The further optical element may comprise a superlens comprising first and second aligned lens arrays that may be arranged to modify the output viewing windows to achieve enhanced window imaging from the directional backlight.

28 Claims, 39 Drawing Sheets

(51) Int. Cl.
    *G02B 27/22* (2006.01)
    *H04N 13/04* (2006.01)
    *F21V 8/00* (2006.01)
(52) U.S. Cl.
    CPC ...... *H04N13/0404* (2013.01); *H04N 13/0418* (2013.01); *H04N 13/0452* (2013.01); *H04N 13/0468* (2013.01); *H04N 13/0497* (2013.01); *G02B 6/0038* (2013.01); *G02B 6/0053* (2013.01); *G02B 6/0068* (2013.01); *H04N 2013/0463* (2013.01)

(56) References Cited

U.S. PATENT DOCUMENTS

| | | |
|---|---|---|
| 2,810,905 A | 10/1957 | Barlow |
| 5,347,644 A | 9/1994 | Sedlmayr |
| 5,703,667 A | 12/1997 | Ochiai |
| 5,727,107 A | 3/1998 | Umemoto et al. |
| 5,771,066 A | 6/1998 | Barnea |
| 5,896,225 A | 4/1999 | Chikazawa |
| 5,903,388 A | 5/1999 | Sedlmayr |
| 5,959,664 A | 9/1999 | Woodgate |
| 5,971,559 A | 10/1999 | Ishikawa et al. |
| 6,014,164 A | 1/2000 | Woodgate et al. |
| 6,075,557 A | 6/2000 | Holliman et al. |
| 6,108,059 A | 8/2000 | Yang |
| 6,144,118 A | 11/2000 | Cahill et al. |
| 6,199,995 B1 | 3/2001 | Umemoto |
| 6,305,813 B1 | 10/2001 | Lekson et al. |
| 6,464,365 B1 | 10/2002 | Gunn et al. |
| 6,663,254 B2 | 12/2003 | Ohsumi |
| 6,847,488 B2 | 1/2005 | Travis |
| 6,870,671 B2 | 3/2005 | Travis |
| 6,883,919 B2 | 4/2005 | Travis |
| 7,052,168 B2 | 5/2006 | Epstein et al. |
| 7,058,252 B2 | 6/2006 | Woodgate |
| 7,059,252 B2 | 6/2006 | Guardo, Jr. |
| 7,073,933 B2 | 7/2006 | Gotoh et al. |
| 7,101,048 B2 | 9/2006 | Travis |
| 7,136,031 B2 | 11/2006 | Lee et al. |
| 7,215,415 B2 | 5/2007 | Maehara |
| 7,410,286 B2 | 8/2008 | Travis |
| 7,430,358 B2 | 9/2008 | Qi et al. |
| 7,528,893 B2 | 5/2009 | Schultz et al. |
| 7,545,429 B2 | 6/2009 | Travis |
| 7,660,047 B1 | 2/2010 | Travis et al. |
| 7,750,981 B2 | 7/2010 | Shestak |
| 7,750,982 B2 | 7/2010 | Nelson |
| 7,944,428 B2 | 5/2011 | Travis |
| 7,970,246 B2 | 6/2011 | Travis et al. |
| 7,976,208 B2 | 7/2011 | Travis |
| 8,016,475 B2 | 9/2011 | Travis |
| 8,216,405 B2 | 7/2012 | Emerton |
| 8,223,296 B2 | 7/2012 | Lee et al. |
| 8,325,295 B2 | 12/2012 | Sugita |
| 8,354,806 B2 | 1/2013 | Travis |
| 8,477,261 B2 | 7/2013 | Travis |
| 8,534,901 B2 | 9/2013 | Panagotacos |
| 8,556,491 B2 | 10/2013 | Lee |
| 8,651,725 B2 | 2/2014 | Le et al. |
| 8,714,804 B2 | 5/2014 | Kim et al. |
| 2002/0113866 A1 | 8/2002 | Taniguchi et al. |
| 2003/0137738 A1 | 7/2003 | Ozawa et al. |
| 2003/0137821 A1 | 7/2003 | Gotoh et al. |
| 2004/0108147 A1 | 6/2004 | Waldern et al. |
| 2004/0170011 A1 | 9/2004 | Kim et al. |
| 2004/0263968 A1 | 12/2004 | Kobayashi et al. |
| 2005/0135116 A1 | 6/2005 | Epstein et al. |
| 2005/0180167 A1 | 8/2005 | Hoelen et al. |
| 2005/0264717 A1 | 12/2005 | Chen et al. |
| 2005/0276071 A1 | 12/2005 | Sasagawa et al. |
| 2006/0132423 A1 | 6/2006 | Travis |
| 2006/0139447 A1 | 6/2006 | Unkirch |
| 2006/0158729 A1 | 7/2006 | Vissenberg et al. |
| 2006/0215129 A1 | 9/2006 | Alasaarela et al. |
| 2006/0269213 A1 | 11/2006 | Hwang et al. |
| 2006/0291053 A1 | 12/2006 | Robinson et al. |
| 2006/0291243 A1 | 12/2006 | Niioka et al. |
| 2007/0025680 A1 | 2/2007 | Winston et al. |
| 2007/0115551 A1 | 5/2007 | Robinson et al. |
| 2007/0115552 A1 | 5/2007 | Robinson et al. |
| 2007/0188667 A1 | 8/2007 | Schwerdtner |
| 2007/0223252 A1 | 9/2007 | Lee et al. |
| 2008/0084519 A1 | 4/2008 | Brigham et al. |
| 2008/0086289 A1 | 4/2008 | Brott |
| 2008/0128728 A1 | 6/2008 | Nemchuk et al. |
| 2008/0225205 A1 | 9/2008 | Travis |
| 2008/0259012 A1 | 10/2008 | Fergason |
| 2008/0291359 A1 | 11/2008 | Miyashita |
| 2008/0297459 A1 | 12/2008 | Sugimoto et al. |
| 2008/0304282 A1 | 12/2008 | Mi et al. |
| 2008/0316768 A1 | 12/2008 | Travis |
| 2009/0016057 A1 | 1/2009 | Rinko |
| 2009/0067156 A1 | 3/2009 | Bonnett et al. |
| 2009/0140656 A1 | 6/2009 | Kohashikawa et al. |
| 2009/0160757 A1 | 6/2009 | Robinson et al. |
| 2009/0190072 A1 | 7/2009 | Nagata et al. |
| 2009/0190079 A1 | 7/2009 | Saitoh |
| 2009/0225380 A1 | 9/2009 | Schwerdtner et al. |
| 2009/0278936 A1 | 11/2009 | Pastoor et al. |
| 2010/0053771 A1 | 3/2010 | Travis |
| 2010/0091254 A1 | 4/2010 | Travis |
| 2010/0165598 A1 | 7/2010 | Chen et al. |
| 2010/0177387 A1 | 7/2010 | Travis |
| 2010/0188438 A1 | 7/2010 | Kang |
| 2010/0188602 A1 | 7/2010 | Feng |
| 2010/0214135 A1 | 8/2010 | Bathiche |
| 2010/0220260 A1 | 9/2010 | Sugita et al. |
| 2010/0231498 A1 | 9/2010 | Large |
| 2010/0277575 A1 | 11/2010 | Ismael et al. |
| 2010/0278480 A1 | 11/2010 | Vasylyev |
| 2010/0295930 A1 | 11/2010 | Ezhov |
| 2010/0300608 A1 | 12/2010 | Emerton et al. |
| 2011/0032483 A1 | 2/2011 | Hiruska et al. |
| 2011/0044056 A1 | 2/2011 | Travis |
| 2011/0044579 A1 | 2/2011 | Travis et al. |
| 2011/0051237 A1 | 3/2011 | Hasegawa et al. |
| 2011/0187293 A1 | 8/2011 | Travis |
| 2011/0188120 A1 | 8/2011 | Tabirian et al. |
| 2011/0216266 A1 | 9/2011 | Travis |
| 2011/0221998 A1 | 9/2011 | Adachi et al. |
| 2011/0242298 A1 | 10/2011 | Bathiche |
| 2011/0255303 A1 | 10/2011 | Nichol et al. |
| 2011/0285927 A1 | 11/2011 | Schultz et al. |
| 2011/0310232 A1 | 12/2011 | Wilson et al. |
| 2012/0002136 A1 | 1/2012 | Nagata et al. |
| 2012/0013720 A1 | 1/2012 | Kadowaki et al. |
| 2012/0127573 A1 | 5/2012 | Robinson et al. |
| 2012/0243204 A1 | 9/2012 | Robinson et al. |
| 2013/0101253 A1 | 4/2013 | Popovich et al. |
| 2013/0135588 A1 | 5/2013 | Popovich et al. |

FOREIGN PATENT DOCUMENTS

| | | |
|---|---|---|
| CN | 1454329 | 11/2003 |
| CN | 1466005 | 1/2004 |
| CN | 1696788 A | 11/2005 |
| CN | 1823292 A | 8/2006 |
| CN | 1826553 A | 8/2006 |
| EP | 0939273 A1 | 1/1999 |
| EP | 3656555 B1 | 3/2003 |
| EP | 0860729 A1 | 7/2006 |
| EP | 3968742 A1 | 8/2007 |
| EP | 2003394 A1 | 12/2008 |
| JP | 08-237691 A | 9/1996 |
| JP | 08254617 B2 | 10/1996 |
| JP | 08340556 B2 | 12/1996 |
| JP | 2000-200049 A | 7/2000 |
| JP | 2001-093321 A | 4/2001 |
| JP | 2002-049004 A | 2/2002 |
| JP | 2003-215705 A | 7/2003 |
| JP | 2004-319364 A | 11/2004 |
| JP | 2005-135844 A | 5/2005 |
| JP | 2005-183030 A | 7/2005 |

(56) References Cited

FOREIGN PATENT DOCUMENTS

| | | |
|---|---|---|
| JP | 2005-259361 A | 9/2005 |
| JP | 2006-004877 A | 1/2006 |
| JP | 2006-031941 A | 2/2006 |
| JP | 2008-204874 A | 9/2008 |
| JP | 2010160527 A | 7/2010 |
| KR | 10-2003-0064258 A | 7/2003 |
| KR | 10-0932304 B1 | 12/2009 |
| KR | 102011-0006773 A | 1/2011 |
| KR | 102011-0017918 A | 2/2011 |
| KR | 102011-0067534 A | 6/2011 |
| KR | 10-2012-0049890 A | 5/2012 |
| KR | 102012-0048301 A | 5/2012 |
| TW | 200528780 A | 9/2005 |
| WO | 9527915 A1 | 10/1995 |
| WO | 01-61241 A1 | 8/2001 |

OTHER PUBLICATIONS

Käläntär et al., "Backlight Unit With Double Surface Light Emission", J. Soc. Inf. Display, vol. 12, Issue 4, pp. 379-387 (Dec. 2004).

International search report and written opinion of international searching authority for PCT application PCT/US2013/063133 mailed Jan. 20, 2014.

International search report and written opinion of international searching authority for PCT application PCT/US2013/063125 mailed Jan. 20, 2014.

International search report and written opinion of international searching authority for PCT application PCT/US2013/077288 mailed Apr. 18, 2014.

International search report and written opinion of international searching authority for PCT application PCT/US2014/017779 mailed May 28, 2014.

International search report and written opinion of international searching authority for PCT application PCT/US2012/37677 mailed Jun. 29, 2012.

International search report and written opinion of international searching authority for PCT application PCT/US2012/052819 mailed Jan. 29, 2013.

International search report and written opinion of international searching authority for PCT application No. PCT/US2013/041697 mailed Aug. 23, 2013.

International search report and written opinion of international searching authority for PCT application No. PCT/US2013/041235 mailed Aug. 23, 2013.

International search report and written opinion of international searching authority for PCT application No. PCT/US2013/041228 mailed Aug. 23, 2013.

International search report and written opinion of international searching authority for PCT application No. PCT/US2013/041683 mailed Aug. 27, 2013.

International search report and written opinion of international searching authority for PCT application No. PCT/US2013/041548 mailed Aug. 27, 2013.

International search report and written opinion of international searching authority for PCT application No. PCT/US2013/041703 mailed Aug. 27, 2013.

International search report and written opinion of international searching authority for PCT application No. PCT/US2013/041655 mailed Aug. 27, 2013.

International search report and written opinion of international searching authority for PCT application No. PCT/US2013/041619 mailed Aug. 27, 2013.

International search report and written opinion of international searching authority for PCT application No. PCT/US2013/041192 mailed Aug. 28, 2013.

Tabiryan et al., "The Promise of Diffractive Waveplates", Optics and Photonics News, 21:3, pp. 40-45 (Mar. 2010).

201380026050.0 Chinese first office action of the State Intellectual Property Office of P.R. dated Jun. 3, 2016.

201380026076.5 Chinese first office action dated 11 May 2016.

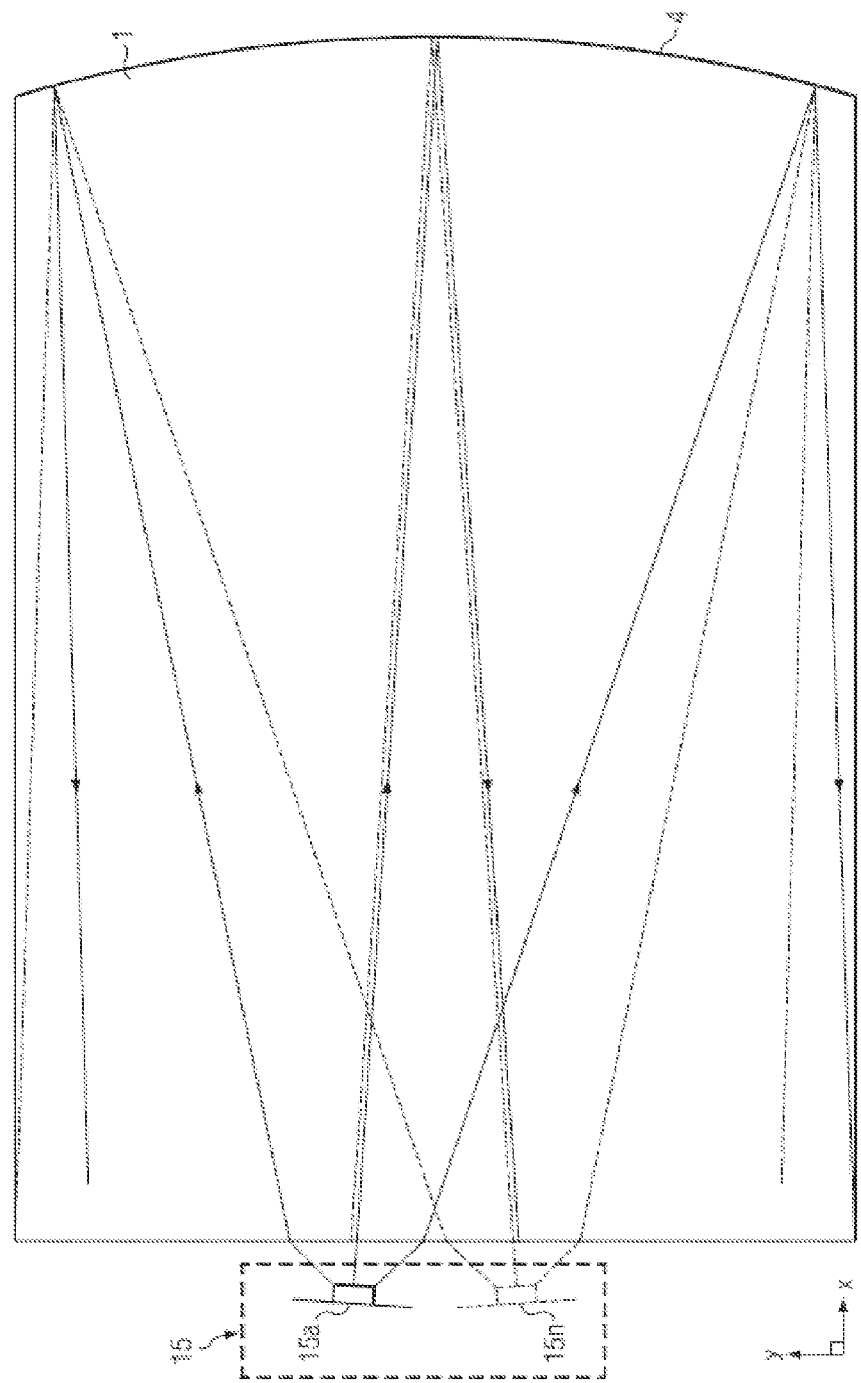

SUPERLENS COMPONENT FOR DIRECTIONAL DISPLAY

CROSS-REFERENCE TO RELATED APPLICATIONS

This application claims priority to commonly-assigned, U.S. Provisional Patent Application No. 61/745,344, filed Dec. 21, 2012, entitled "Superlens component for time multiplexed autosteroscopic display", and to commonly-assigned, U.S. Provisional Patent Application No. 61/745,160, filed Dec. 21, 2012, entitled "Temporally multiplexed display with landscape and portrait operation modes", which describe (among other things) a directional backlight apparatus comprising superlens optical elements in cooperation with stepped imaging waveguides, and the entireties of which are herein incorporated by reference.

TECHNICAL FIELD

This disclosure generally relates to illumination of light modulation devices, and more specifically relates to modification of light from light guides for providing large area illumination from localized light sources for use in 2D, 3D, and/or autostereoscopic display devices.

BACKGROUND

Spatially multiplexed autostereoscopic displays typically align a parallax component such as a lenticular screen or parallax barrier with an array of images arranged as at least first and second sets of pixels on a spatial light modulator, for example an LCD. The parallax component directs light from each of the sets of pixels into different respective directions to provide first and second viewing windows in front of the display. An observer with an eye placed in the first viewing window can see a first image with light from the first set of pixels; and with an eye placed in the second viewing window can see a second image, with light from the second set of pixels.

Such displays have reduced spatial resolution compared to the native resolution of the spatial light modulator and further, the structure of the viewing windows is determined by the pixel aperture shape and parallax component imaging function. Gaps between the pixels, for example for electrodes, typically produce non-uniform viewing windows. Undesirably such displays exhibit image flicker as an observer moves laterally with respect to the display and so limit the viewing freedom of the display. Such flicker can be reduced by defocusing the optical elements; however such defocusing results in increased levels of image cross talk and increases visual strain for an observer. Such flicker can be reduced by adjusting the shape of the pixel aperture, however such changes can reduce display brightness and can comprise addressing electronics in the spatial light modulator.

BRIEF SUMMARY

According to the present disclosure, a directional illumination apparatus may include an imaging directional backlight for directing light, an illuminator array for providing light to the imaging directional backlight and an additional optical element that alters the optical system of the imaging directional backlight to redirect and control viewing windows for an autostereoscopic display systems. The imaging directional backlight may include a waveguide for guiding light and a superlens optical component. The waveguide may include a first light guiding surface and a second light guiding surface, opposite the first light guiding surface.

Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in patent application Ser. No. 13/300,293, which is herein incorporated by reference, in its entirety.

U.S. Pat. No. 2,351,034 to Gabor describes optical system composed of lenticules and shows first and second aligned arrays of lenticular screens.

The viewing windows of display backlights can be arranged with high quality in front of a directional display that can be used for an autostereoscopic display, a privacy display or high brightness display. It would be desirable to further control the viewing windows from the backlight to provide further modification of the structure of the viewing windows, for example to increase the number of viewing windows, to rotate viewing windows, to change the pitch of light sources in a light source array, to achieve switchable landscape and portrait modes of operation and/or to remove or partially remove void regions for off-axis viewing.

According to the present disclosure, there is provided a display device, comprising: a transmissive spatial light modulator comprising an array of pixels arranged to modulate light passing therethrough; a waveguide having an input end and first and second, opposed guide surfaces for guiding light along the waveguide, extending from the input end across the spatial light modulator, wherein the waveguide is arranged to output light through the first guide surface for supply through the spatial light modulator, the waveguide being arranged to direct input light from different input positions across the input end in output directions relative to the normal to the first guide surface that are dependent on said input position; and an optical element disposed between the waveguide and the spatial light modulator, comprising first and second arrays of lenses being lenses that each have a positive optical power in respective first meridians and no optical power in respective second meridians perpendicular to the first meridians, the first and second arrays of lenses being arranged with respective focal planes that extend perpendicular to the normal to the spatial light modulator intermediate between the first and second arrays of lenses, the lenses of each array having parallel second meridians.

The optical element is capable of operates to provide various advantageous effects in the hereinafter described embodiments. In particular, the optical element modifies the light passing from the waveguide to the spatial light modulator. This effect may be used to control the form of viewing windows in the various output directions.

Embodiments herein may provide an autostereoscopic display with large area and thin structure. Further, as will be described, the optical valves of the present disclosure may achieve thin optical components with large back working distances. Such components can be used in directional backlights, to provide directional displays including autostereoscopic displays. Further, embodiments may provide a controlled illuminator for the purposes of an efficient autostereoscopic display.

Embodiments of the present disclosure may be used in a variety of optical systems. The embodiment may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination is provided over a small angular directional distribution; alternating left and right eye viewing for time sequential stereoscopic and autostereoscopic display; and low cost.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 1A is a schematic diagram illustrating a front view of light propagation in one embodiment of an optical valve apparatus, in accordance with the present disclosure;

DETAILED DESCRIPTION

Figure 1B:
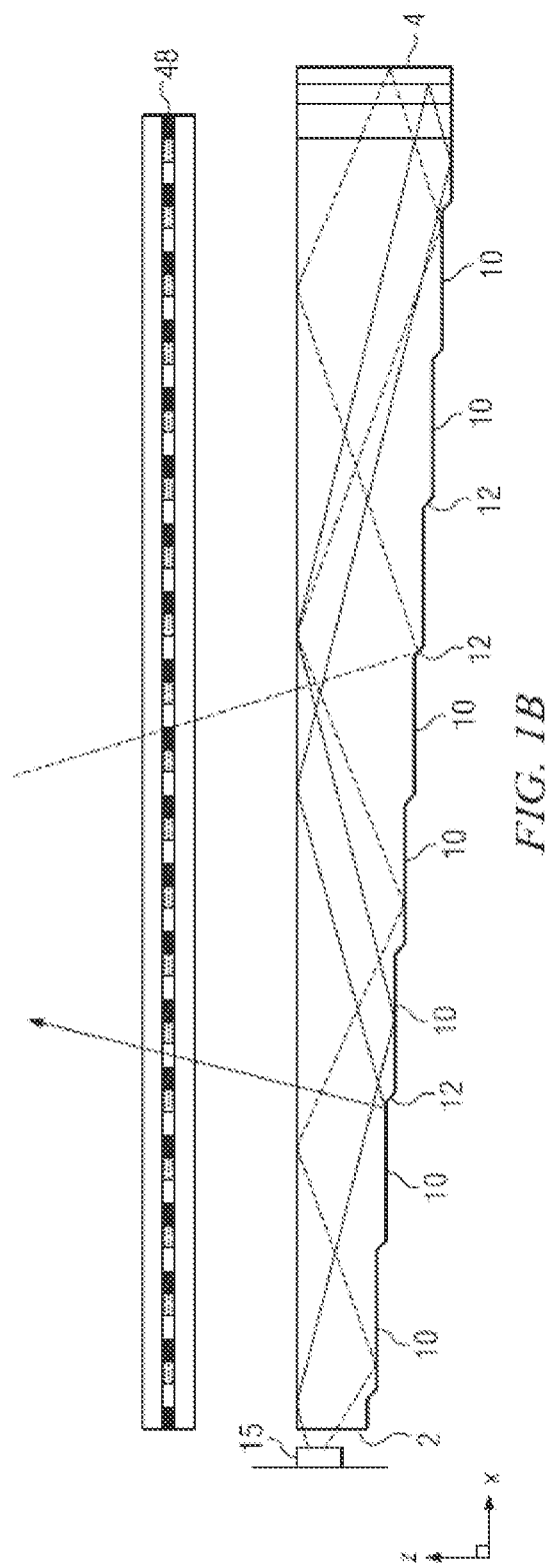
FIG. 1B is a schematic diagram illustrating a side view of light propagation in one embodiment of the optical valve apparatus of FIG. 1A, in accordance with the present disclosure.

Time multiplexed autostereoscopic displays can advantageously improve the spatial resolution of autostereoscopic display by directing light from all of the pixels of a spatial light modulator to a first viewing window in a first time slot, and all of the pixels to a second viewing window in a second time slot. Thus an observer with eyes arranged to receive light in first and second viewing windows will see a full resolution image across the whole of the display over multiple time slots. Time multiplexed displays can advantageously achieve directional illumination by directing an illuminator array through a substantially transparent time multiplexed spatial light modulator using directional optical elements, wherein the directional optical elements substantially form an image of the illuminator array in the window plane.

The uniformity of the viewing windows may be advantageously independent of the arrangement of pixels in the spatial light modulator. Advantageously, such displays can provide observer tracking displays which have low flicker, with low levels of cross talk for a moving observer.

To achieve high uniformity in the window plane, it is desirable to provide an array of illumination elements that have a high spatial uniformity. The illuminator elements of the time sequential illumination system may be provided, for example, by pixels of a spatial light modulator with size approximately 100 micrometers in combination with a lens array. However, such pixels suffer from similar difficulties as for spatially multiplexed displays. Further, such devices may have low efficiency and higher cost, requiring additional display components.

High window plane uniformity can be conveniently achieved with macroscopic illuminators, for example, an array of LEDs in combination with homogenizing and diffusing optical elements that are typically of size 1 mm or greater. However, the increased size of the illuminator elements means that the size of the directional optical elements increases proportionately. For example, a 16 mm wide illuminator imaged to a 65 mm wide viewing window may require a 200 mm back working distance. Thus, the increased thickness of the optical elements can prevent useful application, for example, to mobile displays, or large area displays.

Addressing the aforementioned shortcomings, optical valves as described in commonly-owned U.S. patent application Ser. No. 13/300,293 advantageously can be arranged in combination with fast switching transmissive spatial light modulators to achieve time multiplexed autostereoscopic illumination in a thin package while providing high resolution images with flicker free observer tracking and low levels of cross talk. Described is a one dimensional array of viewing positions, or windows, that can display different images in a first, typically horizontal, direction, but contain the same images when moving in a second, typically vertical, direction.

Conventional non-imaging display backlights commonly employ optical waveguides and have edge illumination from light sources such as LEDs. However, it should be appreciated that there are many fundamental differences in the function, design, structure, and operation between such conventional non-imaging display backlights and the imaging directional backlights discussed in the present disclosure.

Generally, for example, in accordance with the present disclosure, imaging directional backlights are arranged to direct the illumination from multiple light sources through a display panel to respective multiple viewing windows in at least one axis. Each viewing window is substantially formed as an image in at least one axis of a light source by the imaging system of the imaging directional backlight. An imaging system may be formed between multiple light sources and the respective window images. In this manner, the light from each of the multiple light sources is substantially not visible for an observer's eye outside of the respective viewing window.

In contradistinction, conventional non-imaging backlights or light guiding plates (LGPs) are used for illumination of 2D displays. See, e.g., Kälil Käläntär et al., *Backlight Unit With Double Surface Light Emission*, J. Soc. Inf. Display, Vol. 12, Issue 4, pp. 379-387 (December 2004). Non-imaging backlights are typically arranged to direct the illumination from multiple light sources through a display panel into a substantially common viewing zone for each of the multiple light sources to achieve wide viewing angle and high display uniformity. Thus non-imaging backlights do not form viewing windows. In this manner, the light from each of the multiple light sources may be visible for an observer's eye at substantially all positions across the viewing zone. Such conventional non-imaging backlights may have some directionality, for example, to increase screen gain compared to Lambertian illumination, which may be provided by brightness enhancement films such as BEF™ from 3M. However, such directionality may be substantially the same for each of the respective light sources. Thus, for these reasons and others that should be apparent to persons of ordinary skill, conventional non-imaging backlights are different to imaging directional backlights. Edge lit non-imaging backlight illumination structures may be used in liquid crystal display systems such as those seen in 2D Laptops, Monitors and TVs. Light propagates from the edge of a lossy waveguide which may include sparse features; typically local indentations in the surface of the guide which cause light to be lost regardless of the propagation direction of the light.

As used herein, an optical valve is an optical structure that may be a type of light guiding structure or device referred to as, for example, a light valve, an optical valve directional backlight, and a valve directional backlight ("v-DBL"). In the present disclosure, optical valve is different to a spatial light modulator (which is sometimes referred to as a "light valve"). One example of an imaging directional backlight is an optical valve that may employ a folded optical system. Light may propagate substantially without loss in one direction through the optical valve, may be incident on an imaging reflector, and may counter-propagate such that the light may be extracted by reflection off tilted light extraction features, and directed to viewing windows as described in patent application Ser. No. 13/300,293, which is herein incorporated by reference in its entirety.

Additionally, as used herein, a stepped waveguide imaging directional backlight may be at least one of an optical valve. A stepped waveguide is a waveguide for an imaging directional backlight comprising a waveguide for guiding light, further comprising: a first light guiding surface; and a second light guiding surface, opposite the first light guiding surface, further comprising a plurality of light guiding features interspersed with a plurality of extraction features arranged as steps.

In operation, light may propagate within an exemplary optical valve in a first direction from an input side to a reflective side and may be transmitted substantially without loss. Light may be reflected at the reflective side and propagates in a second direction substantially opposite the first direction. As the light propagates in the second direction, the light may be incident on light extraction features, which are operable to redirect the light outside the optical valve. Stated differently, the optical valve generally allows light to propagate in the first direction and may allow light to be extracted while propagating in the second direction.

The optical valve may achieve time sequential directional illumination of large display areas. Additionally, optical elements may be employed that are thinner than the back working distance of the optical elements to direct light from macroscopic illuminators to a window plane. Such displays may use an array of light extraction features arranged to extract light counter propagating in a substantially parallel waveguide.

Thin imaging directional backlight implementations for use with LCDs have been proposed and demonstrated by 3M, for example U.S. Pat. No. 7,528,893; by Microsoft, for example U.S. Pat. No. 7,970,246 which may be referred to herein as a "wedge type directional backlight;" by RealD, for example U.S. patent application Ser. No. 13/300,293 which may be referred to herein as an "optical valve" or "optical valve directional backlight," all of which are herein incorporated by reference in their entirety.

The present disclosure provides stepped waveguide imaging directional backlights in which light may reflect back and forth between the internal faces of, for example, a stepped waveguide which may include a first side and a first set of features. As the light travels along the length of the stepped waveguide, the light may not substantially change angle of incidence with respect to the first side and first set of surfaces and so may not reach the critical angle of the medium at these internal faces. Light extraction may be advantageously achieved by a second set of surfaces (the step "risers") that are inclined to the first set of surfaces (the step "treads"). Note that the second set of surfaces may not be part of the light guiding operation of the stepped waveguide, but may be arranged to provide light extraction from the structure. By contrast, a wedge type imaging directional backlight may allow light to guide within a wedge profiled waveguide having continuous internal surfaces. The optical valve is thus not a wedge type imaging directional backlight.

FIG. 1A is a schematic diagram illustrating a front view of light propagation in one embodiment of an optical valve structure that forms a directional backlight apparatus, and FIG. 1B is a schematic diagram illustrating a side view of light propagation in the optical valve structure of FIG. 1A.

FIG. 1A illustrates a front view in the xy plane of an optical valve, and includes an illuminator array 15 which may be used to illuminate a stepped waveguide 1. Illuminator array 15 includes illuminator elements 15a through illuminator element 15n (where n is an integer greater than one). In one example, the stepped waveguide 1 of FIG. 1A may be a stepped, display sized waveguide 1. Illumination elements 15a through 15n are light sources that may be light emitting diodes (LEDs). Although LEDs are discussed herein as illuminator elements 15a-15n, other light sources may be used such as, but not limited to, diode sources, semiconductor sources, laser sources, local field emission sources, organic emitter arrays, and so forth. Additionally, FIG. 1B illustrates a side view in the xz plane, and includes illuminator array 15, SLM (spatial light modulator) 48, extraction features 12, guiding features 10, and stepped waveguide 1, arranged as shown. The side view provided in FIG. 1B is an alternative view of the front view shown in FIG. 1A. Accordingly, the illuminator array 15 of FIGS. 1A and 1B corresponds to one another and the stepped waveguide 1 of FIGS. 1A and 1B may correspond to one another.

Further, in FIG. 1B, the stepped waveguide 1 may have an input end 2 that is thin and a reflective end 4 that is thick. Thus the waveguide 1 extends between the input end 2 that receives input light and the reflective end 4 that reflects the input light back through the waveguide 1. The waveguide has first and second, opposed guide surfaces extending between the input end 2 and the reflective end 4 for guiding light forwards and back along the waveguide 1 by total internal reflection. The first guide surface is planar. The second guide surface has a plurality of light extraction features 12 facing the reflective end 4 and inclined to reflect at least some of the light guided back through the waveguide 1 from the reflective end in directions that break the total internal reflection at the first guide surface and allow output through the first guide surface, for example upwards in FIG. 1B, that is supplied to the SLM 48. In this example, the light extraction features 12 are reflective facets, although other reflective features could be used. The light extraction features 12 do not guide light through the waveguide, whereas the regions of the second guide surface intermediate the light extraction features 12 guide light without extracting it. Those regions of the second guide surface are planar and may extend parallel to the first guide surface, or at a relatively low inclination. The light extraction features 12 extend laterally to those regions so that the second guide surface has a stepped shape which may include the light extraction features 12 and intermediate regions.

The light extraction features 12 are arranged to direct input light from different input positions across the input end in different directions relative to the first guide surface that are dependent on the input position. As the illumination elements 15a-15n are arranged at different input positions, the light from respective illumination elements 15a-15n is reflected in those different directions. In this manner, each of the illumination elements 15a-15n directs light into a respective optical window. Under the control of a control system, the illuminator elements 15a-15n may be selectively operated to direct light into a selectable optical window. The optical windows may be used individually or in groups as viewing windows.

The SLM 48 extends across the waveguide is transmissive and modulates the light passing therethrough. Although the SLM 48 may be a liquid crystal display (LCD) but this is merely by way of example, and other spatial light modulators or displays may be used including LCOS, DLP devices, and so forth, as this illuminator may work in reflection. In this example, the SLM 48 is disposed across the first guide surface of the waveguide and modulates the light output through the first guide surface after reflection from the light extraction features 12.

The operation of an optical valve that may provide a one dimensional array of viewing windows is illustrated in front view in FIG. 1A, with its side profile shown in FIG. 1B. In operation, in FIGS. 1A and 1B, light may be emitted from an illuminator array 15, such as an array of illuminator elements 15a through 15n, located at different positions, y, along the surface of thin end side 2, x=0, of the stepped waveguide 1. The light may propagate along +x in a first direction, within the stepped waveguide 1, while at the same time, the light may fan out in the xy plane and upon reaching the far curved end side 4, may substantially or entirely fill the curved end side 4. While propagating, the light may spread out to a set of angles in the xz plane up to, but not exceeding the critical angle of the guide material. The extraction features 12 that link the guiding features 10 of the bottom side of the stepped waveguide 1 may have a tilt angle greater than the critical angle and hence may be missed by substantially all light propagating along +x in the first direction, ensuring the substantially lossless forward propagation.

Continuing the discussion of FIGS. 1A and 1B, the curved end side 4 of the stepped waveguide 1 may be made reflective, typically by being coated with a reflective material such as, for example, silver, although other reflective techniques may be employed. Light may therefore be redirected in a second direction, back down the guide in the direction of −x and may be substantially collimated in the xy or display plane. The angular spread may be substantially preserved in the xz plane about the principal propagation direction, which may allow light to hit the riser edges and reflect out of the guide. In an embodiment with approximately 45 degree tilted extraction features 12, light may be effectively directed approximately normal to the xy display plane with the xz angular spread substantially maintained relative to the propagation direction. This angular spread may be increased when light exits the stepped waveguide 1 through refraction, but may be decreased somewhat dependent on the reflective properties of the extraction features 12.

In some embodiments with uncoated extraction features 12, reflection may be reduced when total internal reflection (TIR) fails, squeezing the xz angular profile and shifting off normal. However, in other embodiments having silver coated or metallized extraction features, the increased angular spread and central normal direction may be preserved. Continuing the description of the embodiment with silver coated extraction features, in the xz plane, light may exit the stepped waveguide 1 approximately collimated and may be directed off normal in proportion to the y-position of the respective illuminator element 15a-15n in illuminator array 15 from the input edge center. Having independent illuminator elements 15a-15n along the input edge 2 then enables light to exit from the entire first light directing side 6 and propagate at different external angles, as illustrated in FIG. 1A.

Figure 2A:
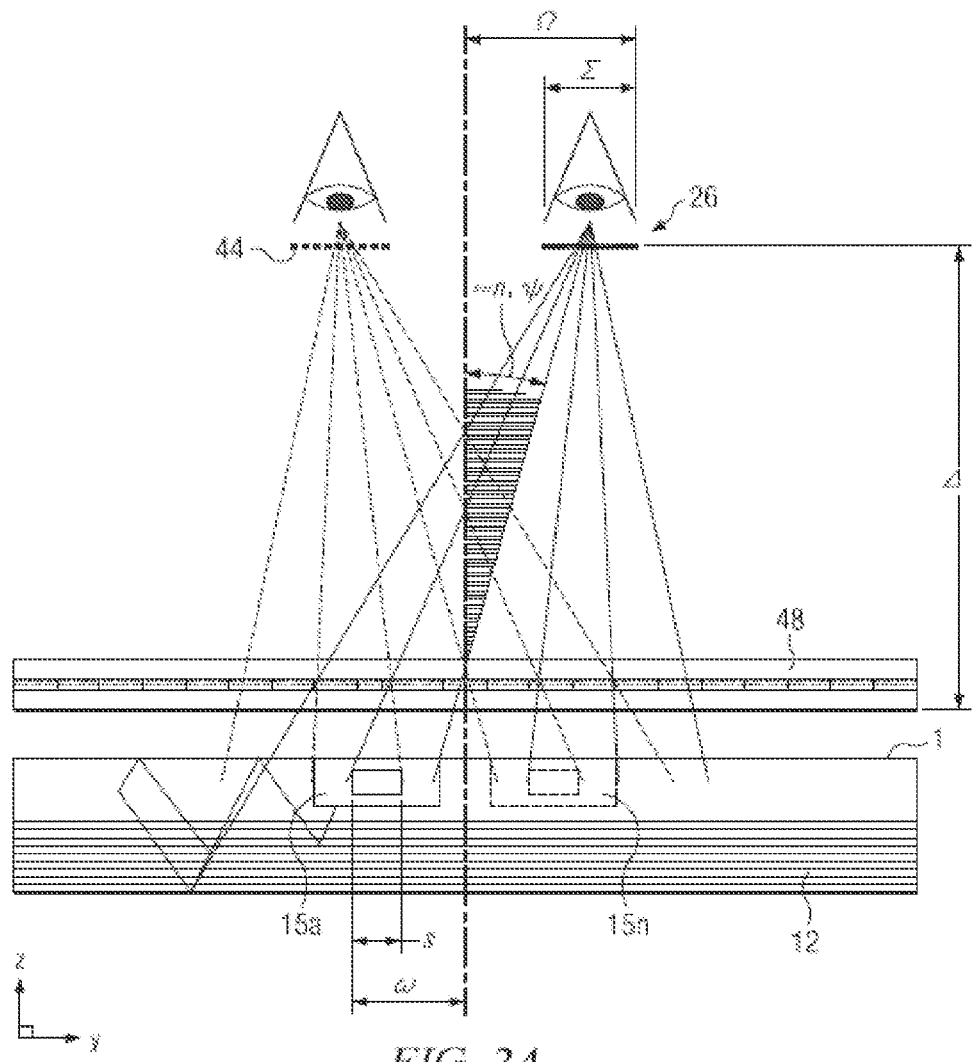
FIG. 2A is a schematic diagram illustrating in a top view of light propagation in another embodiment of an optical valve apparatus, in accordance with the present disclosure.
Figure 2B:
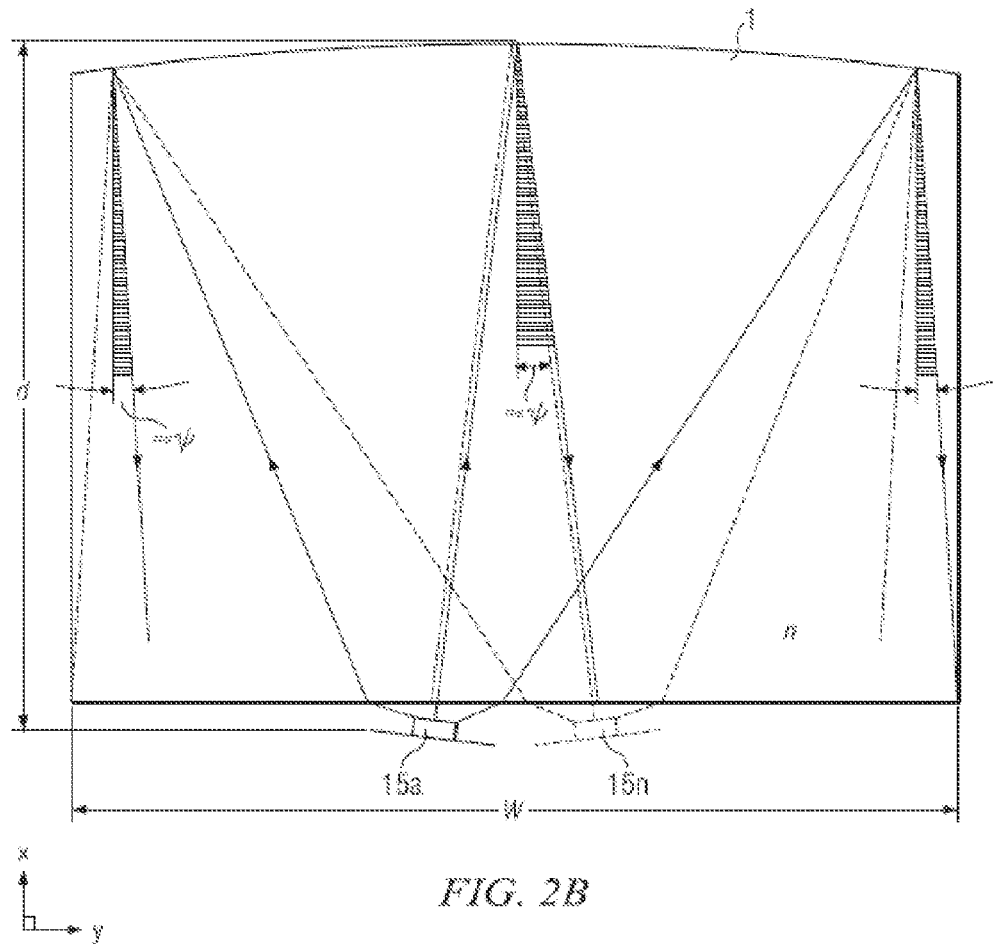
FIG. 2B is a schematic diagram illustrating light propagation in a front view of the optical valve apparatus of FIG. 2A, in accordance with the present disclosure.
Figure 2C:
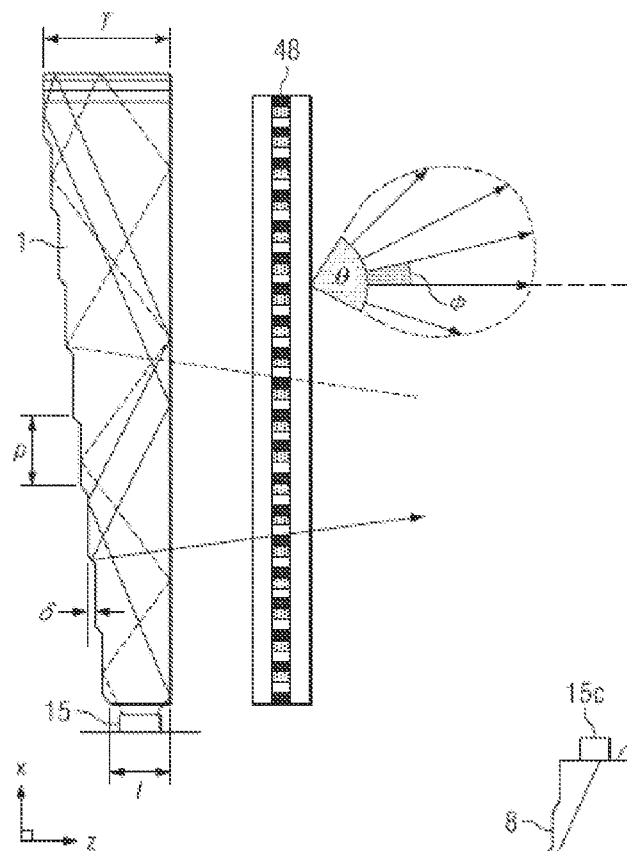
FIG. 2C is a schematic diagram illustrating light propagation in a side view of the optical valve apparatus of FIG. 2A, in accordance with the present disclosure.

Illuminating a spatial light modulator (SLM) 48 such as a fast liquid crystal display (LCD) panel with such a device may achieve autostereoscopic 3D as shown in top view or yz-plane viewed from the illuminator array 15 end in FIG. 2A, front view in FIG. 2B and side view in FIG. 2C. FIG. 2A is a schematic diagram illustrating in a top view, propagation of light in an optical valve system, FIG. 2B is a schematic diagram illustrating in a front view, propagation of light in an optical valve system, and FIG. 2C is a schematic diagram illustrating in side view propagation of light in an optical valve system. As illustrated in FIGS. 2A, 2B, and 2C, a stepped waveguide 1 may be located behind a fast (e.g., greater than 100 Hz) LCD panel SLM 48 that displays sequential right and left eye images. In synchronization, specific illuminator elements 15a through 15n of illuminator array 15 (where n is an integer greater than one) may be selectively turned on and off, providing illuminating light that enters right and left eyes substantially independently by virtue of the system's directionality. In the simplest case, sets of illuminator elements of illuminator array 15 are turned on together, providing a one dimensional viewing window 26 or an optical pupil with limited width in the horizontal direction, but extended in the vertical direction, in which both eyes horizontally separated may view a left eye image, and another viewing window 44 in which a right eye image may primarily be viewed by both eyes, and a central position in which both the eyes may view different images. In this way, 3D may be viewed when the head of a viewer is approximately centrally aligned. Movement to the side away from the central position may result in the scene collapsing onto a 2D image.

In the present embodiments that typically comprise a substantially cylindrical reflecting surface at end 4, the optical axis 238 is a line that passes through the center of curvature of the surface at end 4 and coincides with the axis of reflective symmetry of the side 4 about the x-axis. The optical axis 238 is typically coincident with the mechanical axis of the waveguide 1.

Figure 3:
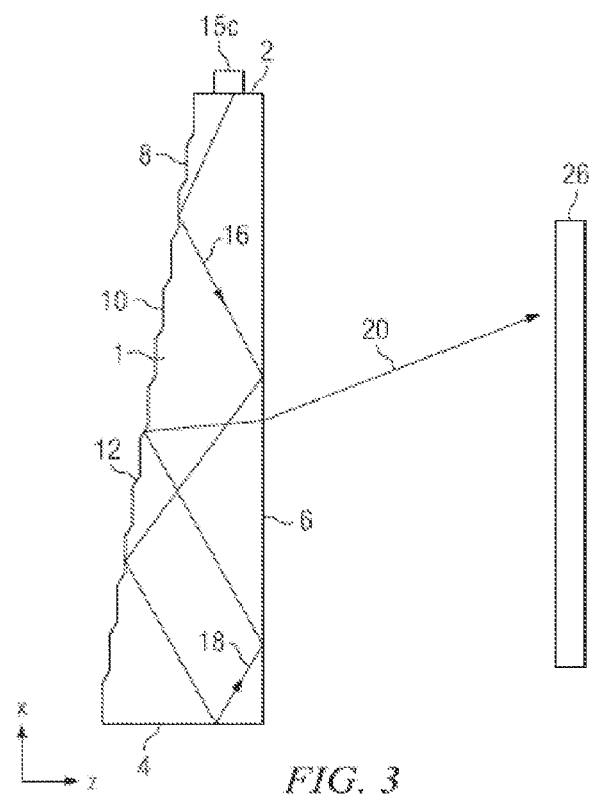
FIG. 3 is a schematic diagram illustrating in a side view of an optical valve apparatus, in accordance with the present disclosure.

FIG. 3 is a schematic diagram illustrating in side view an optical valve. Further, FIG. 3 illustrates additional detail of a side view of the operation of a stepped waveguide 1, which may be a transparent material. The stepped waveguide 1 may include an illuminator input side 2, a reflective side 4, a first light directing side 6 which may be substantially planar, and a second light directing side 8 which includes guiding features 10 and light extraction features 12. In operation, light rays 16 from an illuminator element 15c of an illuminator array 15 (not shown in FIG. 3), that may be an addressable array of LEDs for example, may be guided in the stepped waveguide 1 by means of total internal reflection by the first light directing side 6 and total internal reflection by the guiding feature 10, to the reflective side 4, which may be a mirrored surface. Although reflective side 4 may be a mirrored surface and may reflect light, it may in some embodiments also be possible for light to pass through reflective side 4.

Continuing the discussion of FIG. 3, light ray 18 reflected by the reflective side 4 may be further guided in the stepped waveguide 1 by total internal reflection at the reflective side 4 and may be reflected by extraction features 12. Light rays 18 that are incident on extraction features 12 may be substantially deflected away from guiding modes of the stepped waveguide 1 and may be directed, as shown by ray 20, through the side 6 to an optical pupil that may form a viewing window 26 of an autostereoscopic display. The width of the viewing window 26 may be determined by at least the size of the illuminator, output design distance and optical power in the side 4 and extraction features 12. The height of the viewing window may be primarily determined by the reflection cone angle of the extraction features 12 and the illumination cone angle input at the input side 2.

Figure 4A:
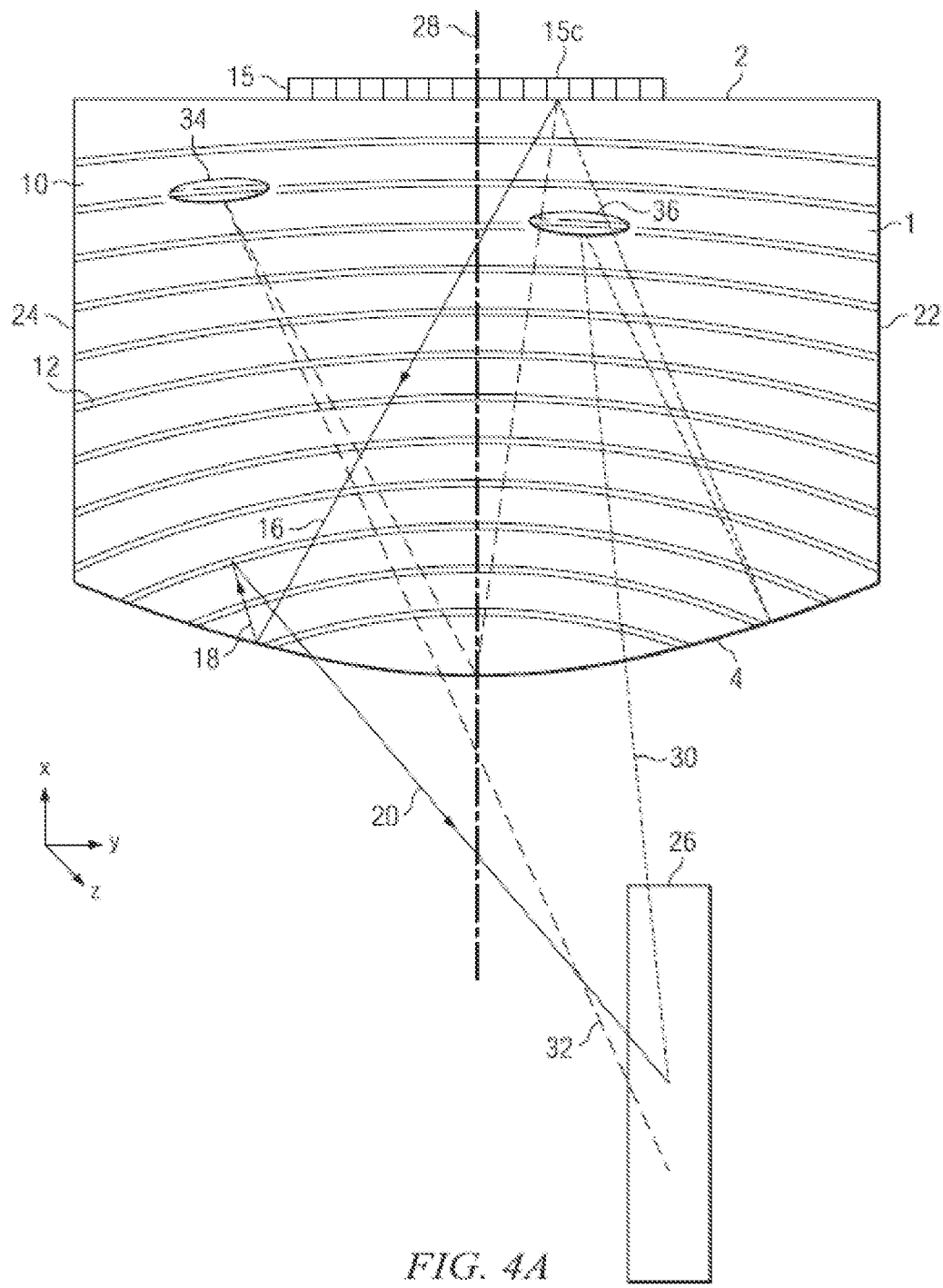
FIG. 4A is schematic diagram illustrating in a front view, generation of a viewing window in an optical valve apparatus and including curved light extraction features, in accordance with the present disclosure.

FIG. 4A is a schematic diagram illustrating in front view an optical valve which may be illuminated by a first illuminator element and including curved light extraction features. Further, FIG. 4A shows in front view further guiding of light rays from illuminator element 15c of illuminator array 15, in the stepped waveguide 1. Each of the output rays are directed towards the same viewing window 26 from the respective illuminator 14. Thus light ray 30 may intersect the ray 20 in the window 26, or may have a different height in the window as shown by ray 32. Additionally, in various embodiments, sides 22, 24 of the optical valve may be transparent, mirrored, or blackened surfaces. Continuing the discussion of FIG. 4A, light extraction features 12 may be elongate, and the orientation of light extraction features 12 in a first region 34 of the light directing side 8 (light directing side 8 shown in FIG. 3, but not shown in FIG. 4A) may be different to the orientation of light extraction features 12 in a second region 36 of the light directing side 8.

Figure 4B:
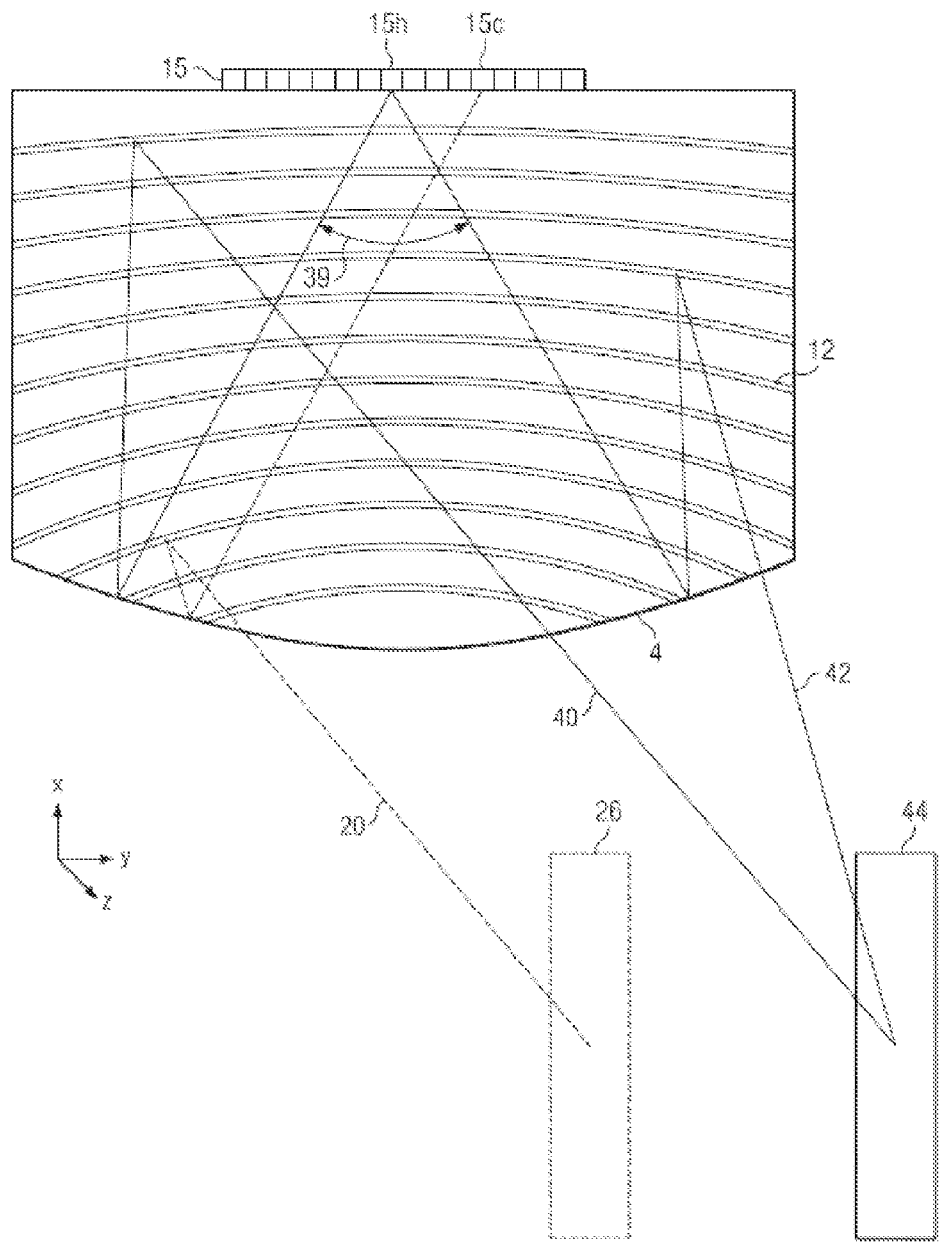
FIG. 4B is a schematic diagram illustrating in a front view, generation of a first and a second viewing window in an optical valve apparatus and including curved light extraction features, in accordance with the present disclosure.

FIG. 4B is a schematic diagram illustrating in front view an optical valve which may illuminated by a second illuminator element. Further, FIG. 4B shows the light rays 40, 42 from a second illuminator element 15h of the illuminator array 15. The curvature of the reflective end on the side 4 and the light extraction features 12 cooperatively produce a second viewing window 44 laterally separated from the viewing window 26 with light rays from the illuminator element 15h.

Advantageously, the arrangement illustrated in FIG. 4B may provide a real image of the illuminator element 15c at a viewing window 26 in which the real image may be formed by cooperation of optical power in reflective side 4 and optical power which may arise from different orientations of elongate light extraction features 12 between regions 34 and 36, as shown in FIG. 4A. The arrangement of FIG. 4B may achieve improved aberrations of the imaging of illuminator element 15c to lateral positions in viewing window 26. Improved aberrations may achieve an extended viewing freedom for an autostereoscopic display while achieving low cross talk levels.

Figure 5:
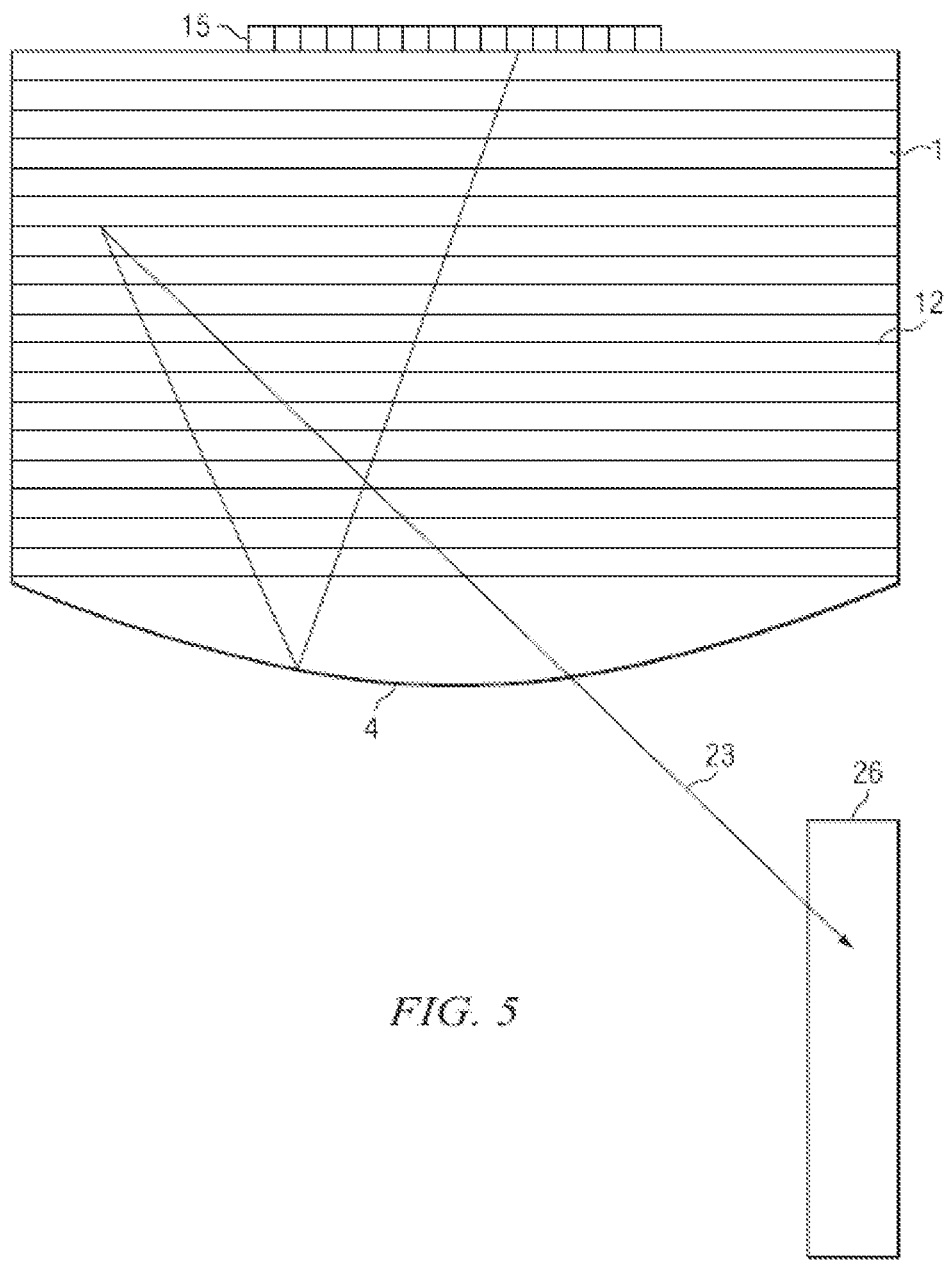
FIG. 5 is a schematic diagram illustrating generation of a first viewing window in an optical valve apparatus including linear light extraction features, in accordance with the present disclosure.

FIG. 5 is a schematic diagram illustrating in front view an embodiment of an optical valve having substantially linear light extraction features. Further, FIG. 5 shows a similar arrangement of components to FIG. 1 (with corresponding elements being similar), with one of the differences being that the light extraction features 12 are substantially linear and parallel to each other. Advantageously, such an arrangement may provide substantially uniform illumination across a display surface and may be more convenient to manufacture than the curved extraction features of FIG. 4A and FIG. 4B.

Figure 6A:
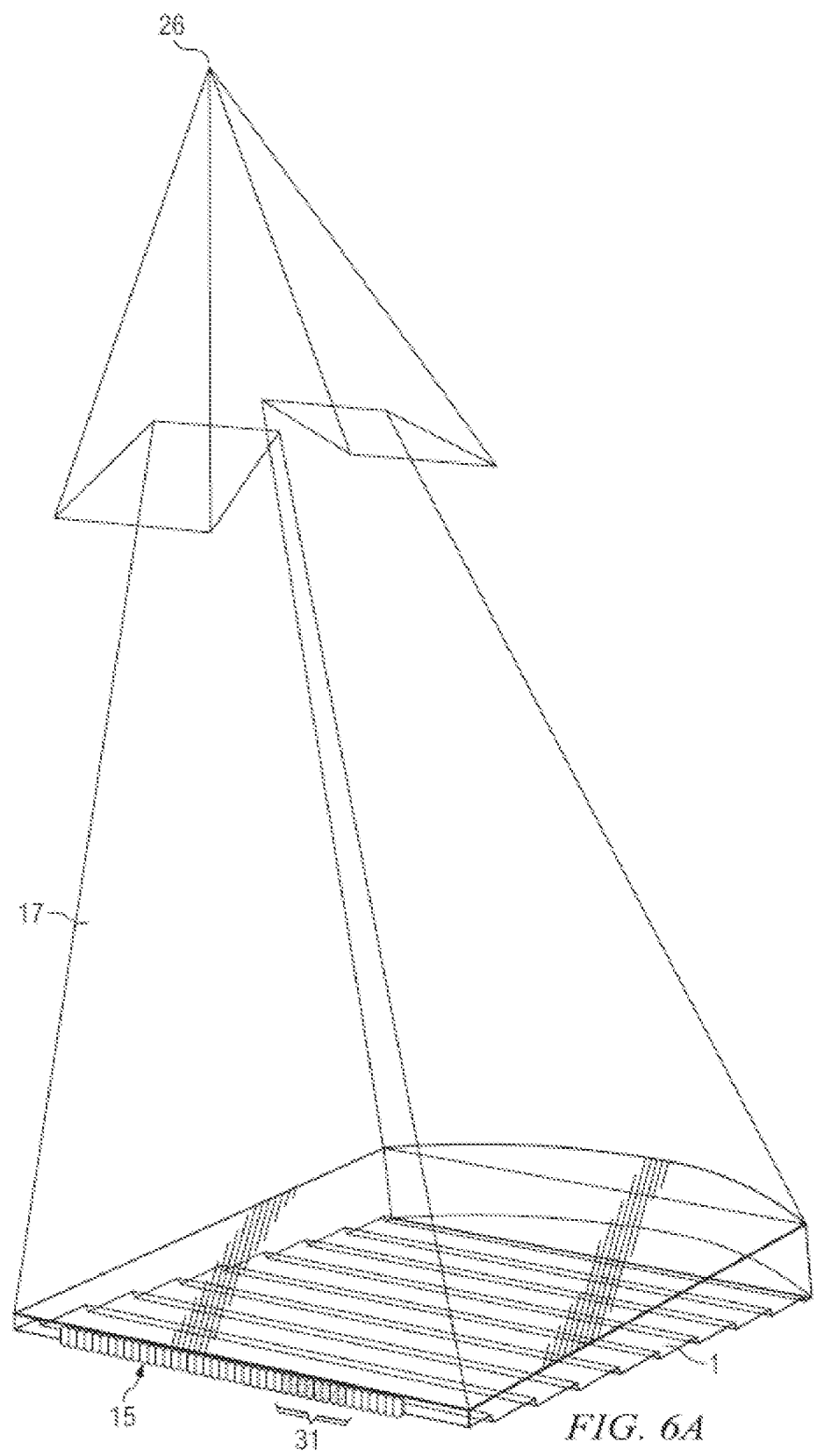
FIG. 6A is a schematic diagram illustrating one embodiment of the generation of a first viewing window in a time multiplexed imaging directional backlight apparatus, in accordance with the present disclosure.
Figure 6B:
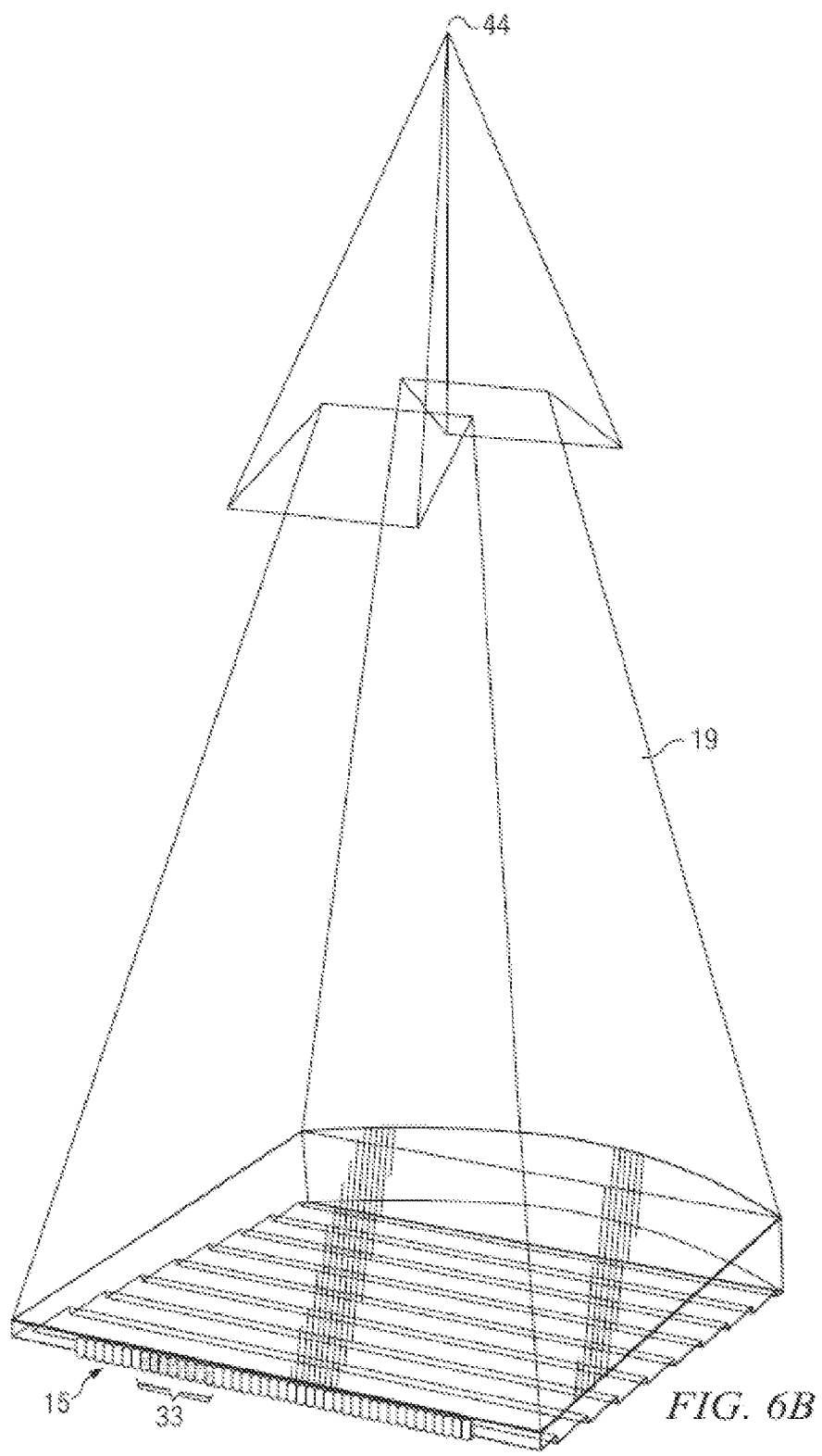
FIG. 6B is a schematic diagram illustrating another embodiment of the generation of a second viewing window in a time multiplexed optical valve apparatus in a second time slot, in accordance with the present disclosure.
Figure 6C:
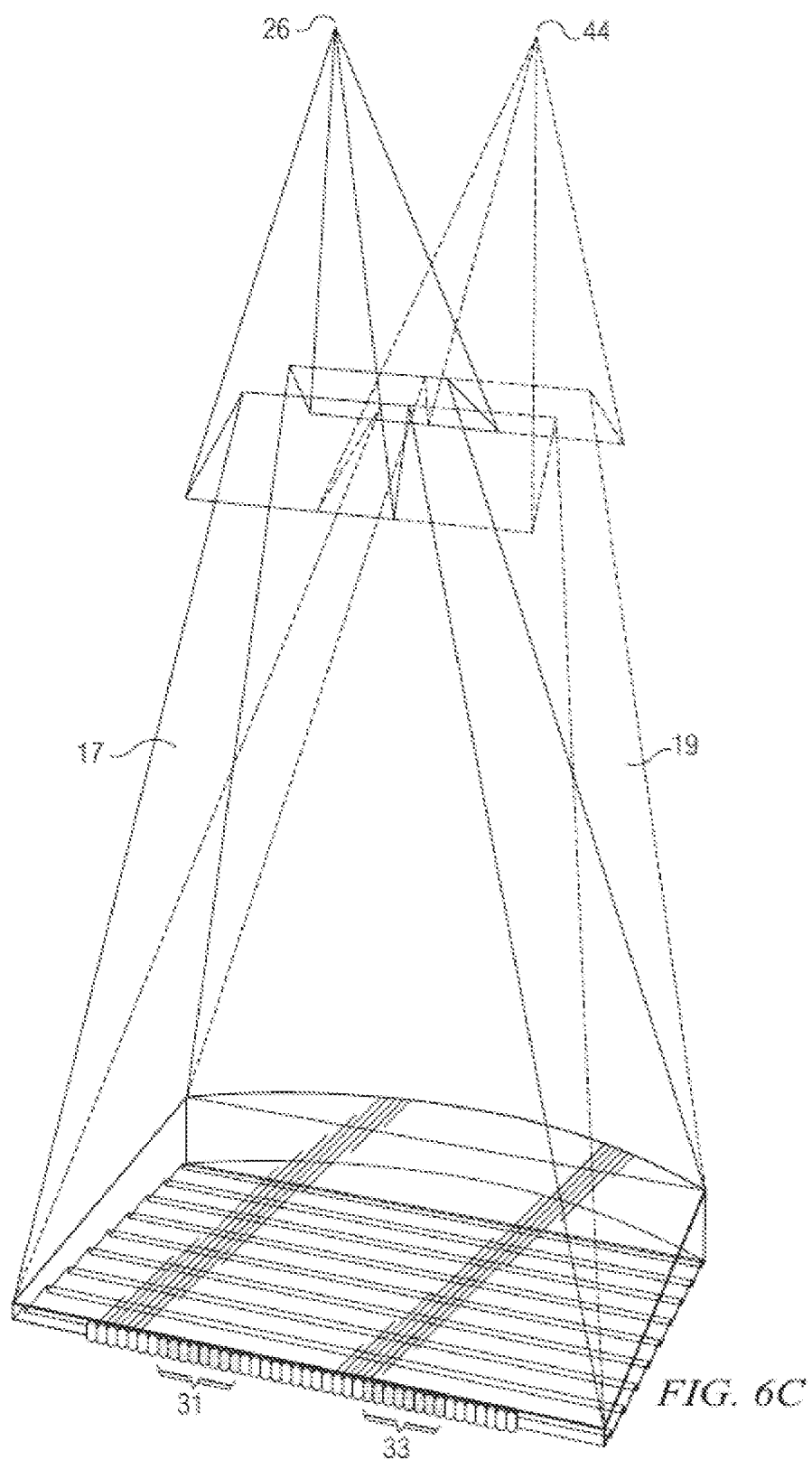
FIG. 6C is a schematic diagram illustrating another embodiment of the generation of a first and a second viewing window in a time multiplexed optical valve apparatus, in accordance with the present disclosure.

FIG. 6A is a schematic diagram illustrating one embodiment of the generation of a first viewing window in a time multiplexed imaging directional backlight apparatus, namely an optical valve apparatus in a first time slot, FIG. 6B is a schematic diagram illustrating another embodiment of the generation of a second viewing window in a time multiplexed imaging directional backlight apparatus in a second time slot, and FIG. 6C is a schematic diagram illustrating another embodiment of the generation of a first and a second viewing window in a time multiplexed imaging directional backlight apparatus. Further, FIG. 6A shows schematically the generation of illumination window 26 from stepped waveguide 1. Illuminator element group 31 in illuminator array 15 may provide a light cone 17 directed towards a viewing window 26. FIG. 6B shows schematically the generation of illumination window 44. Illuminator element group 33 in illuminator array 15 may provide a light cone 19 directed towards viewing window 44. In cooperation with a time multiplexed display, windows 26 and 44 may be provided in sequence as shown in FIG. 6C. If the image on a spatial light modulator 48 (not shown in FIGS. 6A, 6B, 6C) is adjusted in correspondence with the light direction output, then an autostereoscopic image may be achieved for a suitably placed viewer. Similar operation can be achieved with all imaging optical valve systems or imaging directional backlights. Note that illuminator element groups 31, 33 each include one or more illumination elements from illumination elements 15a to 15n, where n is an integer greater than one.

Figure 7:
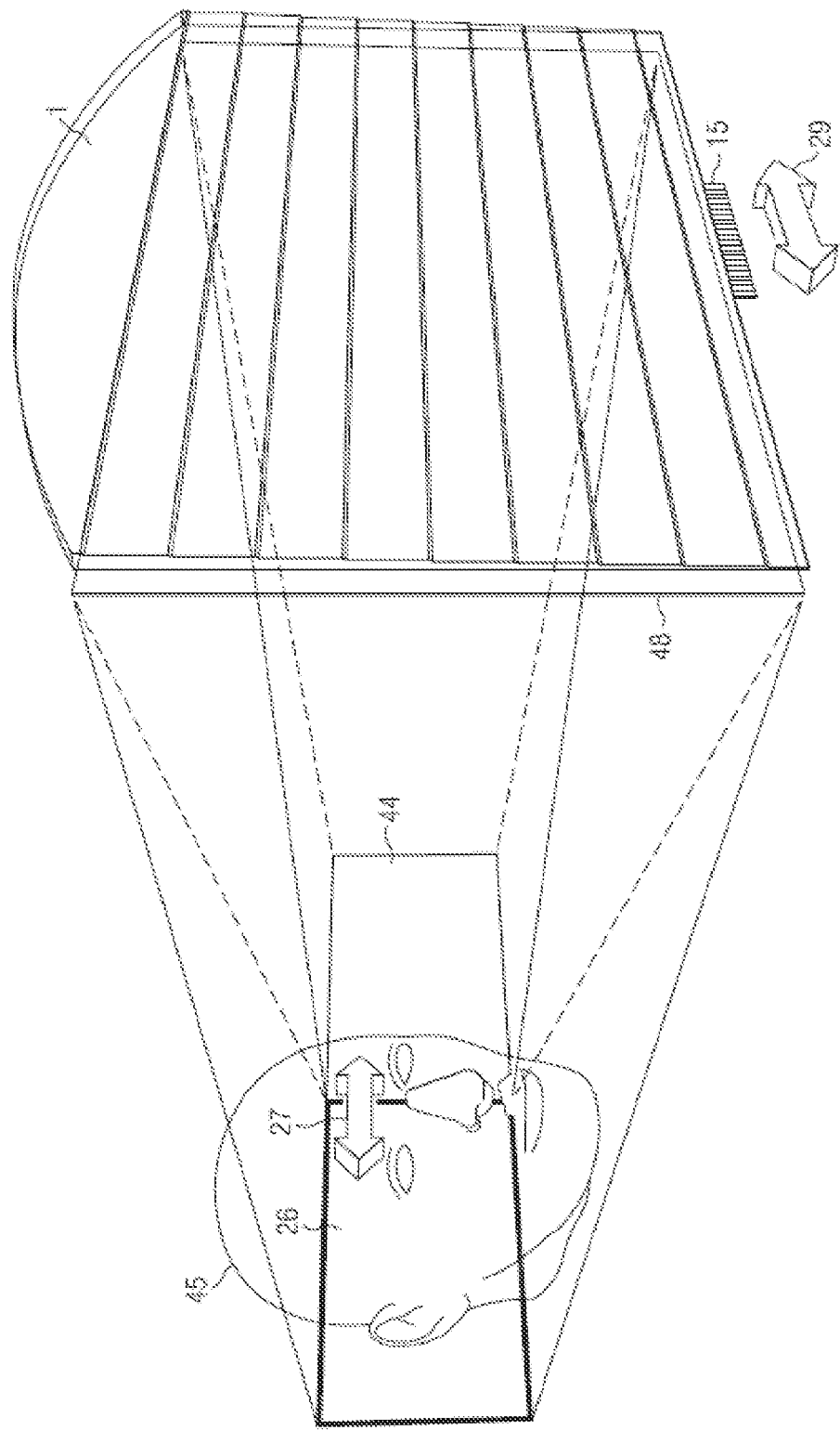
FIG. 7 is a schematic diagram illustrating an observer tracking autostereoscopic display apparatus including a time multiplexed optical valve apparatus, in accordance with the present disclosure.

FIG. 7 is a schematic diagram illustrating one embodiment of an observer tracking autostereoscopic display apparatus including a time multiplexed optical valve apparatus. As shown in FIG. 7, selectively turning on and off illuminator elements 15a to 15n along axis 29 provides for directional control of viewing windows. The head 45 position may be monitored with a camera, motion sensor, motion detector, or any other appropriate optical, mechanical or electrical means, and the appropriate illuminator elements of illuminator array 15 may be turned on and off to provide substantially independent images to each eye irrespective of the head 45 position. The head tracking system (or a second head tracking system) may provide monitoring of more than one head 45, 47 (head 47 not shown in FIG. 7) and may supply the same left and right eye images to each viewers' left and right eyes providing 3D to all viewers. Again similar operation can be achieved with all imaging optical valve systems or imaging directional backlights.

Figure 8:
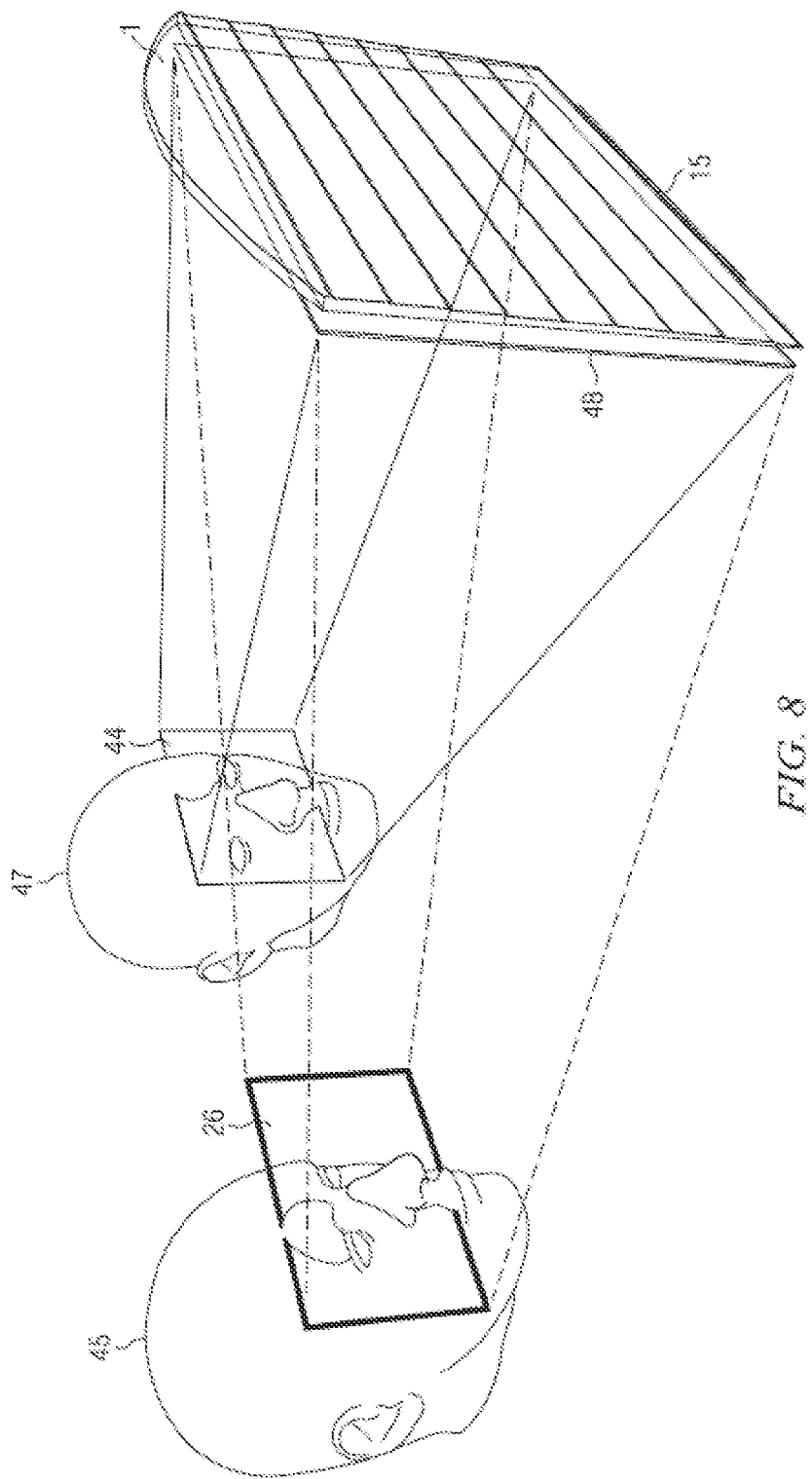
FIG. 8 is a schematic diagram illustrating a multi-viewer display apparatus including a time multiplexed optical valve apparatus, in accordance with the present disclosure.

FIG. 8 is a schematic diagram illustrating one embodiment of a multi-viewer display apparatus which includes a time multiplexed optical valve apparatus as an example of an imaging directional backlight. As shown in FIG. 8, at least two 2D images may be directed towards a pair of viewers 45, 47 so that each viewer may watch a different image on the spatial light modulator 48. The two 2D images of FIG. 8 may be generated in a similar manner as described with respect to FIG. 7 in that the two images would be displayed in sequence and in synchronization with sources whose light is directed toward the two viewers. One image is presented on the spatial light modulator 48 in a first phase, and a second image is presented on the spatial light modulator 48 in a second phase different from the first phase. In correspondence with the first and second phases, the output illumination is adjusted to provide first and second viewing windows 26, 44 respectively. An observer with both eyes in window 26 will perceive a first image while an observer with both eyes in window 44 will perceive a second image.

Figure 9:
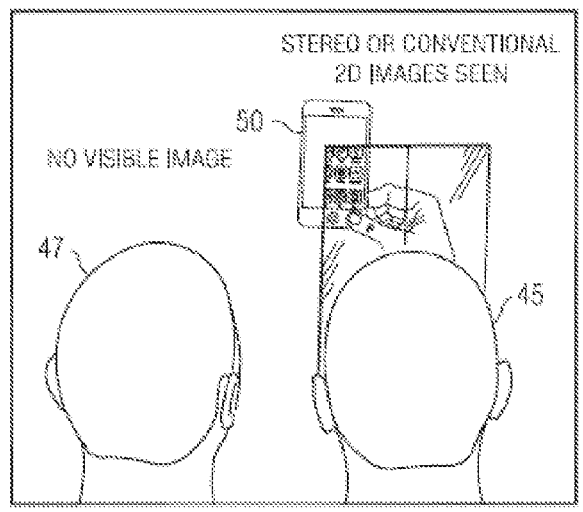
FIG. 9 is a schematic diagram illustrating a privacy display apparatus including an optical valve apparatus, in accordance with the present disclosure.

FIG. 9 is a schematic diagram illustrating a privacy display apparatus which includes an imaging directional backlight apparatus, and as illustrated, an optical valve. 2D display systems may also utilize directional backlighting for security and efficiency purposes in which light may be primarily directed at the eyes of a first viewer 45 as shown in FIG. 9. Further, as illustrated in FIG. 9, although first viewer 45 may be able to view an image on device 50, light is not directed towards second viewer 47. Thus second viewer 47 is prevented from viewing an image on device 50. Each of the embodiments of the present disclosure may advantageously provide autostereoscopic, dual image or privacy display functions.

Figure 10A:
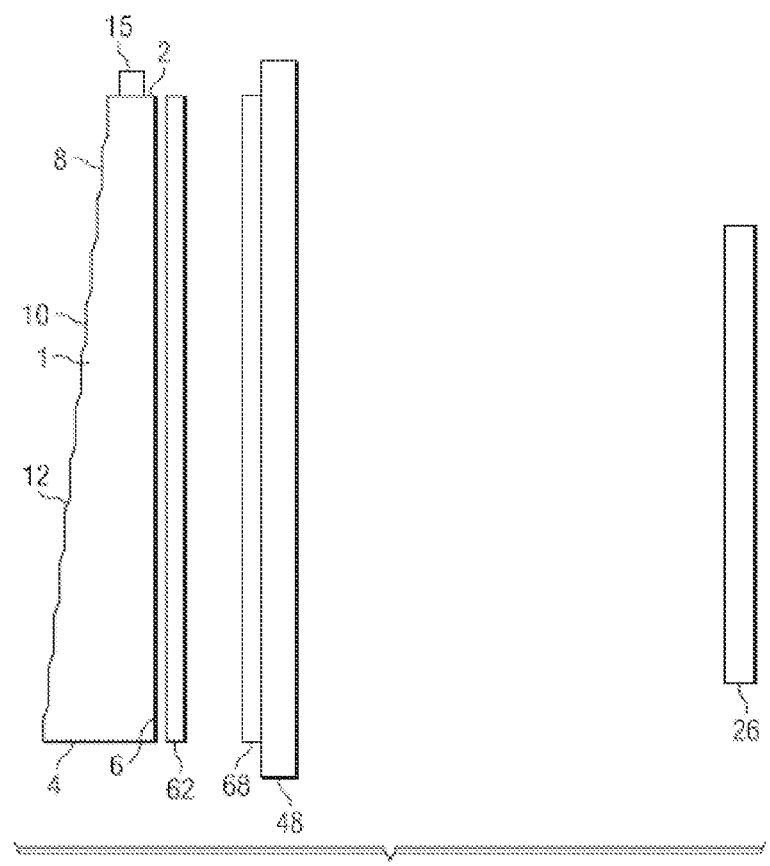
FIG. 10A is a schematic diagram illustrating in side view, the structure of a time multiplexed optical valve apparatus, in accordance with the present disclosure.

FIG. 10A is a schematic diagram illustrating in side view the structure of a time multiplexed optical valve apparatus as an example of an imaging directional backlight. Further, FIG. 10A shows in side view an autostereoscopic display, which may include the stepped waveguide 1 and a Fresnel lens 62 arranged to provide the viewing window 26 for a substantially collimated output across the stepped waveguide 1 output surface. A vertical diffuser 68 may be arranged to extend the height of the window 26 further. The light may then be imaged through the spatial light modulator 48. The illuminator array 15 may include light emitting diodes (LEDs) that may, for example, be phosphor converted blue LEDs, or may be separate RGB LEDs. Alternatively, the illuminator elements in illuminator array 15 may include a uniform light source and spatial light modulator arranged to provide separate illumination regions. Alternatively the illuminator elements may include laser light source(s). The laser output may be directed onto a diffuser by means of scanning, for example, using a galvo or MEMS scanner. In one example, laser light may thus be used to provide the appropriate illuminator elements in illuminator array 15 to provide a substantially uniform light source with the appropriate output angle, and further to provide reduction in speckle. Alternatively, the illuminator array 15 may be an array of laser light emitting elements. Additionally in one example, the diffuser may be a wavelength converting phosphor, so that illumination may be at a different wavelength to the visible output light.

Figure 10B:
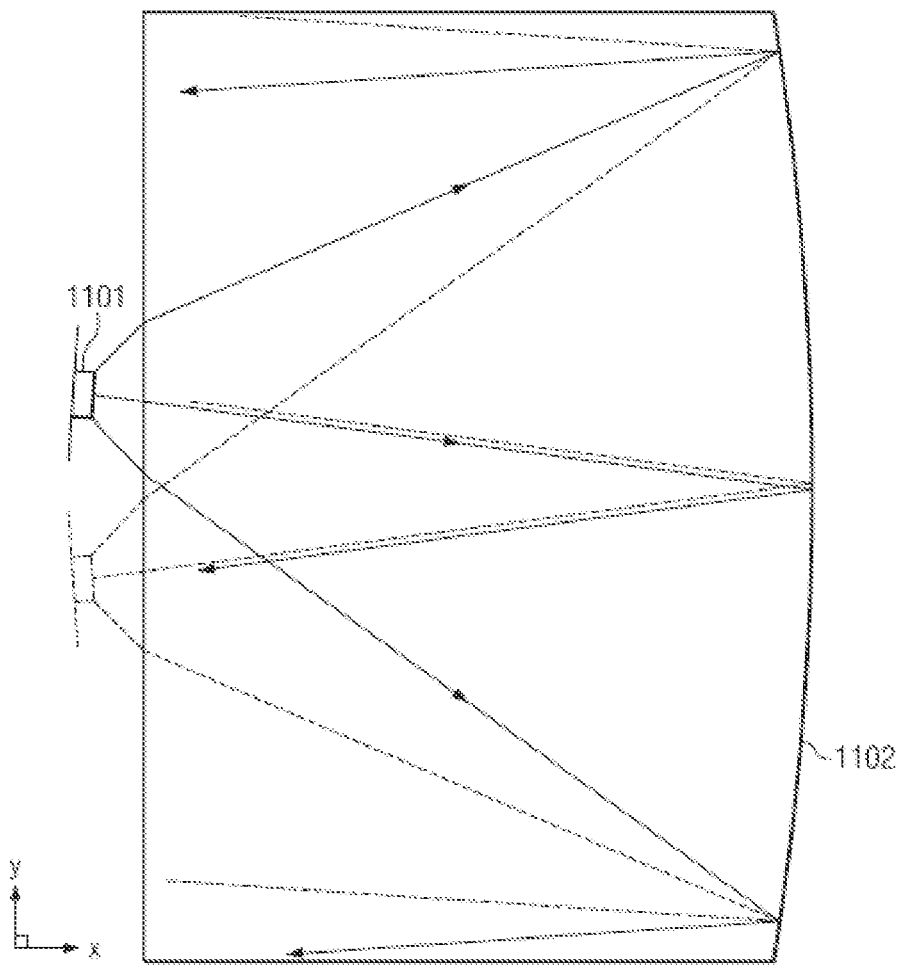
FIG. 10B is a schematic diagram illustrating in front view, the structure of a time multiplexed optical wedge directional backlight apparatus, in accordance with the present disclosure.
Figure 10C:
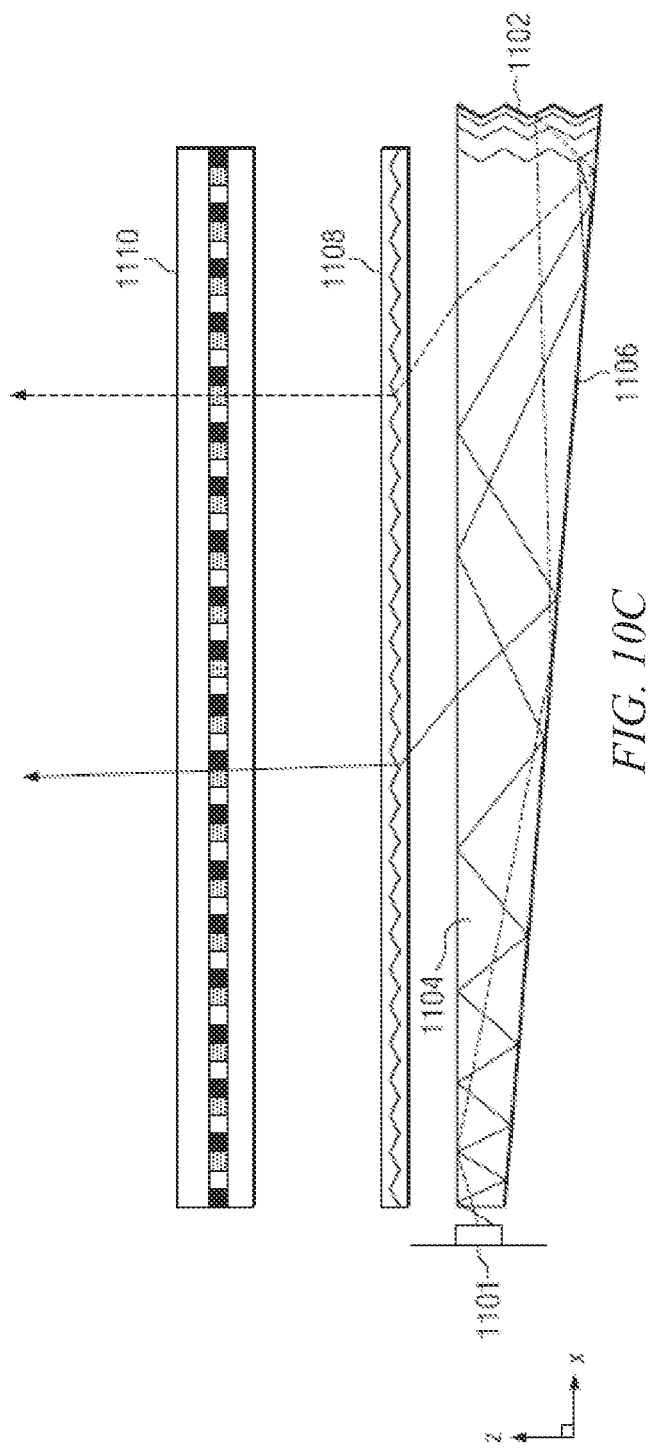
FIG. 10C is a schematic diagram illustrating in side view, the structure of a time multiplexed optical wedge directional backlight apparatus, in accordance with the present disclosure.

FIG. 10B is a schematic diagram illustrating in front view, the structure of a time multiplexed optical wedge directional backlight apparatus and FIG. 10C is a schematic diagram illustrating in side view, the structure of a time multiplexed optical wedge directional backlight apparatus. A further wedge type directional backlight is generally discussed by U.S. Pat. No. 7,660,047 which is herein incorporated by reference in its entirety. The optical wedge 1104 is a waveguide having an input end and first and second, opposed guide surfaces 1106 for guiding light along the optical wedge 1104 that are both planar. The optical wedge 1104 is illuminated by light source array 1101 and light propagates within the medium 1104 of the wedge by total internal reflection at the guide surfaces 1106. The optical wedge 1104 has a reflective end 1102 formed by a corrugated mirror facing the input end for reflecting light from the input end back through the optical wedge 1104. The second guide surface is inclined at an angle to reflect light in directions that break the total internal reflection of the first guide surface after reflection at the reflective end 1102, so that light is output at the first guide surface by refraction of light.

By way of comparison with the stepped imaging directional backlight, light extraction features are not provided. However, the operation is similar in that the optical wedge 1104 directs input light from the light sources of the light source array 1101 at different input positions across the input end in output directions relative to the normal to the first guide surface that are dependent on those input positions. A control system as described above with reference to FIG. 11 is arranged to selectively operate the light sources to direct light into the viewing windows in positions corresponding to the left and right eyes of the observer The optical wedge 1104 extends across a transmissive spatial light modulator 1110 to which the output light is supplied. The spatial light modulator 1110 comprises an array of pixels that modulate light arranged in an aperture with a shape having two perpendicular axes of mirror symmetry. Since light is output from the optical wedge 1104 at high angles of refraction, a prismatic element 1108 extending across first guide surface of the optical wedge 1104 acts as a deflection element to deflect light towards the normal to the spatial light modulator 1110.

The light output by the optical wedge 1104 is deflected by the prismatic element 1108 and passed through spatial light modulator 1110.

The wedge type directional backlight and optical valve further process light beams in different ways. In the wedge type waveguide, light input at an appropriate angle will output at a defined position on a major surface, but light rays will exit at substantially the same angle and substantially parallel to the major surface. By comparison, light input to a stepped waveguide of an optical valve at a certain angle may output from points across the first side, with output angle determined by input angle. Advantageously, the stepped waveguide of the optical valve may not require further light re-direction films to extract light towards an observer and angular non-uniformities of input may not provide non-uniformities across the display surface.

Figure 11:
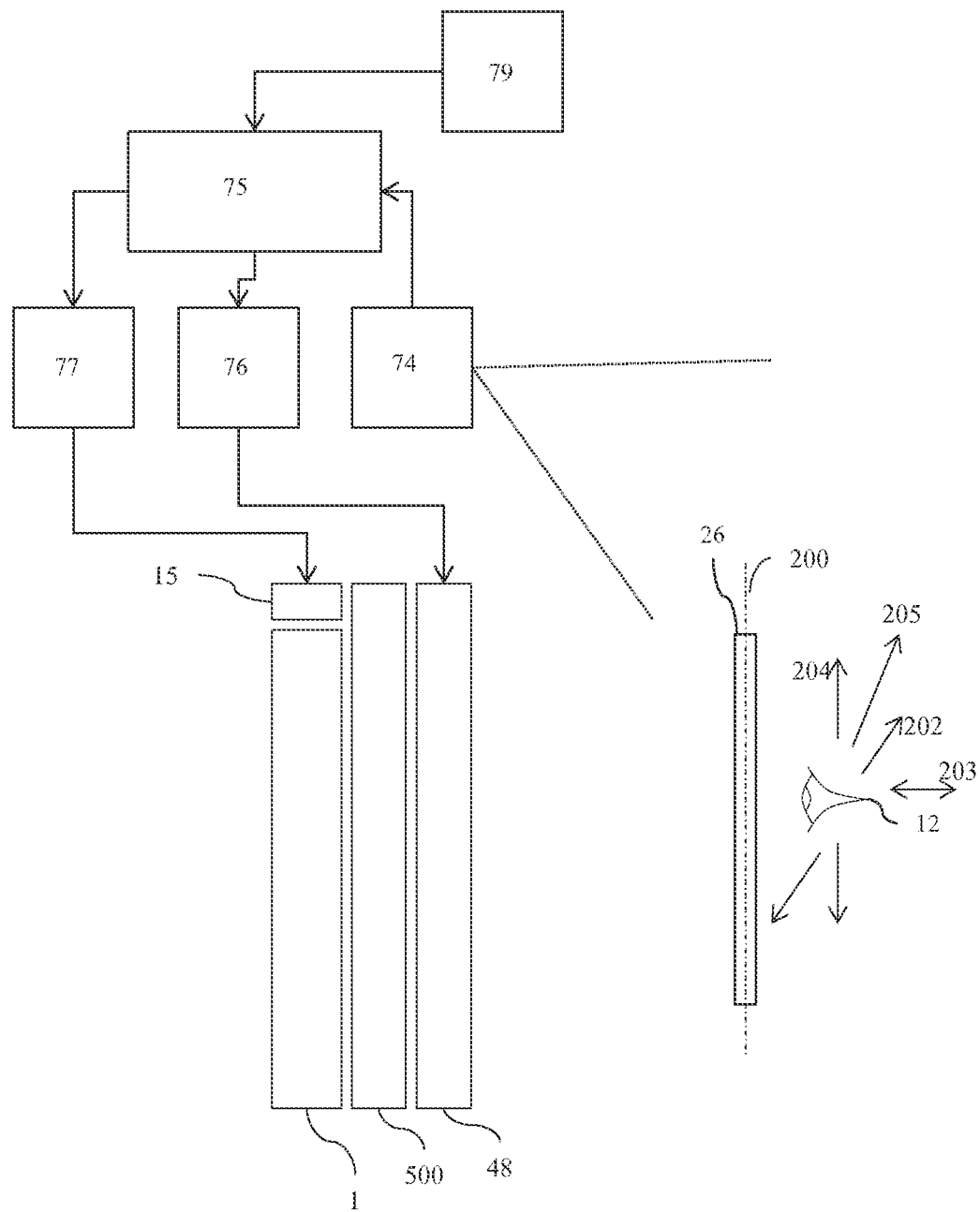
FIG. 11 is a schematic diagram illustrating a side view of an observer tracking autostereoscopic display capable of providing observer tracking in horizontal and vertical directions and comprising a directional backlight and transmissive spatial light modulator, in accordance with the present disclosure.

FIG. 11 is a schematic diagram illustrating an observer tracking time multiplexed autostereoscopic display apparatus for an observer 12 moving in horizontal direction 202 and vertical direction 204 with respect to a rear illuminated autostereoscopic display of the display apparatus. In general, the display apparatus may be any of the display devices described herein. In the example illustrated in FIG. 11 the display device comprises a stepped waveguide 1, an illuminator array 15, a superlens 500 as will be described below and an SLM 48.

The display apparatus further comprises a control system as follows.

An orientation sensor 79 may be used to detect the orientation of the view of the observer and thus to determine landscape or portrait operation of the SLM 48 and an observer tracking system 74 including a sensor such as a camera in cooperation with a computer vision processing system is used to detect the position of an observer in two dimensions across the display device near a nominal viewing plane 200. Thus, the observer tracking system 74 and the orientation sensor 79 may together form a sensor system of the control system that detects the position of an observer in two dimensions across the display device and the orientation of the view of the observer. Other types of sensor system could alternatively be provided to obtain this information. For example the observer tracking system 74 could determine both the position and orientation. In that case the orientation could be indicated directly or by indicating the position of both eyes of the viewer. Alternatively it may not be required to collect the orientation information.

A system control apparatus 75 of the control system is used to determine the required image to be presented by means of an image controller 76; and the required illumination from a light emitting element array 15 by means of an illumination controller 77. Such a display provides a viewing window array 250 at a nominal viewing plane 200. The control system and display apparatus can thus achieve the desired illumination and image data to the respective left and right eyes of the observer for movements in horizontal 202 and vertical 204 directions in both landscape and portrait modes of operation. Further such a display may be capable of viewing in 2D and 3D modes in landscape and portrait operation. Thus, the control system controls the display device to display temporally multiplexed left and right images and synchronously to direct the displayed images into viewing windows in positions corresponding to the left and right eyes of the observer, in dependence on the detected position of the observer and on the detected orientation of the view. Alternatively the orientation can be used to switch the display to provide a two dimensional image in the case when it is not possible for the observer to observe an autostereoscopic image, for example if both eyes are arranged in substantially the same viewing window. It may be desirable to track the observer in a single direction 205 that may be orthogonal to the extent of the windows in the window plane, even for inclined viewing windows, for example direction 205 may be at 45 degrees to the horizontal direction 202 and vertical direction 204. It may further be desirable to track the observer in two dimensions, for example horizontally 202 and vertically 204 or in the direction 205 orthogonal to the extent of the windows in the window plane and longitudinal direction 203. It may further be desirable to track the observer in three dimensions, for longitudinal, horizontal and vertical directions 203, 202, 204 respectively.

Thus a display device may comprise an array 15 of light sources at different input positions across the input end of the waveguide 1; and a control system 75, 76, 77 arranged to selectively operate the light sources of the array 15 to direct light into viewing windows 26 corresponding to required output directions.

The display device may be an autostereoscopic display device 1, 500, 48 wherein the control system 75, 76, 77 is further arranged to control the display device 48 to display temporally multiplexed left and right images and synchronously to direct the displayed images into viewing windows 26 in positions corresponding to left and right eyes of an observer 12.

The control system 75, 76, 77 may further comprise a sensor system 74, 79 arranged to detect the position of an observer 12 across the display device, and the control system 75, 76, 77 is arranged to direct the displayed images into viewing windows 26 in positions corresponding to left and right eyes of an observer 12, in dependence on the detected position of the observer 12.

There will now be described some specific display devices that are based on and incorporate the structures of FIGS. 1 to 10C. Accordingly, except for the modifications and/or additional features which will now be described, the above description applies to the following apparatuses but for brevity will not be repeated.

Figure 12:
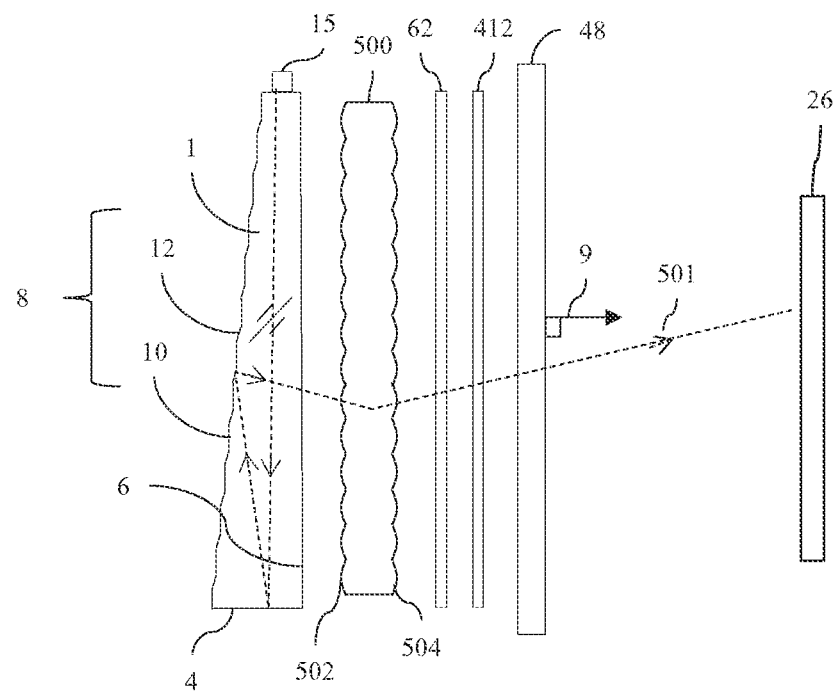
FIG. 12 is a schematic diagram illustrating a side view of an observer tracking autostereoscopic display comprising an optical valve apparatus, a superlens and transmissive spatial light modulator, in accordance with the present disclosure.

FIG. 12 is a schematic diagram illustrating a side view of an observer tracking autostereoscopic display device comprising an optical valve apparatus, a superlens 500 and transmissive spatial light modulator 48 with surface normal direction 9. Light rays 501 from a light source in array 15 are directed through the waveguide 1 where they are incident on reflective side 4 after guiding from features 10 and side 6 of the waveguide 1. Rays are incident on light extraction features 12 and directed through the side 6. The superlens 500 is arranged between the waveguide 1 and a Fresnel lens 62, and hence between the waveguide 1 and the SLM 48. Light rays 501 from the array 15 are directed through the superlens 500 and directed to viewing windows.

Superlens 500 comprises first array 502 and second array 504 of lenticular lens elements as will be described below. After processing by the superlens 500, light may be incident on the Fresnel lens 62 and asymmetric diffuser 412 before being directed to the viewing window 26. As will be described below, the optical output of the viewing windows may be advantageously modified by the superlens 500.

The waveguide 1 is arranged as described above with reference to FIGS. 1 to 10B. Thus the first guide surface 6 may arranged to guide light by total internal reflection and the second guide surface may have a plurality of light extraction features 12 inclined to reflect light guided through the waveguide 1 in directions allowing exit through the first guide surface 6 of the output light. The second guide surface 8 may have intermediate regions 10 between the light extraction features 12 that are arranged to direct light through the waveguide 1 without extracting it. The intermediate regions 10 of the second guide surface may extend parallel to the first guide surface 6. The light extraction features 12 may be reflective facets extending laterally to the intermediate regions 10 and the second guide surface 8 may have a stepped shape which may include the reflective facets 12 and the intermediate regions 10.

The waveguide 1 may have a reflective end 4 facing the input end 2 for reflecting light from the input light sources of the array 15 back through the waveguide 1, the waveguide 1 being arranged to output light through the first guide surface 6 after reflection from the reflective end.

Each of the lens arrays 502 and 504 comprises an array of lenses that each have a positive optical power in respective first meridians and no optical power in respective second meridians perpendicular to the first meridians. The lenses are therefore cylindrical lenses, although the profile of the lens surface in the first meridians may have a shape that is circular or non-circular so the word "cylindrical" in this context does not imply a mathematically strict restriction to a cylindrical shape. The second meridians of the lenses of each of the lens arrays 502 and 504 extend parallel to each other. In this example, the pitches of the two lens arrays 502 and 504 are the same and respective lenses of the lens arrays 502 and 504 are aligned with each other.

The first and second lens arrays 502 and 504 are further arranged with focal planes between the first and second lens arrays 502 and 504 that each extend perpendicular to the normal to the SLM 48. As will be shown, in general the focal planes of the first and second lens arrays 502 and 504 may be coincident or offset.

In this example, the superlens 500 is oriented so that the second meridians of lens arrays 502, 504 extend orthogonal to the optical axis of the waveguide 1 for illustrative convenience. As will be shown, typically the lenses will comprise meridian axes that are parallel to or inclined at an acute angle to the optical axis of the waveguide.

Figure 13:
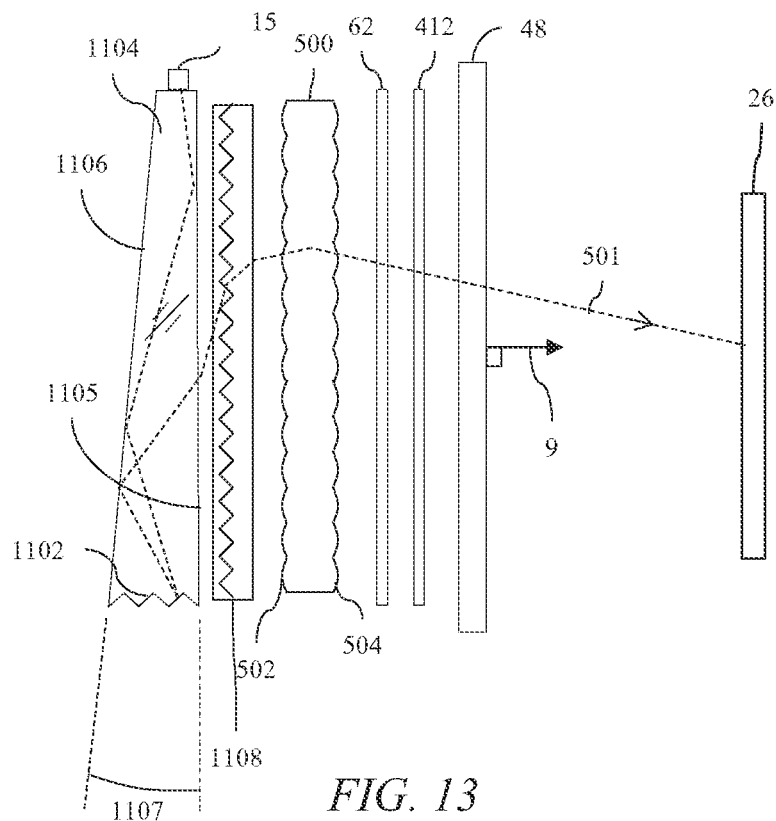
FIG. 13 is a schematic diagram illustrating a side view of an observer tracking autostereoscopic display comprising an optical wedge directional backlight, a superlens and transmissive spatial light modulator, in accordance with the present disclosure.

FIG. 13 is a schematic diagram illustrating a side view of an observer tracking autostereoscopic display device comprising an optical wedge 1104, a superlens 500 and transmissive spatial light modulator 48. The display device is arranged as described above with reference to FIG. 10C with the following modifications.

The display device has the same construction as shown in FIG. 12 and describe above except for the replacement of the waveguide 1 by the optical wedge 1104 and the prismatic element 1108. More specifically, the output of the waveguide 1104 of the optical wedge with wedge angle 1107 as shown in FIG. 10C is redirected by superlens 500, Fresnel lens 62 and diffuser 412 to achieve viewing windows 26 with modified properties in comparison to those windows that would be achieved without the superlens 26.

Thus the first guide surface 1105 may be arranged to guide light by total internal reflection and the second guide surface 1106 may be substantially planar and inclined at an angle 1107 to reflect light in directions that break the total internal reflection for outputting light through the first guide surface 1105 after reflection at the reflective end 1102 (by virtue of the prismatic structure at the end 1102). The prismatic element 1108 extending across the first guide surface of the waveguide acts as a deflection element for deflecting light towards the normal 9 to the spatial light modulator 48.

Figure 14:
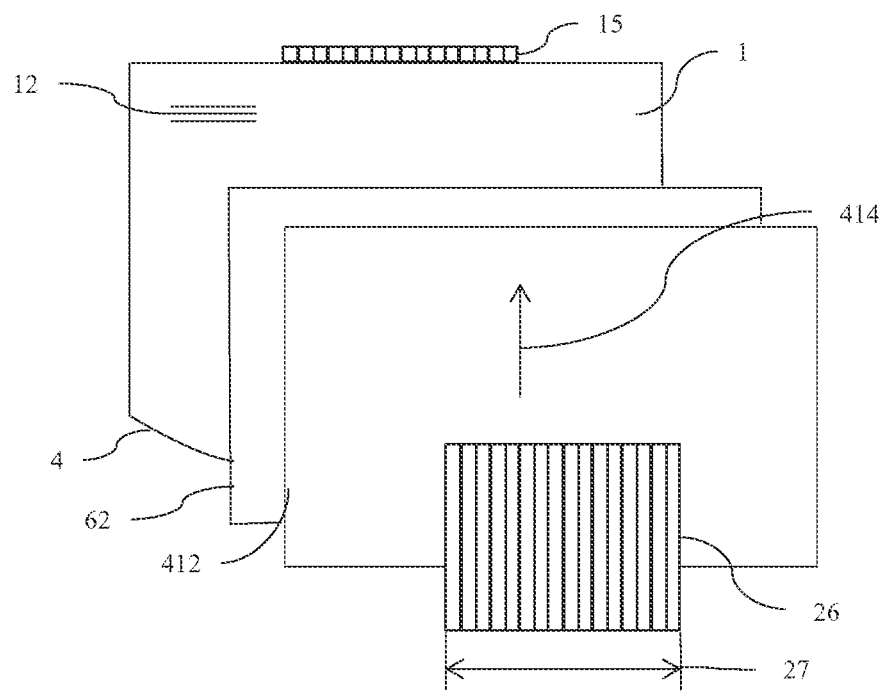
FIG. 14 is a schematic diagram illustrating a front view of an observer tracking autostereoscopic display comprising an optical valve apparatus and a transmissive spatial light modulator, in accordance with the present disclosure.

FIG. 14 is a schematic diagram illustrating a front view of an observer tracking autostereoscopic display device comprising an optical valve apparatus and a transmissive spatial light modulator. Thus this display device corresponds to that of FIG. 12 but with the superlens 500 and spatial light modulator omitted by means of explanation. Thus light sources of array 15 are imaged by the optical valve 1 with extraction features 12 are directed by means of Fresnel lens 62 and asymmetric diffuser 412 (with major diffusion axis direction 414) to an array of viewing windows 26 that are vertically extended by the diffuser and have a lateral extent defined by the spacing of the light sources of the array 15 and imaging properties of the waveguide 1. Thus the number of windows 26 that are achieved is the same as the number of light sources such as LEDs in the array 15. Further, the total lateral width 27 of the viewing windows 26 is limited by the length of the array 15. It would be desirable to increase the width 27 with fewer light sources in the array 15, to reduce cost.

Figure 15:
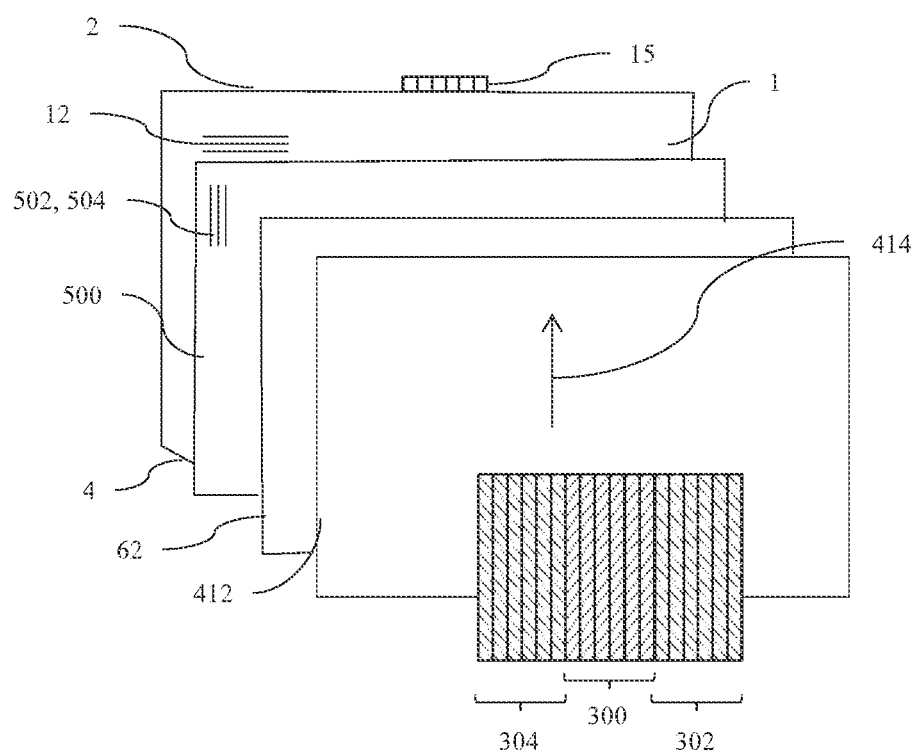
FIG. 15 is a schematic diagram illustrating a front view of an observer tracking autostereoscopic display comprising an optical valve apparatus, a superlens and transmissive spatial light modulator, in accordance with the present disclosure.

FIG. 15 is a schematic diagram illustrating a front view of an observer tracking autostereoscopic display device comprising an optical valve apparatus, a superlens 500 and transmissive spatial light modulator 48. Thus this display device corresponds to that of FIG. 12, but the superlens 500 is oriented so that the second meridians extend parallel to the optical axis of the waveguide 1. This orientation is selected so that there is no rotation of the viewing windows.

As will be described, superlenses may redirect light from a single array of light sources and direct the light into multiple viewing lobes. Thus the axes of the arrays 502, 504 may be aligned parallel to the vertical direction (the extent of the individual viewing windows) to receive light that would be directed to viewing windows 26. As will be shown, in operation, the superlenses may serve to achieve multiple viewing lobes 300, 302, 304. Thus sources from the array 15 would provide viewing windows in lobe 300 in the absence of a superlens 500. Such a lobe has limited extent if the number of light sources is reduced to reduce cost. Adding the superlens 500 can achieve repeated images of the windows in lobe 300 at laterally displaced positions, achieving the lobes 302, 304. Thus an increased lateral viewing freedom may be achieved from an array 15 with a reduced number of light sources compared to the arrangement of FIG. 14. Advantageously cost may be reduced. The same effect is achieved by the superlens in the display device of FIG. 13.

Various constructions for the superlens 500 will now be described. Any of these constructions may be applied in the display device of FIG. 12 or the display device of FIG. 13.

Figure 16A:
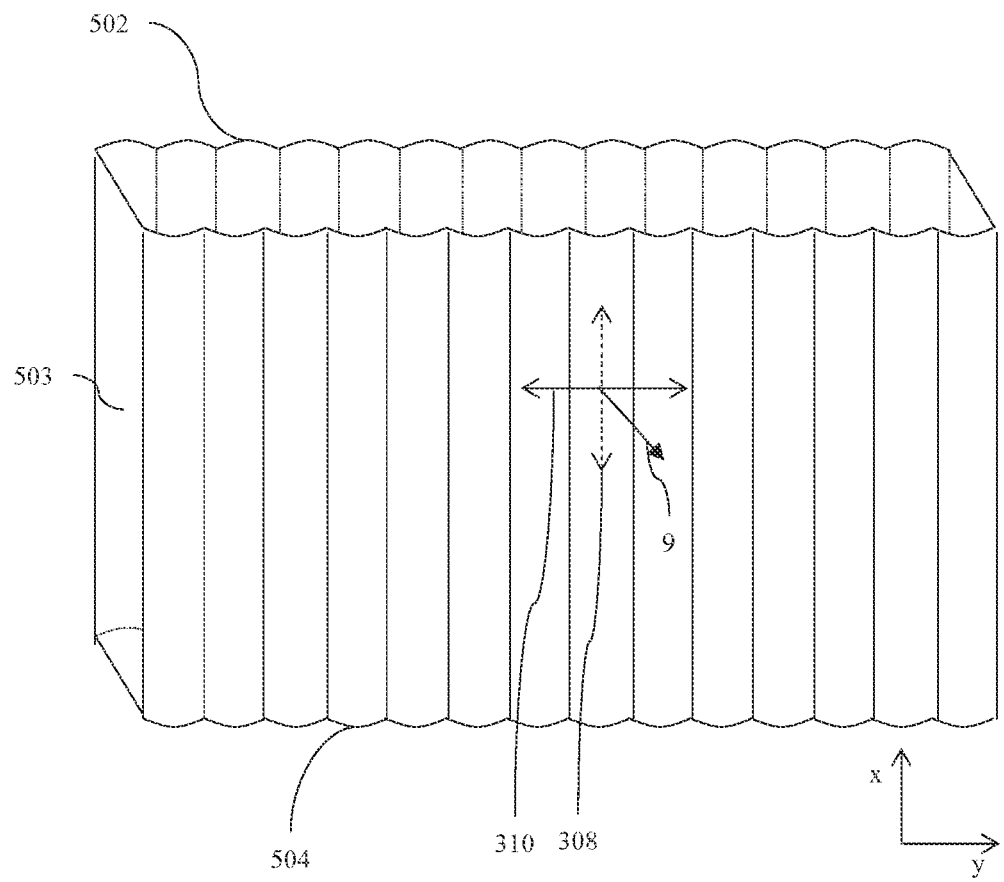
FIG. 16A is a schematic diagram illustrating a front view of a superlens, in accordance with the present disclosure.

FIG. 16A is a schematic diagram illustrating a front view of a superlens. The superlens comprises first and second arrays 502 of lenticular lens elements comprising first and second surface reliefs respectively. The superlens may be formed by a common piece of material 503 that may be a plastic or glass material for example. Alternatively the superlens 500 may comprise separate air spaced lenses. The first and second arrays 502, 504 of lenses each have a positive optical power in respective first meridians 310 and no optical power in respective second meridians 308 perpendicular to the first meridians 310 and the lenses of each array 502, 504 have parallel first meridians 310. The first and second arrays 502, 504 of lenses have respective focal planes that extend perpendicular to the normal 9 to the spatial light modulator intermediate the first and second arrays 502, 504 of lenses. In the display device shown in FIG. 15, the lenses of each array 502, 504 have first meridians 310 that extend parallel to the optical axis of waveguide 1.

Figure 16B:
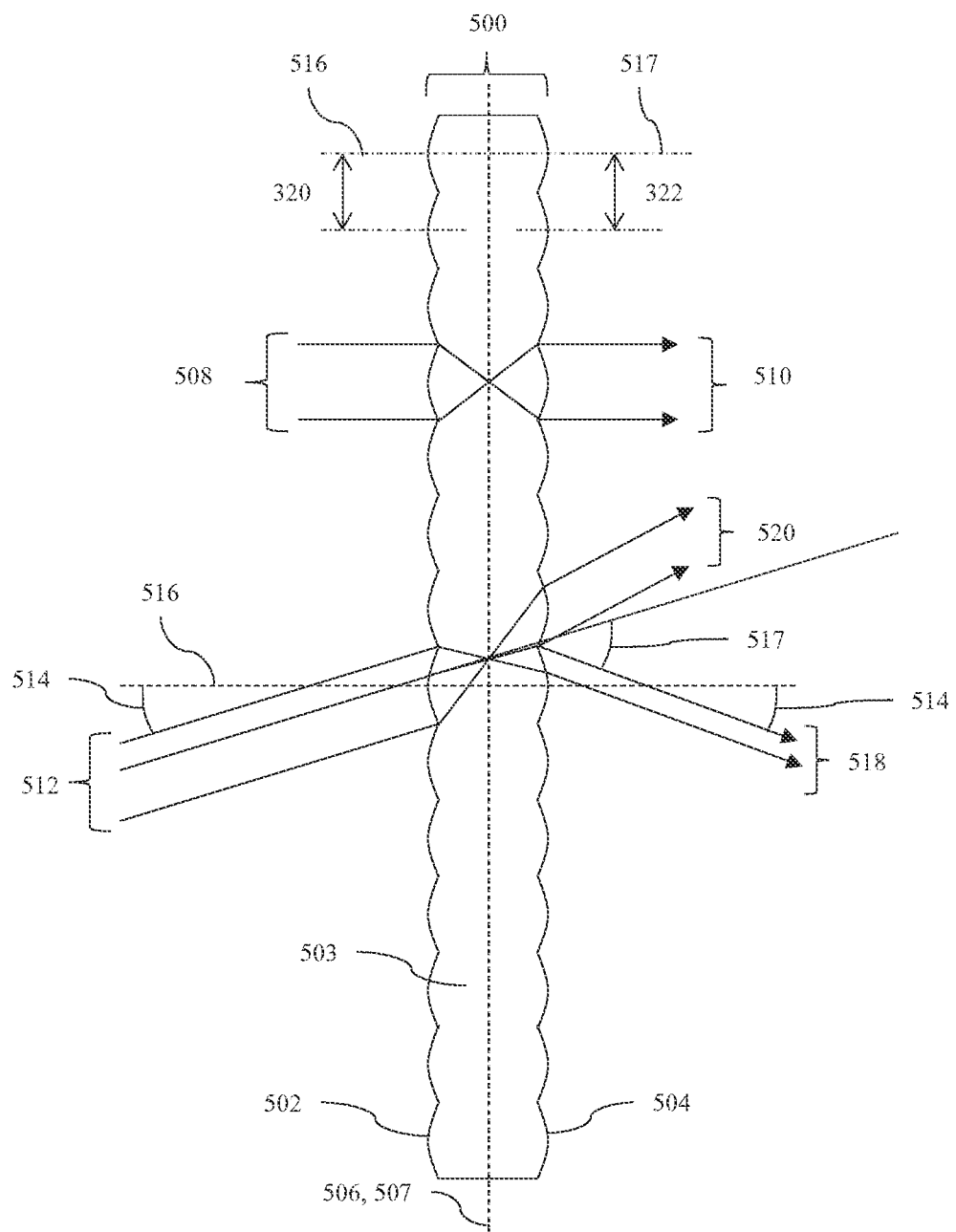
FIG. 16B is a schematic diagram illustrating a side view of a superlens, in accordance with the present disclosure.

FIG. 16B is a schematic diagram illustrating a side view of a superlens in which the first and second lens arrays 502 and 504 have focal lengths that are substantially equal.

In FIG. 16B, the optical axes 516 of the lenses of the first lens array 502 are aligned with the optical axes 517 of the lenses of the second lens array 504 and the pitch 320 of the first lens array is the same as the pitch 322 of the second lens array. Parallel on-axis light rays from an on-axis beam 508 from the directional backlight 1 are incident on the first lens array 502 and are focused to the focal plane 506 of the first lens array 502. Herein, focus may refer to a paraxial focus, or a non-paraxial focus wherein the focus is determined by ray fan intercept analysis for example, to optimize the nominal lens properties over the required illumination angles and numerical aperture of the respective lens surface, as well known in optical design. Thus plane 506 is a nominal plane representing a nominal typical focus condition. To preserve directionality of light rays, the plane 506 may typically not be formed by an optical element such as a diffuser. However in embodiments wherein the axis 508 is vertical and parallel to the extent of the windows, a diffuser may be incorporated to increase the output cone angle.

The second lens array 504 has a focal plane 507 that is substantially coincident with focal plane 506. Light that passes through the focal planes 506, 507 may be incident on a lens of the second array 504 and output as a beam 510 with substantially the same direction as the beam 508.

Beam 508 incident on-axis to the superlens 500 is incident at lens array 508 and imaged through the optical system 510 to produce an output collimated beam 510 with substantially no geometric losses of light.

Light rays from an off-axis light beam 512 at an angle 514 to axis 516 are incident at two lenses of array 504 and thus two separate output beams 518, 520 are formed. Beam 518 has an angle 514 to the axis 516 and an angle 517 to the ray 512 direction that in this embodiment is twice the angle 514 as the focal lengths of the first and second lens arrays are equal. Thus a single light source may achieve two sets of windows in lobes 300, 302 from beams 518, 520 respectively. Advantageously, the number of light sources can be reduced for a given range of viewing angles.

Conversely, where a given light source is operated in order to direct light into a given viewing window corresponding to one of the beams 518 and 520, then the splitting causes light also to be directed into another viewing window corresponding to the other one of the beams 518 and 520. Considering the brightness of the given viewing window, this represents a loss of light into the side lobes 507 and 509 which may be undesirable in some applications. However, such loss may be reduced by design of the superlens 500 as follows or may be compensated in the control as described below.

There will now be described various modifications to the superlens 500 shown in FIG. 16B. These modifications may be applied in any combination.

Figure 16C:
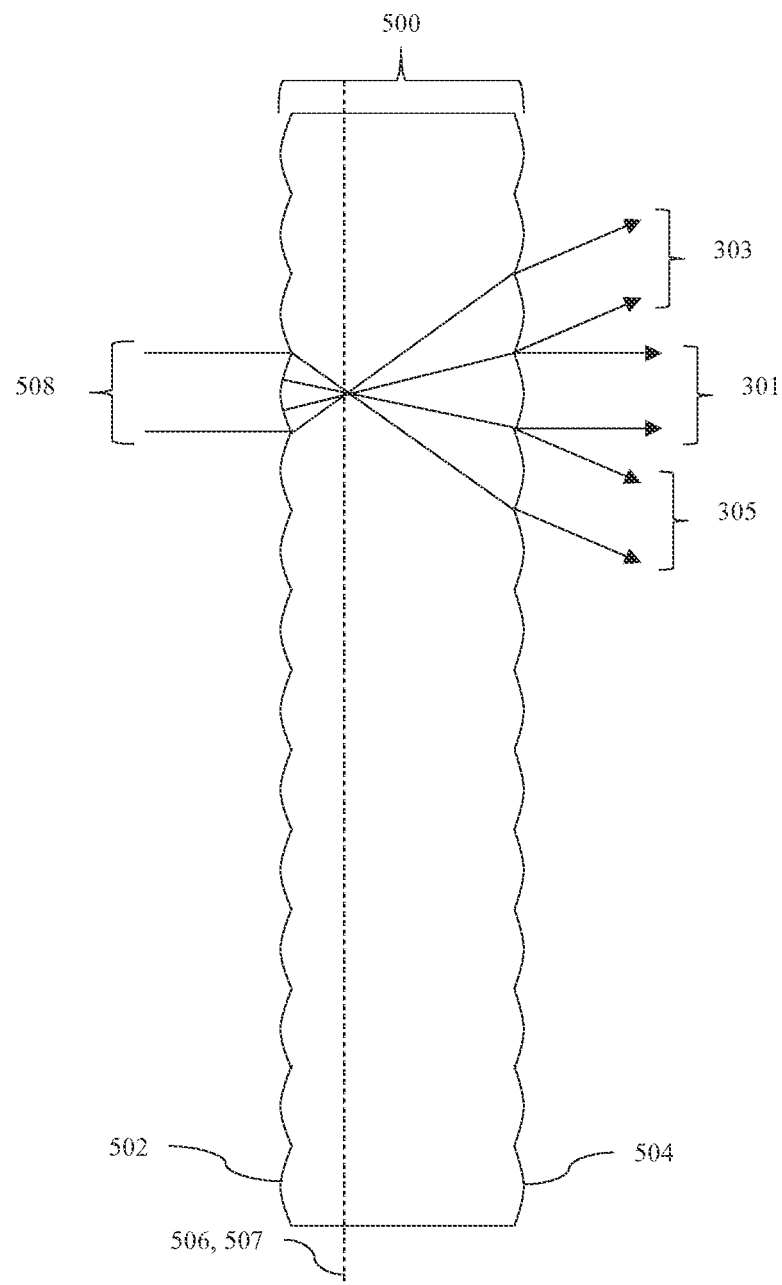
FIG. 16C is a schematic diagram illustrating a side view of a superlens, in accordance with the present disclosure.

FIG. 16C is a schematic diagram illustrating a side view of a superlens 500 wherein the focal length of the first array 502 is smaller than the focal length of the second array 504. Such an arrangement achieves three (or more) separate output beams 301, 303, 305 that are directed to separate lobes 300, 302, 304 respectively. Thus the focal length of the lenses of the first array 502 of lenses arranged to receive light from the waveguide 1 is less than the focal length of lenses of the second array 504. Advantageously the viewing angle of the display can be further increased for a given number of light sources.

Figure 17:
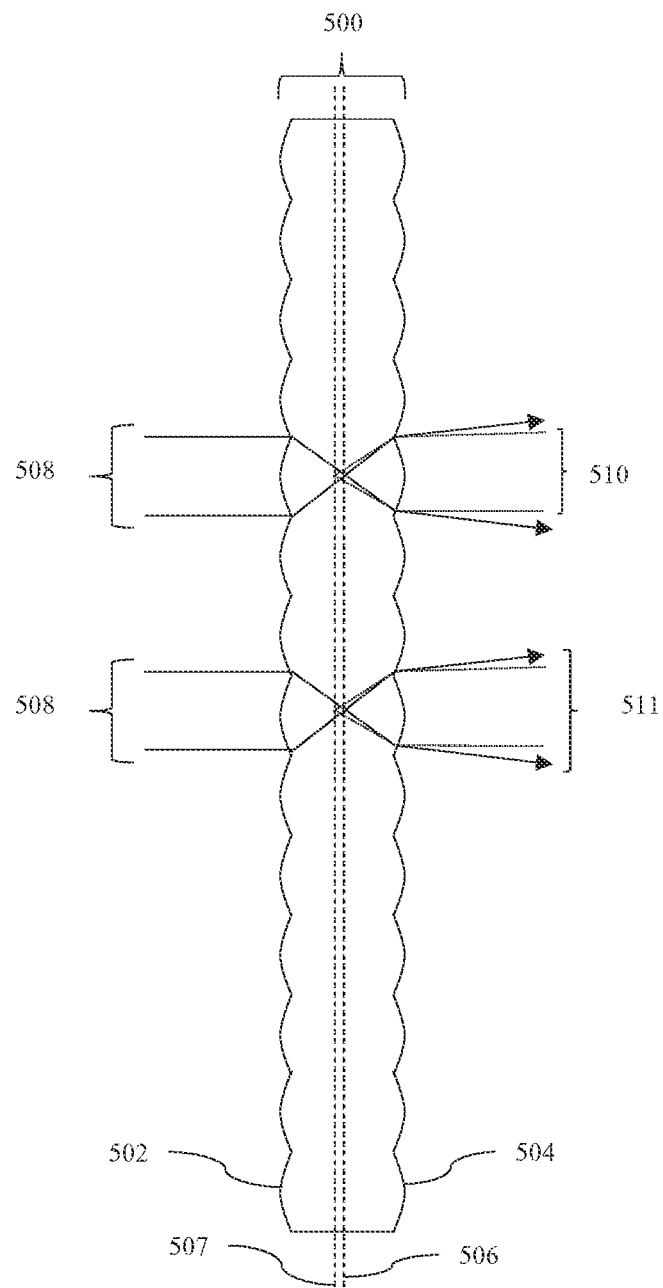
FIG. 17 is a schematic diagram illustrating a side view of a superlens, in accordance with the present disclosure.

FIG. 17 is a schematic diagram illustrating a side view of a superlens 500 in which the focal planes 506, 507 are offset, or separated. Thus the output beam 511 is slightly expanded in comparison with the beam 510 that would be achieved if the planes 506, 507 were coincident. In this manner additional lateral window diffusion (in the y direction) can be achieved). Such diffusion can advantageously reduce the need for lateral diffusion from diffuser 412 and thus reduce it complexity and cost. Further, it may be possible to increase the mark-space ratio of the light sources in the array 15 which can achieve improved cross talk characteristics. Thus the first and second arrays 502, 504 of lenses may be arranged with respective focal planes 506, 507 that are offset.

Figure 18A:
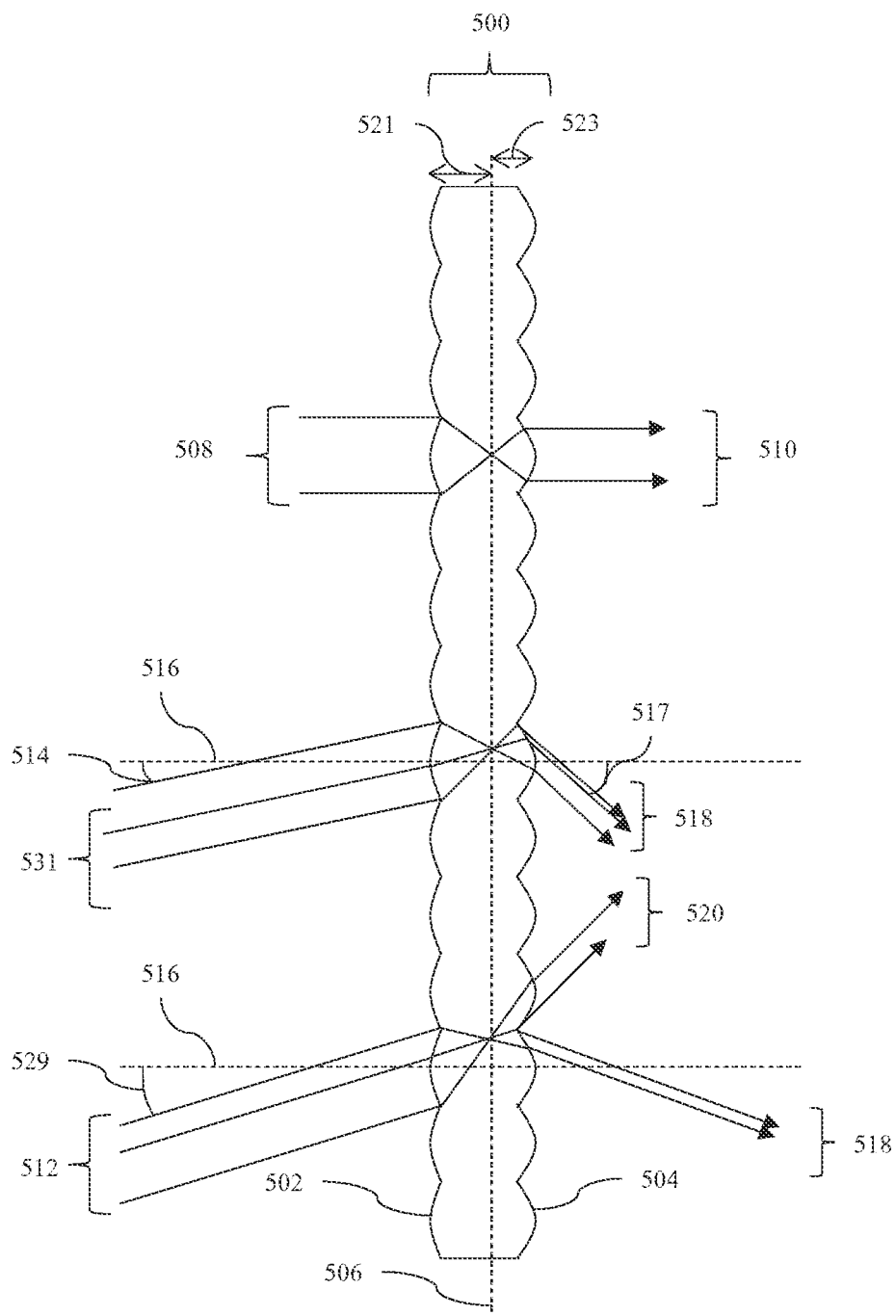
FIG. 18A is a schematic diagram illustrating a side view of a superlens, in accordance with the present disclosure.

FIG. 18A is a schematic diagram illustrating a side view of a superlens 500 wherein the focal length of the first lens array 502 is greater than the focal length of the second lens array 504 while the planes 506, 507 are coincident. Thus the distance 523 is smaller than distance 521 and the curvature of the surface of the lens of array 504 is greater than for array 502. In this manner, rays 508 are output into beam 510 that has the same directionality but a smaller lateral width from the lens of array 504. Thus the focal length of the lenses of the first array 502 of lenses arranged to receive light from the waveguide 1 is greater than the focal length of lenses of the second array 504. For off-axis illumination array 531 a single beam 518 may advantageously be achieved but with a higher angle 517 than the angle 514. Thus the total viewing angle that can be achieved by a given length of array 15 can be increased, reducing LED cost. Further, for positions near the on-axis viewing position there exists positions where no second order beams 518 are produced (as shown for rays at angle 529 with respect to the optical axis 516). Thus in comparison to the arrangements of FIG. 16B and FIG. 16C, the light loss due to this vignetting effect is reduced for on-axis positions and the display can be used in high efficiency and privacy modes of operation.

Figure 18B:
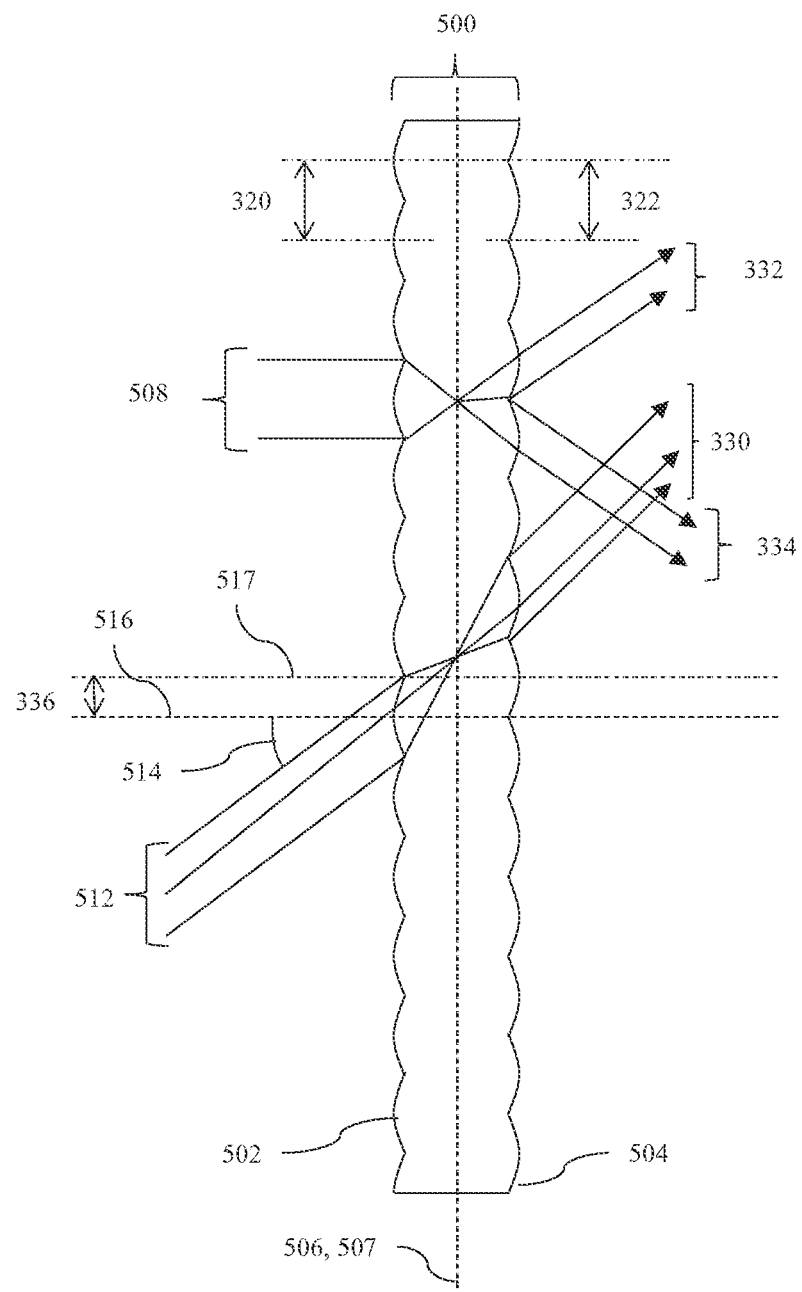
FIG. 18B is a schematic diagram illustrating a side view of a superlens, in accordance with the present disclosure.

FIG. 18B is a schematic diagram illustrating a side view of a superlens wherein the first and second arrays 502, 504 of lenses have optical axes 516, 517 that are offset by a distance 336. If the pitch 320 is the same as pitch 322 then the offset distance 336 may for example be half of the pitch 320. On-axis beam 508 is thus split into two output beams 332, 334, whereas beam 512 at angle 514 achieves a single output beam 330. Such an arrangement can thus achieve an offset of the central beam 508. As will be described below, such an arrangement can advantageously be used to achieve a modification of the off-axis visibility of voids.

Figure 19A:
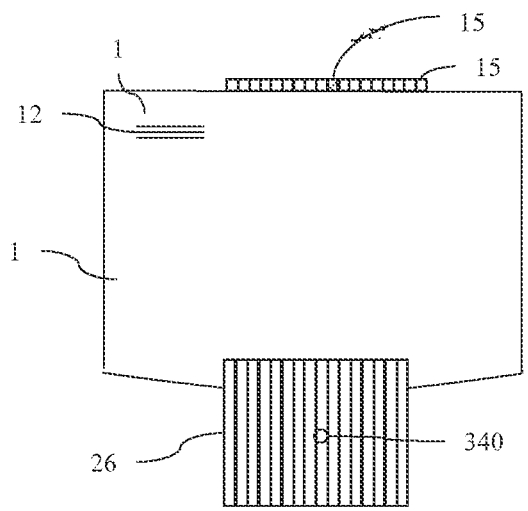
FIG. 19A is a schematic diagram illustrating a front view of an observer tracking autostereoscopic display comprising an optical valve apparatus for a first viewing position, in accordance with the present disclosure.
Figure 19B:
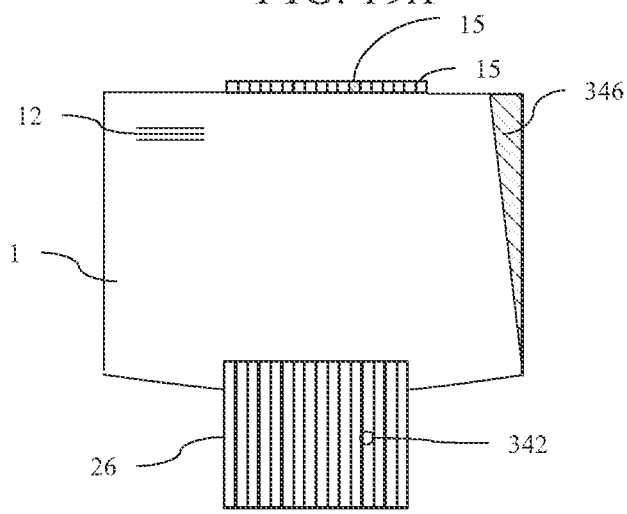
FIG. 19B is a schematic diagram illustrating a front view of an observer tracking autostereoscopic display comprising an optical valve apparatus for a second viewing position, in accordance with the present disclosure.
Figure 19C:
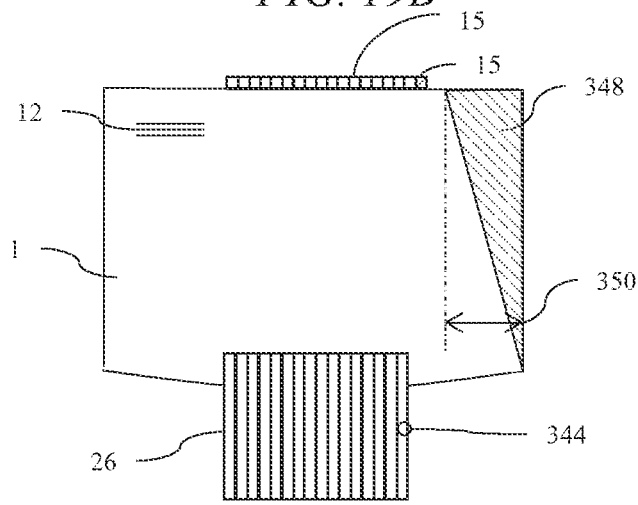
FIG. 19C is a schematic diagram illustrating a front view of an observer tracking autostereoscopic display comprising an optical valve apparatus for a third viewing position, in accordance with the present disclosure.

FIG. 19A is a schematic diagram illustrating a front view of an observer tracking autostereoscopic display comprising an optical valve apparatus for a first viewing position 340, representing the position of a single pupil of an observer in the window 26 array. FIG. 19B is a schematic diagram illustrating a front view of an observer tracking autostereoscopic display comprising an optical valve apparatus for a second viewing position 342. FIG. 19C is a schematic diagram illustrating a front view of an observer tracking autostereoscopic display comprising an optical valve apparatus for a third viewing position 344. The embodiments of FIGS. 19A-19C do not comprise a superlens, and the output seen across the display area comprise voids 346, 348 with a width 350 at a maximum lateral position 344 of the pupil of observer 12. The voids are regions of the waveguide 1 that are not illuminated by light sources of the array 15 and are thus undesirable as they reduce the usable area of the waveguide 1 for off-axis positions, increasing bezel size. It would thus be desirable to reduce the visibility of voids 346, 348.

Figure 20A:
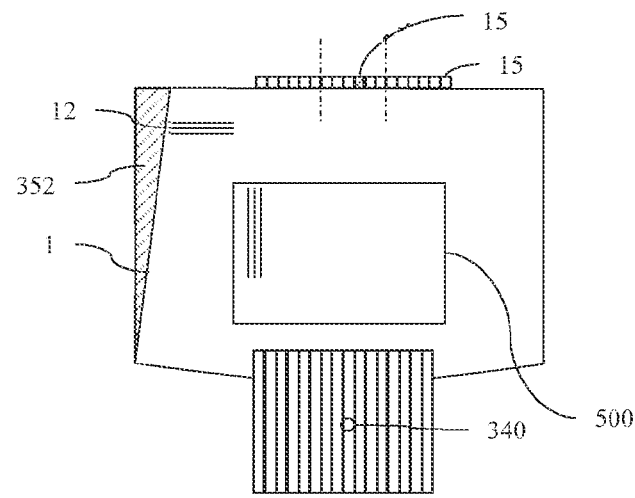
FIG. 20A is a schematic diagram illustrating a front view of an observer tracking autostereoscopic display comprising an optical valve apparatus and a superlens for a first viewing position, in accordance with the present disclosure.
Figure 20B:
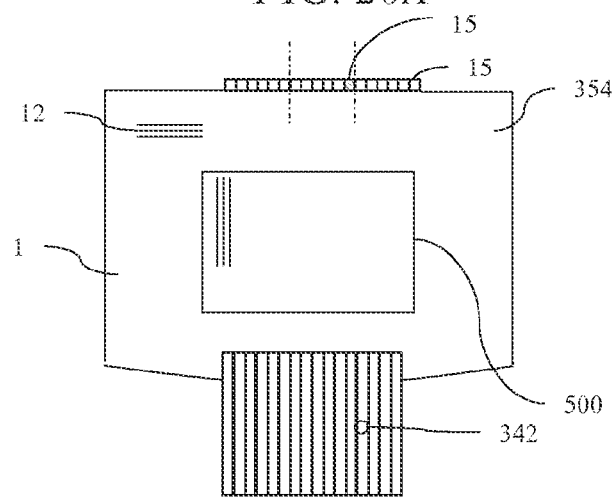
FIG. 20B is a schematic diagram illustrating a front view of an observer tracking autostereoscopic display comprising an optical valve apparatus and a superlens for a second viewing position, in accordance with the present disclosure.
Figure 20C:
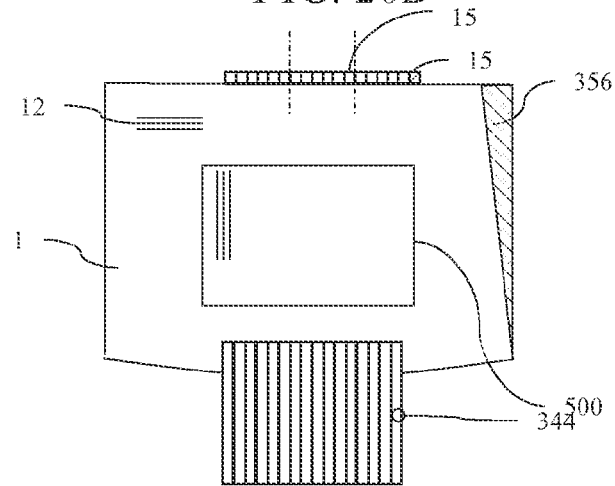
FIG. 20C is a schematic diagram illustrating a front view of an observer tracking autostereoscopic display comprising an optical valve apparatus and a superlens for a third viewing position, in accordance with the present disclosure.

FIG. 20A is a schematic diagram illustrating a front view of an observer tracking autostereoscopic display comprising an optical valve apparatus, and a superlens 500 for a first viewing position 340. FIG. 20B is a schematic diagram illustrating a front view of an observer tracking autostereoscopic display comprising an optical valve apparatus and a superlens for a second viewing position 342. FIG. 20C is a schematic diagram illustrating a front view of an observer tracking autostereoscopic display comprising an optical valve apparatus and a superlens 500 for a third viewing position 344. The superlens may be arranged so that axes 316, 317 are not coincident, so that for on-axis viewing the light comes from a different collimation direction within the waveguide 1. Such an arrangement biases the position and size of the void regions so that a small void 352 may be seen for the first central viewing position, no void 354 is seen for an off-axis viewing position (for example 65 mm off-axis) and a small void 356 is seen for higher off-axis positions (for example 130 mm off-axis). In this manner the total void size is reduced for a given off-axis movement and the bezel size may be reduced.

Figure 20D:
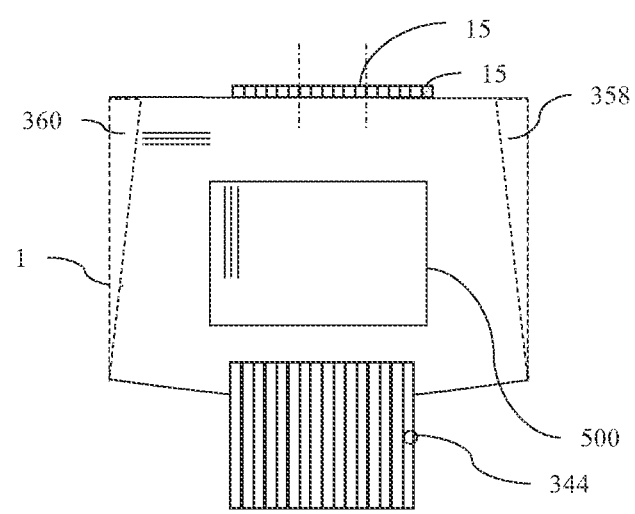
FIG. 20D is a schematic diagram illustrating a front view of an observer tracking autostereoscopic display comprising an optical valve apparatus and a superlens for a third viewing position, in accordance with the present disclosure.

FIG. 20D is a schematic diagram illustrating a front view of an observer tracking autostereoscopic display comprising an optical valve apparatus and a superlens for a third viewing position. As the superlens 500 creates multiple lobes, multiple collimation directions within the waveguide contribute to the final output intensity distribution. Thus in the viewing position 344 when region 358 may be a void for a single LED illumination, both regions 358 and 360 may be observed as partially void, with total intensity being a combination of the two illumination structures. In this manner, the total illumination uniformity of the display may be increased and visibility of void regions reduced, thus advantageously reducing bezel size and cost.

Figure 21:
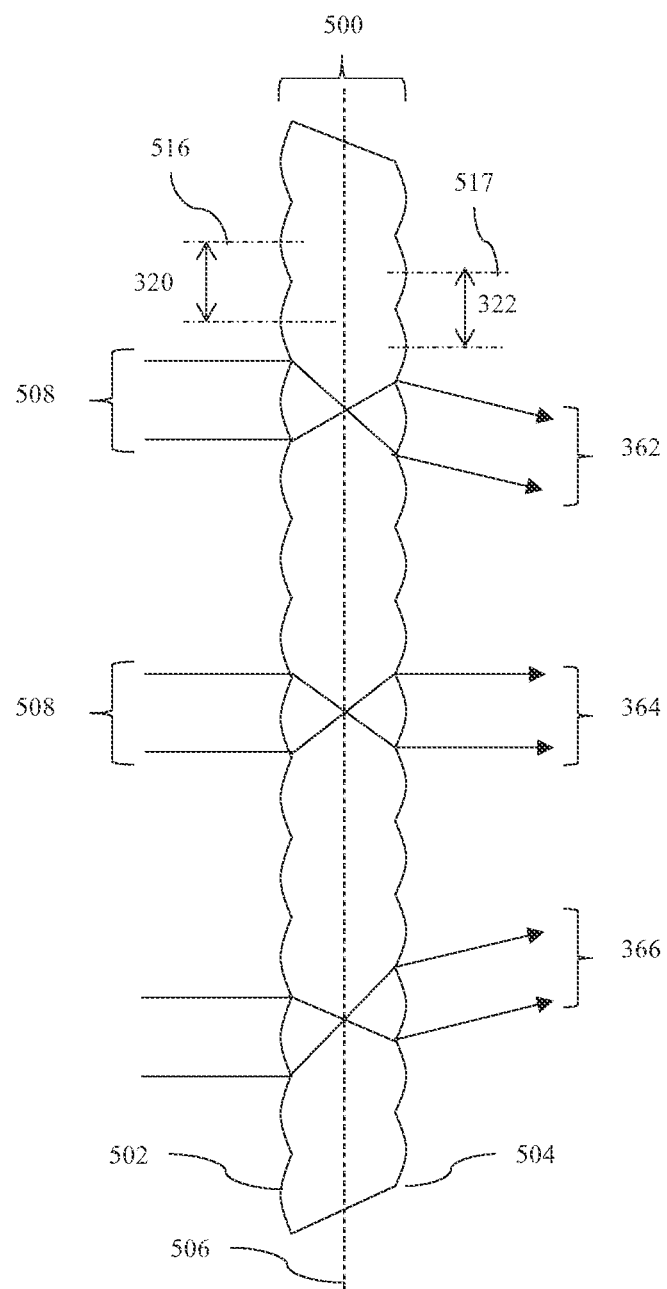
FIG. 21 is a schematic diagram illustrating a side view of a superlens, in accordance with the present disclosure.

FIG. 21 is a schematic diagram illustrating a side view of a superlens wherein the first and second arrays of lenses 502 and 504 have different pitches. Thus the pitch 320 of the first lens array 502 is greater than the pitch of the second lens array 504. Output beam directions 362, 364 and 366 are thus arranged to provide an effective focusing property across the width of the output aperture of the superlens 500. Advantageously the present embodiment can reduce or remove the requirement to incorporate the Fresnel lens 62 in order to achieve viewing windows 26 at the window plane, thus reducing thickness and cost.

Figure 22:
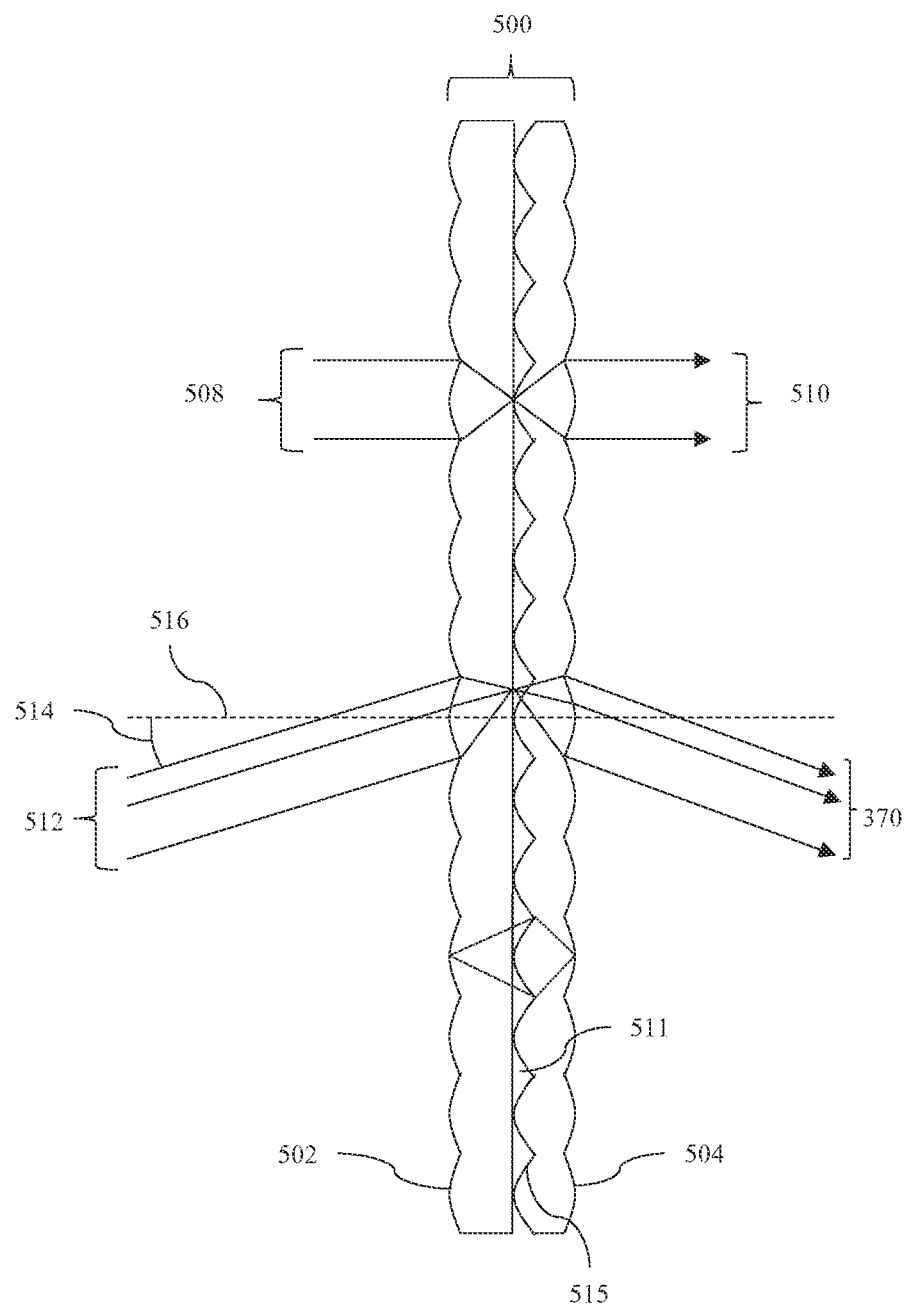
FIG. 22 is a schematic diagram illustrating a side view of a superlens, in accordance with the present disclosure.

FIG. 22 is a schematic diagram illustrating a side view of a superlens. Such a superlens may be arranged in a display device and further comprises a third lens array 515 disposed between the first and second lens arrays 502, 504. The lenses of the third lens array 515 each have a positive optical power in respective first meridians 310 and no optical power in respective second meridians 308 perpendicular to the first meridians. The third array of lenses 515 have the same pitch as the first and second arrays of lenses 502 and 504 and are arranged to image the apertures of the first array 502 of lenses onto the apertures of the second array 504 of lenses. Thus off-axis rays 512 are imaged by the lens array 515 arranged with an air gap 511 to the array 502 so that all rays are directed into beam 370. This has the effect that the third lens array 515 may redirect incident light beams 512 more fully into output beam 519. Advantageously this reduces light loss into side lobe beams. Advantageously the present embodiment can achieve a single output beam for a wide range of input angles 514. Such an arrangement can be used for a privacy display in which the LED pitch is modified compared to that provided by the waveguide 1 without the superlens 500 to reduce cost for example.

Figure 23A:
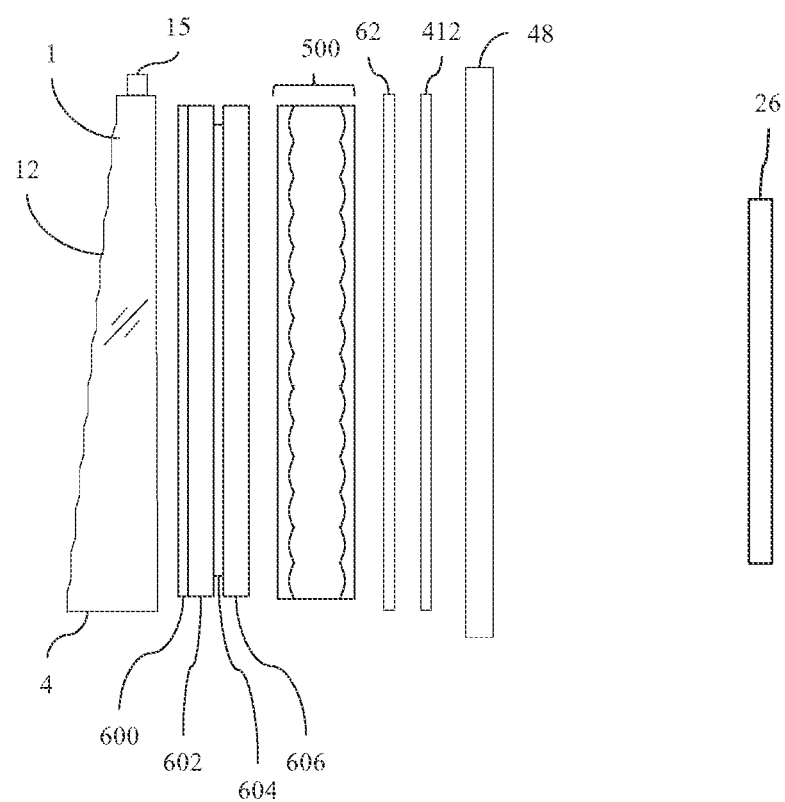
FIG. 23A is a schematic diagram illustrating a side view of an autostereoscopic display comprising an optical valve apparatus, a switchable superlens and transmissive spatial light modulator, in accordance with the present disclosure.

FIG. 23A is a schematic diagram illustrating a side view of an autostereoscopic display device comprising waveguide 1, a switchable superlens 500 and transmissive SLM 48. The superlens is a switchable birefringent lens array described in U.S. Pat. No. 7,059,252 which is incorporated herein by reference in its entirety. Light from array 15 is incident on a polarization switch element comprising linear polarizer 600, substrates 602, 606 and switchable liquid crystal layer 604. Thus the output of the waveguide 1 can be arranged with first and second polarization states 612, 618 that may be substantially linear polarization states. The polarized light is incident onto superlens 500 that will be described with reference to FIG. 23B.

Figure 23B:
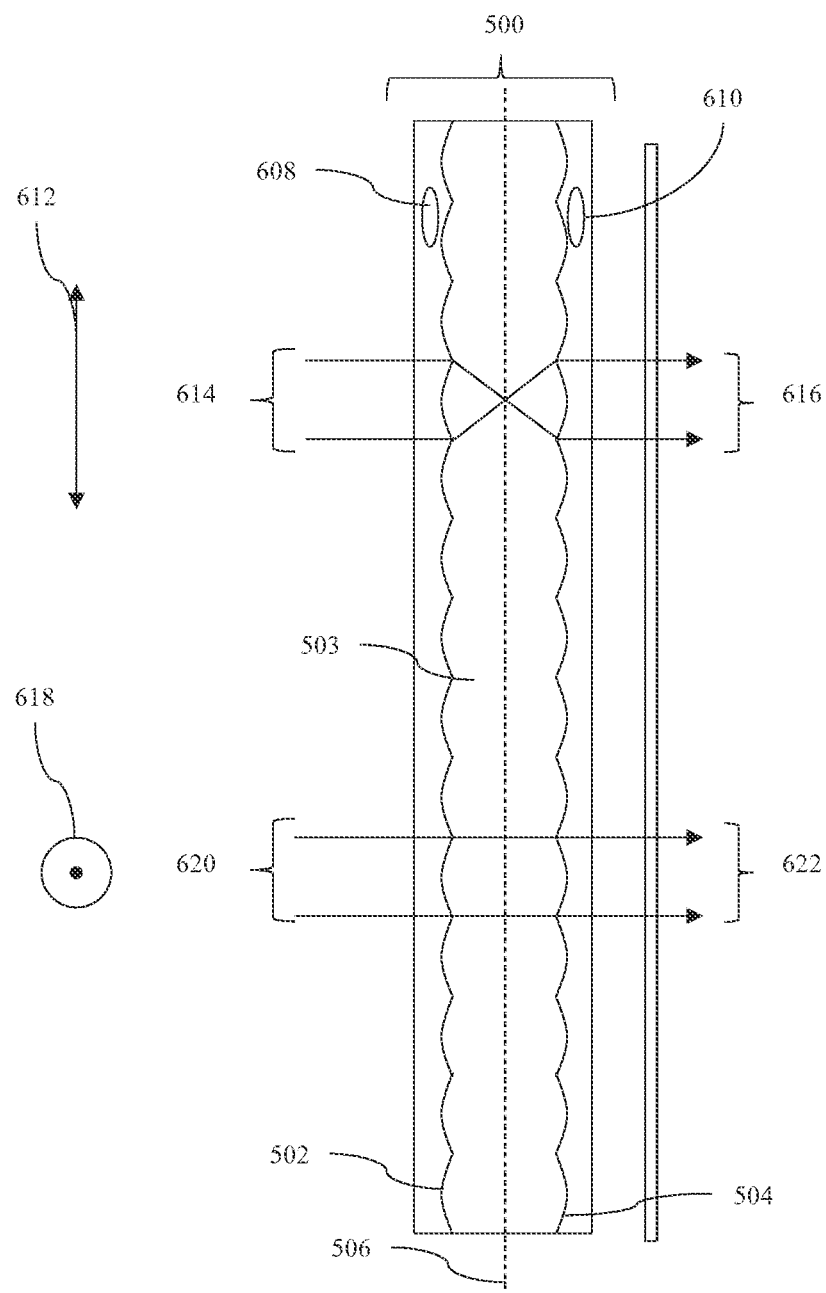
FIG. 23B is a schematic diagram illustrating a side view of a switchable superlens, in accordance with the present disclosure.

FIG. 23B is a schematic diagram illustrating a side view of a switchable superlens. The superlens 500 is an optical element that is switchable between a first state (for light of polarization state 612) in which the lenses of the first and second arrays 502, 504 have said positive optical power in first meridians 310 and a second state (for light of polarization state 618) in which the lenses of the first and second arrays 502, 504 have no optical power in said first meridians 310. Such lens arrays may be formed from an isotropic material 503 with a first refractive index. A liquid crystal layer 608, 610 such as liquid crystal polymer with first and second refractive indices may be formed on the surface of the arrays 502, 504. The directors of the liquid crystal material 608, 610 may aligned substantially parallel to the first meridian 310, for example by means of an alignment layer on the surface of the arrays 502, 504. The refractive index of the material 503 may be substantially the same as the ordinary refractive index of the liquid crystal material and different from the extraordinary refractive index. Light of polarization 612 thus sees an index step at the array 502 and a lens is present for the light rays 614, forming output beam 616 that has the properties of a superlens 500 as described elsewhere. Light of polarization 618 sees no index step at the array 502 and thus light beam 620 is undeflected by the superlens 500 to form beam 622 that has different directional properties to beam 616, particularly for off-axis illumination of the superlens 500. Thus advantageously a switchable superlens can be achieved.

Figure 24:
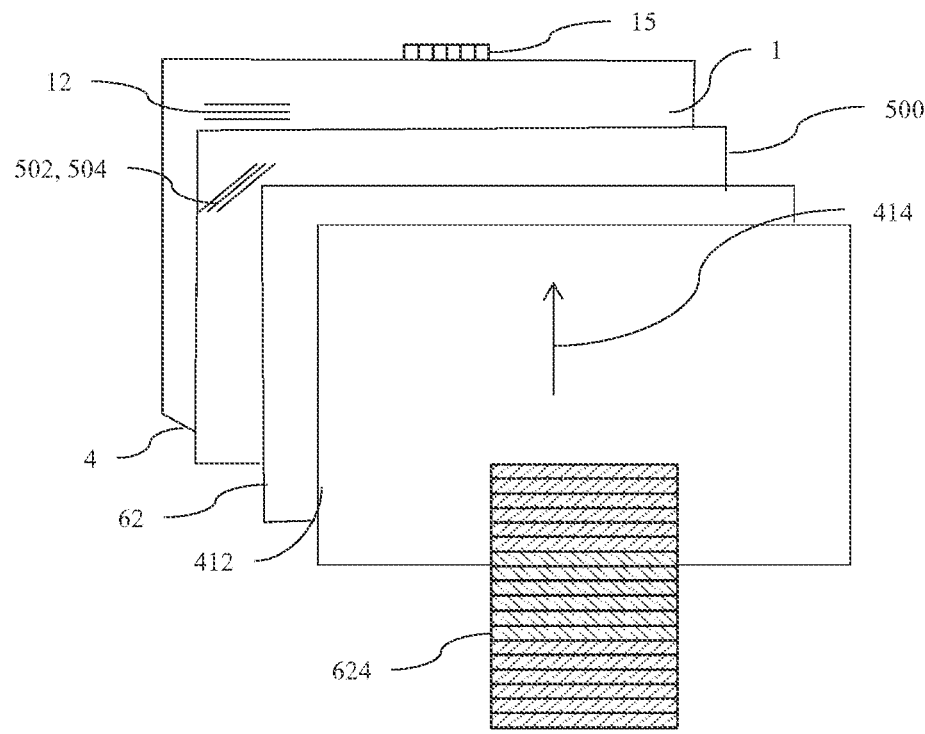
FIG. 24 is a schematic diagram illustrating a front view of an autostereoscopic display comprising an optical valve apparatus and a switchable superlens in a first mode of operation, in accordance with the present disclosure.
Figure 25:
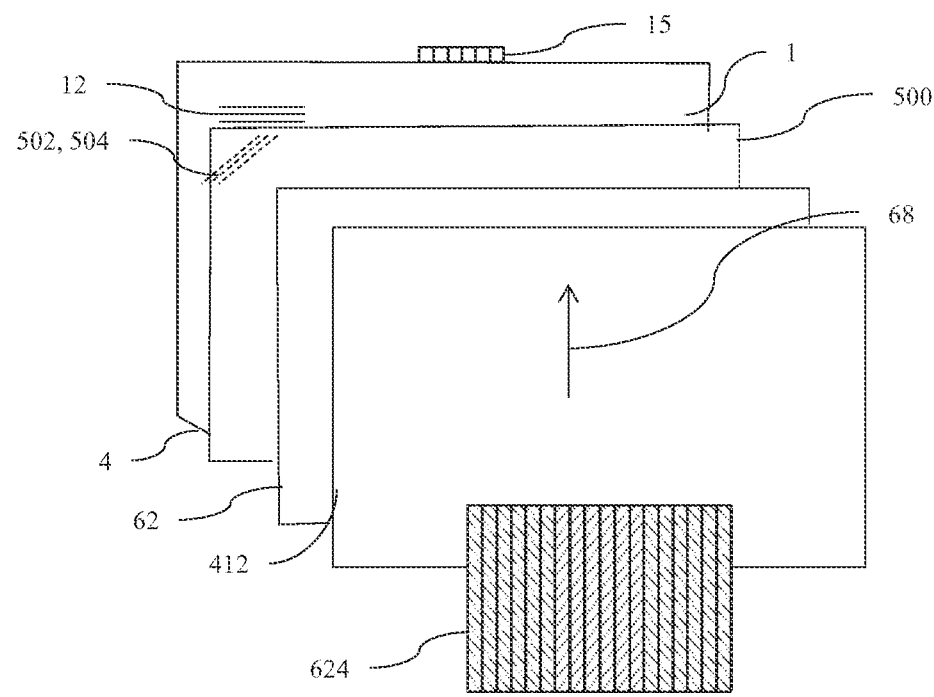
FIG. 25 is a schematic diagram illustrating a front view of an autostereoscopic display comprising an optical valve apparatus and a switchable superlens in a second mode of operation, in accordance with the present disclosure.

FIG. 24 is a schematic diagram illustrating a front view of an autostereoscopic display device comprising a waveguide 1 and a switchable superlens 500 in a first mode of operation. FIG. 25 is a schematic diagram illustrating a front view of the same autostereoscopic display comprising an optical valve apparatus, a switchable superlens in a second mode of operation. The polarization switching element described above with reference to FIGS. 23A and 23 B is present but for convenience of explanation is not shown in FIGS. 24 and 25.

Thus a display device may be arranged wherein the array of pixels of the spatial light modulator 48 are arranged in an aperture with a shape having two perpendicular axes of mirror symmetry. In this example, the superlens 500 is oriented so that the second meridians extend at a non-zero acute angle to the optical axis of the waveguide 1. This angle is selected to achieve the rotation of the viewing windows around the normal to the spatial light modulator so that the output viewing windows extend at an angle in a range from 65 to 115 degrees, more preferably 80 to 100 degrees or ideally 90 degrees relative to one of said axes of the shape of the aperture.

The display device is arranged so that, in the first state of the optical element (corresponding to illumination by polarization state 612 and shown by solid lines 502, 504), the viewing windows 624 are distributed across the one of said axes of mirror symmetry, and, in the second state of the optical element (corresponding to illumination by polarization state 618 and shown by dotted lines 502, 504), the optical element is arranged to rotate the viewing windows 624 around the normal to the spatial light modulator 48 so that the viewing windows 624 are distributed across the other one of said axes of mirror symmetry. For example, orienting the superlens at an angle of for example 45 degrees to the vertical can thus achieve a 90 degrees window rotation in the case that the first and second lens arrays 502 and 504 have the same focal lengths. Thus when the lenses are seen by the incident polarization state 612, the output windows can be arranged horizontally and when the lenses are seen by the incident polarization state 618 the windows are un-rotated and arranged vertically. In this manner a display that can be viewed in both landscape and portrait orientation can be achieved. Advantageously in both modes of operation the windows are vertical to increase the viewing freedom in the vertical direction without requiring the operation of head tracking.

In general, the superlens 500 may oriented so that the second meridians extend at a non-zero acute angle to the optical axis of the waveguide 1 selected to achieve the rotation of the viewing windows around the normal to the SLM 48 as follows.

Figure 26:
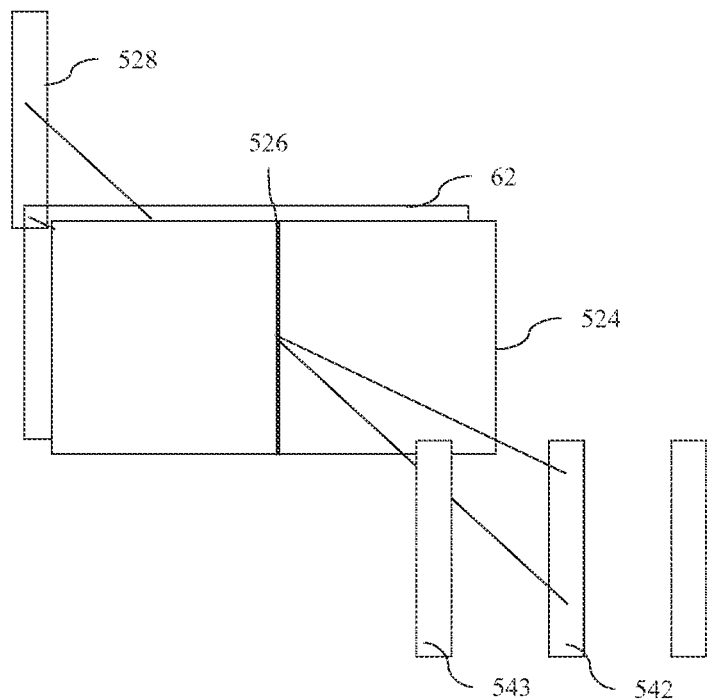
FIG. 26 is a schematic diagram illustrating a front view of an autostereoscopic display comprising a vertically oriented superlens and transmissive spatial light modulator, in accordance with the present disclosure.

FIG. 26 is a schematic diagram illustrating operation of a Gabor superlens 524 aligned with a Fresnel lens 62 and with axis parallel to a vertically extended light source 528. Such an arrangement is provided for explanation of rotated Gabor superlens operation. Thus the superlens 524 is provided with a light beam substantially collimated in a first (horizontal) direction. Thus superlens directs light into central viewing window 542 and some light will fall into side lobe viewing windows 543 due to the finite width of the source 528. The viewing windows are vertical (parallel to lens axes) as would be expected.

Figure 27:
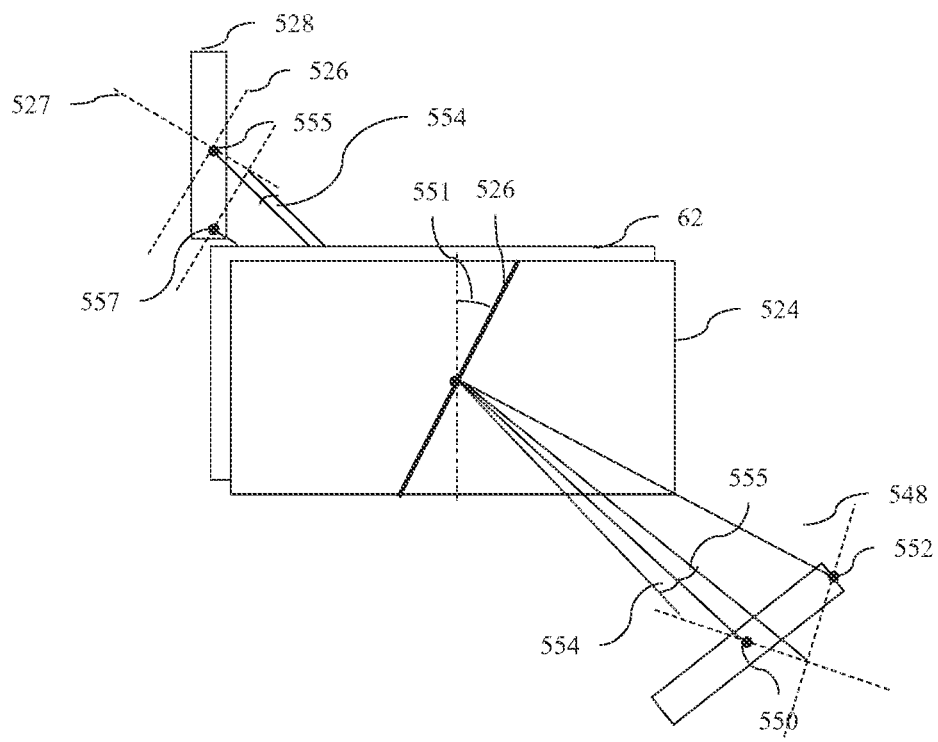
FIG. 27 is a schematic diagram illustrating a front view of an autostereoscopic display comprising an inclined orientation superlens and transmissive spatial light modulator, in accordance with the present disclosure.

FIG. 27 is a schematic diagram illustrating operation of a Gabor superlens 524 to rotate the viewing windows around the normal to the SLM 48 which is aligned with the optical axis of the Gabor superlens 524. The rotation is illustrated by considering two points 552 and 557 in the viewing window 528. In FIG. 27, the geometric axes (first meridians) of the lens arrays 502, 504 of the Gabor superlens 524 extend parallel to direction 526 that is inclined at an angle 551 (that may be 22.5 degrees if the focal lengths are equal) to the optical axis of the waveguide (vertical in FIG. 27). Point 555 at the illuminator is aligned with the optical axis of the Gabor superlens 524 and so is directed to point 550 in the window plane that is also aligned with the optical axis of the Gabor superlens 524 such that no lateral deflection takes place. Point 557 is vertically below the point 555 in the window, and so is inclined at a lateral angle 554 to the geometric axis (first meridian) of the Gabor superlens 524. Resolved in the direction 526 parallel to the geometric axis (first meridian), there is no deflection of the point 557 because the Gabor superlens 524 has no optical power in that direction. Resolved in the direction 527 parallel to the second meridian, there is a deflection of the point 557 by twice the lateral angle 554. This is equivalent to deflection shown in FIG. 16B of the off-axis light beam 512 by twice the angle 514 relative to the optical axis 516 of the Gabor superlens 524. Thus, the lateral deflection is twice the angle 554. Further, the Fresnel lens 62 flips the vertical orientation of the lens so that the point 557 is imaged to the point 552. Thus the total lateral deflection of the point 557 is twice the tilt angle 551 of the lens in this example where the lens arrays of the Gabor superlens 524 have equal focal lengths. As can be seen from FIG. 27, the point 552 is rotated around the optical axis of the Gabor superlens 524 and hence also around the normal to the SLM 48. Similar rotation occurs for every point in the viewing window 528 with the result that the viewing window 528 as a whole is rotated. If the focal length of the arrays 502, 504 is different, the rotation angle of the window 528 will be different to twice the angle 551.

Thus a display device may be arranged with a superlens wherein the lenses of each array have parallel first meridians that extend at a non-zero-acute angle to the optical axis of waveguide. The array of pixels of the spatial light modulator 48 may be arranged in an aperture with a shape having two perpendicular axes of mirror symmetry, and the optical element comprising a superlens 500 is arranged to rotate the viewing windows 624 around the normal 9 to the spatial light modulator 48, and the output viewing windows 624 extend at any angle between 0 and 90 degrees, preferably an angle in a range from 65 to 115 degrees, more preferably 80 to 100 degrees or most preferably 90 degrees relative to one of said axes of the shape of the aperture. Such a rotation can be achieved for example by arranging a superlens with a meridian axis 310 arranged at 45 degrees to the optical axis of waveguide 1.

Figure 28:
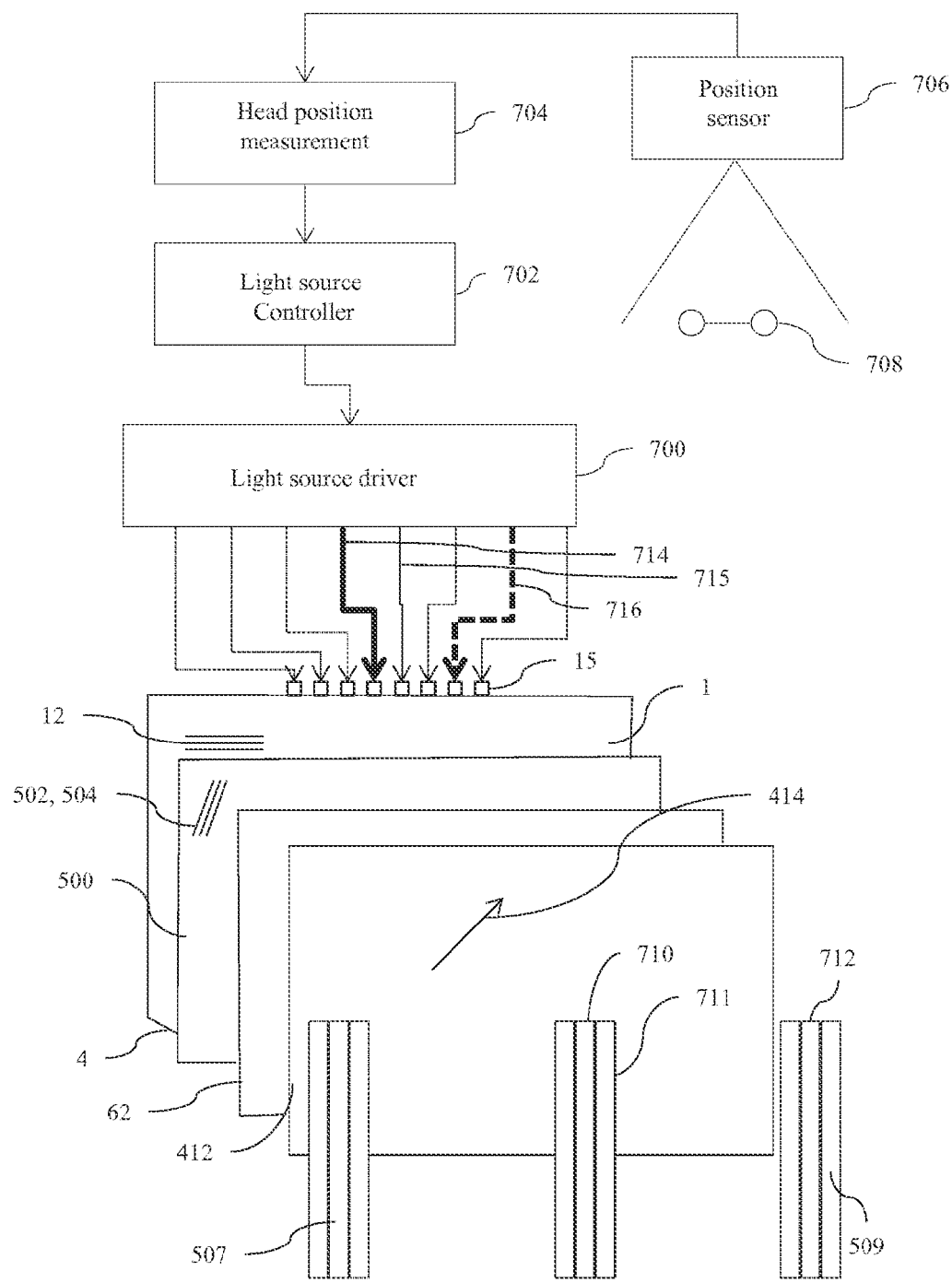
FIG. 28 is a schematic diagram illustrating a front view of an autostereoscopic display comprising a control system arranged to address an autostereoscopic display with light in multiple viewing lobes, in accordance with the present disclosure.

FIG. 28 is a schematic diagram illustrating a control system arranged to compensate for vignetting effects in an autostereoscopic display comprising a Gabor superlens 500. This control system is a modified form of the control system shown in FIG. 11 and described above. Accordingly, except for the modifications, the above description applies and for brevity is not repeated.

Observer 708 is observed by sensor 706 such as a camera and head position is determined by system 704 such as an image processing system. Light source controller 702 determines which light source to drive and instructs a light source array 15 driver 700 accordingly.

Figure 29:
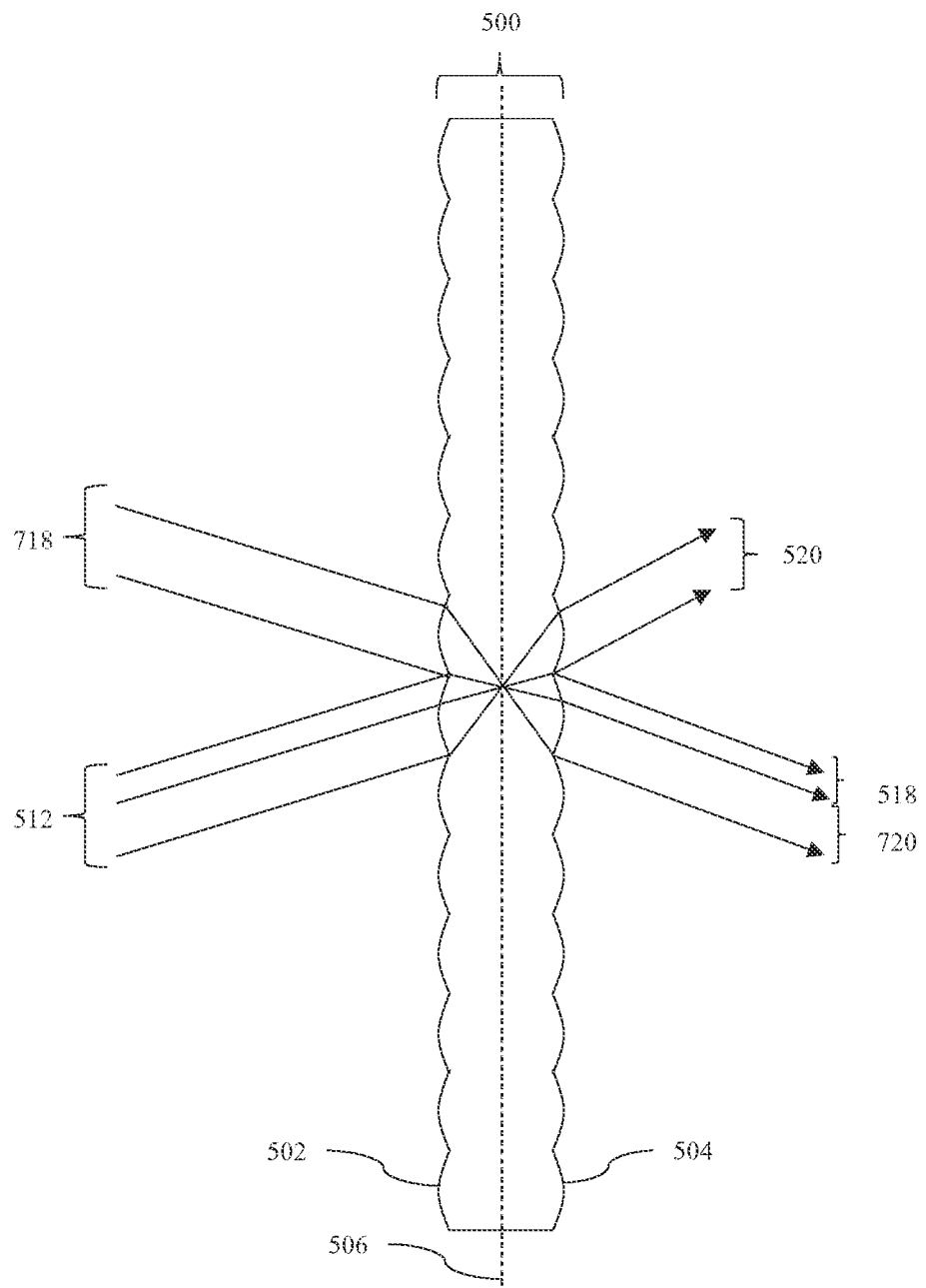
FIG. 29 is a schematic diagram illustrating a side view of a superlens with light in multiple viewing lobes, in accordance with the present disclosure.

FIG. 29 is a schematic diagram illustrating operation of an off-axis compensation light source arranged to compensate for vignetting effects in an autostereoscopic display comprising a Gabor superlens 500.

In operation for on-axis light, a single drive line 714 is operated to operate a given light source providing a given adjacent viewing window 711, however the splitting causes light also to be directed into another viewing window and so the intensity of the given viewing window is reduced by vignetting. The intensity of the display can be compensated by reducing the power on drive line 714 however that may achieve reduced display brightness. Instead, the following control operation is performed to operate a further, separated light source to direct compensatory light into the given viewing window. In particular, there is operated the drive line 716 to operate a further, separated light source that directs light primarily into a high angle lobe window 712, but also has a side lobe corresponding to the given viewing window 710 that can be used to increase intensity in that window 710 as illustrated in FIG. 29. Thus beam 512 achieves output cone 518 in the desired direction and unwanted light into cone 520. However, if the superlens 500 is illuminated by light beam 718 then output beam 720 is generated in the same direction as beam 518. Thus by driving line 716 the intensity loss of the main central lobe can be increased. Further the technique can be used to increase the lateral viewing freedom of the display with a reduced number of light sources, reducing cost and complexity.

Thus a display apparatus may further comprise a control system that is arranged to control the light sources of array 15 so that, when light is directed from a given light source into a given viewing window, in the event that the light from the given light source is directed into a viewing window other than the given viewing window by splitting through different lenses of the second array 504, a further, separated light source is operated to direct compensatory light into the given viewing window.

In a further embodiment a superlens 500 may be arranged with the dual view apparatus of FIG. 8. Such an arrangement may advantageously be provided to achieve at least first and second viewing positions from a single light source. In particular, the control system is arranged to control to direct the same displayed image into viewing windows in the first and second viewing positions from a single light source.

Figure 30:
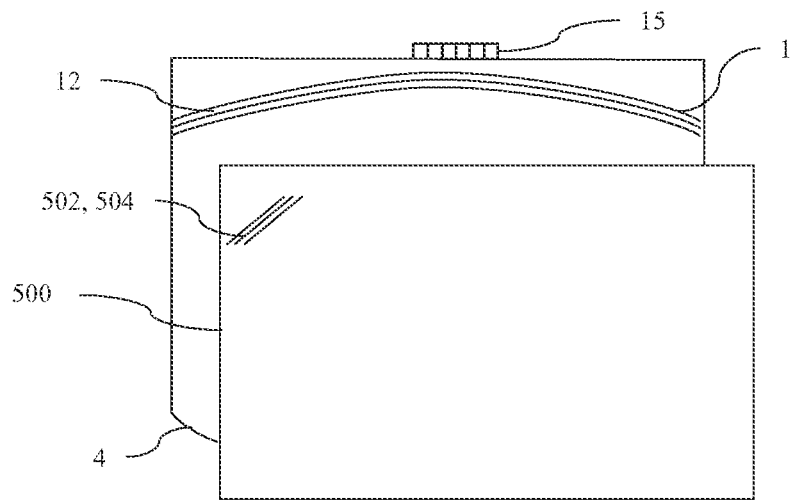
FIG. 30 is a schematic diagram illustrating a front view of an autostereoscopic display comprising an optical valve apparatus comprising curved light extraction features and a superlens, in accordance with the present disclosure.
Figure 31:
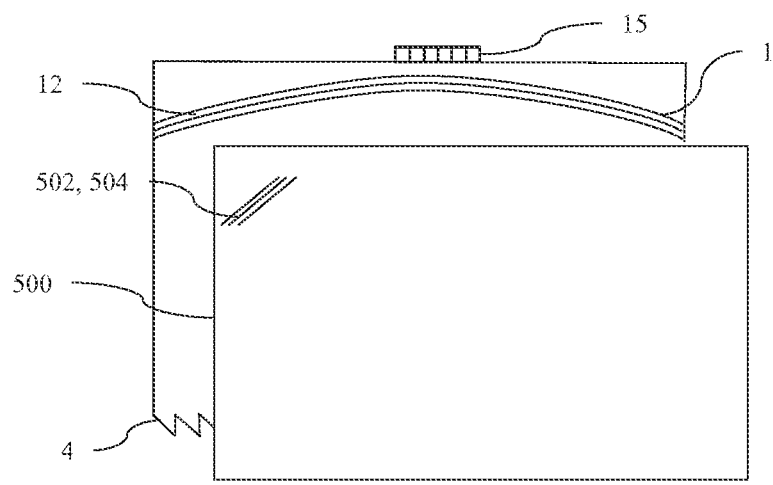
FIG. 31 is a schematic diagram illustrating a front view of an autostereoscopic display comprising an optical valve apparatus comprising curved light extraction features and a Fresnel mirror; and a superlens, in accordance with the present disclosure.

FIG. 30 is a schematic diagram illustrating a front view of an autostereoscopic display comprising an optical valve apparatus comprising curved light extraction features 12 and a superlens 500 and FIG. 31 shows an embodiment wherein the reflective end 4 comprises a Fresnel mirror with a similar optical function to the side 4 in FIG. 30 but with reduced size. Thus a light valve for guiding light, comprises a first light guiding surface, wherein the first light guiding surface is substantially planar; and a second light guiding surface, opposite the first light guiding surface, further comprising a plurality of guiding features and a plurality of elongate extraction features that are curved along the direction in which they are elongated, wherein the extraction features and the guiding features are connected to and alternate with one another respectively, further wherein the plurality of extraction features allow light to pass substantially without loss when the light is propagating in a first direction and allow light to reflect or refract, and exit the light valve when the light is propagating in a second direction. The curved extraction features are arranged to achieve viewing windows in cooperation with the concave curved end 4 as described previously.

The superlens 500 may be arranged to rotate the viewing windows to provide landscape and portrait operation as described previously. Advantageously the complexity and thickness of the device may be reduced.

The light valve may comprise a first end at which light may enter the light valve and propagate in said first direction, and a second end that is a reflective surface arranged to redirect light propagating in said first direction to propagate in said second direction back toward the first end. The first end may be thinner than the second end. The second end may be a concave, curved reflective surface, a Fresnel equivalent of a concave, curved reflective surface, or a reflective surface with no optical power. The second light guiding surface may have a stepped structure which may include the plurality of extraction features that are curved along the direction in which they are elongated, and the plurality of guiding features connecting respective extraction features. The extraction features may allow light to exit the light valve through the first light guiding surface. The light valve may be arranged to direct light entering the light valve from illumination elements into viewing windows. The extraction features may be arranged to substantially focus the principal rays of the optical system onto a viewing plane. The curvature of the extraction features may have a direction that is opposite to the direction of curvature of the reflective end 4.

An optical valve system may comprise a light valve according to any one of the preceding claims and further comprising a plurality of illumination elements configured to provide light into the light valve and may further comprise a Fresnel lens arranged to receive light from the light valve. A diffuser may be arranged to receive light from the light valve. The diffuser may comprise a vertical diffuser comprising an asymmetric scattering surface. Superlens 500 may further be arranged with the optical valve system to achieve further control of viewing window 26 structure.

A directional display may comprise an optical valve system, a superlens; and a transmissive spatial light modulator arranged to be illuminated by the optical valve system.

An observer tracking display, may comprise a directional display; a sensor for detecting a position of an observer in the proximity of viewing windows of the optical valve; a superlens array and an illuminator controller for determining a setting for illumination elements depending on the position of the observer detected by the sensor.

An observer tracking display may be an observer tracking autostereoscopic display wherein the setting determines a first illumination phase for a first set of illumination elements corresponding to a first viewing window, and the setting determines a second illumination phase for a second set of illumination elements corresponding to a second viewing window. The first and second arrays of lenses may be curved along the direction in which they are elongated.

Figure 32:
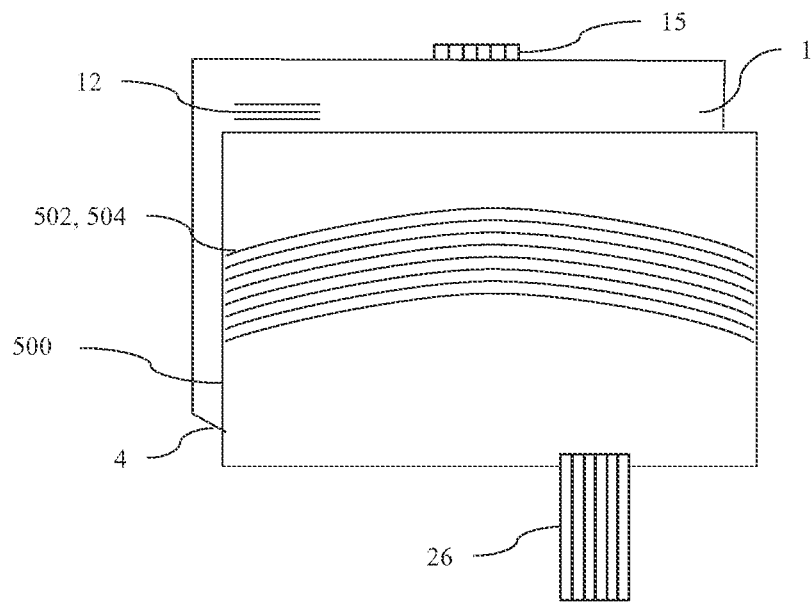
FIG. 32 is a schematic diagram illustrating a front view of an autostereoscopic display comprising an optical valve apparatus comprising linear light extraction features; and a superlens comprising curved lenses, in accordance with the present disclosure.

FIG. 32 is a schematic diagram illustrating a front view of an autostereoscopic display comprising an optical valve apparatus comprising linear light extraction features 12; and a superlens 500 comprising curved lenses 502, 504 that are curved along the direction in which they are elongated. The lenses 502, 504 may be arranged to achieve focussing of the light from the array 15 to viewing windows 26 in the window plane. Advantageously the complexity of the device may be reduced, and cost reduced.

Figure 33:
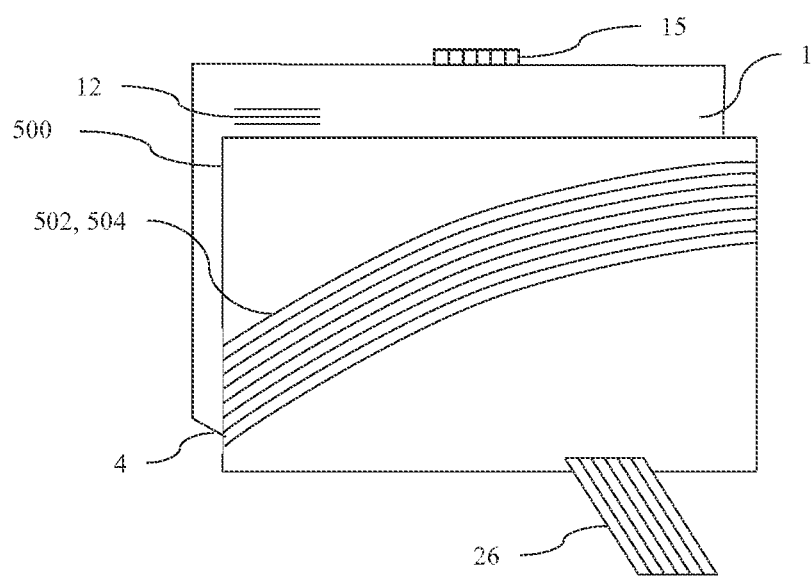
FIG. 33 is a schematic diagram illustrating a front view of an autostereoscopic display comprising an optical valve apparatus comprising linear light extraction features; and a superlens comprising curved tilted lenses, in accordance with the present disclosure.

FIG. 33 is a schematic diagram illustrating a front view of an autostereoscopic display comprising an optical valve apparatus comprising linear light extraction features; and a superlens comprising curved tilted lenses. The curved tilted lenses 502, 504 may provide both focussing to the window plane and rotation of windows in the window plane advantageously for L-P operation.

Figure 34:
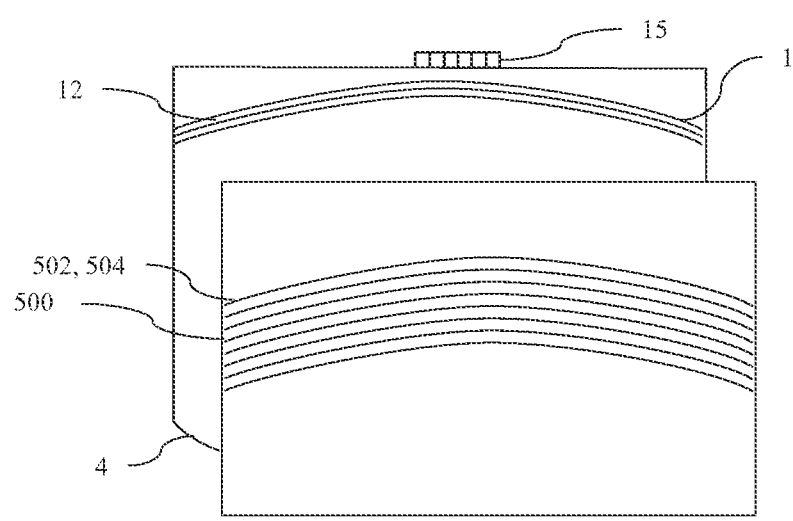
FIG. 34 is a schematic diagram illustrating a front view of an autostereoscopic display comprising an optical valve apparatus comprising curved light extraction features; and a superlens comprising curved lenses, in accordance with the present disclosure.

FIG. 34 is a schematic diagram illustrating a front view of an autostereoscopic display comprising an optical valve apparatus comprising curved light extraction features; and a superlens comprising curved lenses. The curved light extraction features 12 and superlens 500 may cooperate to achieve focussing into the window plane which may improve the aberrational performance of the optical system.

In the above embodiments, the display may be used for autostereoscopic display or other directional display such as privacy operation, or low power operation or high illuminance operation. The latter modes may provide autostereoscopic functions or 2D functions. Low power consumption devices and high illuminance devices are generally described in U.S. Provisional Patent Application No. 61/890,456, entitled "Energy efficient directional backlight," filed Oct. 14, 2013, which is herein incorporated by reference in its entirety. In operation such devices may be provided with viewing windows that are horizontal, vertical or tilted orientations with respect to the orientation of the aperture of the respective spatial light modulator.

It is understood that in the above embodiments that a full directional backlighting system may include additional Fresnel and diffusing elements.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A display device, comprising:
a transmissive spatial light modulator comprising an array of pixels arranged to modulate light passing therethrough;
a waveguide having an input end, and first and second opposed guide surfaces for guiding light along the waveguide, the first and second opposed guide surfaces extending from the input end across the spatial light modulator, wherein the waveguide is arranged to output light through the first guide surface for supply through the spatial light modulator, the waveguide being arranged to direct input light from different input positions across the input end in output directions relative to the normal to the first guide surface that are dependent on said input position; and
an optical element disposed between the waveguide and the spatial light modulator, comprising first and second arrays of lenses, the lenses each having a positive optical power in respective first meridians and no optical power in respective second meridians perpendicular to the first meridians, the first and second arrays of lenses being arranged with respective focal planes that extend perpendicular to the normal to the spatial light modulator between the first and second arrays of lenses, the lenses of each array having parallel second meridians.

2. A display device according to claim 1, wherein the first and second arrays of lenses are arranged with respective focal planes that are coincident.

3. A display device according to claim 1, wherein the first and second arrays of lenses are arranged with respective focal planes that are offset.

4. A display device according to claim 1, wherein the focal length of the lenses of the first array of lenses arranged to receive light from the waveguide is greater than the focal length of the lenses of the second array.

5. A display device according to claim 1, wherein the first and second arrays of lenses have the same pitch.

6. A display device according to claim 5, wherein the first and second arrays of lenses have optical axes that are aligned.

7. A display device according to claim 5, wherein the first and second arrays of lenses have optical axes that are offset.

8. A display device according to claim 1, wherein the first and second arrays of lenses have different pitches.

9. A display device according to claim 1, further comprising a third array of lenses, the lenses each having a positive optical power in respective first meridians and no optical power in respective second meridians perpendicular to the first meridians, the third array of lenses having the same pitch as the first and second arrays of lenses and being disposed between the first and second arrays of lenses, and arranged to image the apertures of the first array of lenses onto the apertures of the second array of lenses.

10. A display device according to claim 1, wherein the optical element is switchable between a first state in which the lenses of the first and second arrays have said positive optical power in said first meridians and a second state in which the lenses of the first and second arrays have no optical power in said first meridians.

11. A display device according to claim 10, wherein the array of pixels are arranged in an aperture with a shape having two perpendicular axes of mirror symmetry, and the display device is arranged so that, in the first state of the optical element, the viewing windows are distributed across the one of said axes of mirror symmetry, and, in the second state of the optical element, the optical element is arranged to rotate the viewing windows around the normal to the spatial light modulator so that the viewing windows are distributed across the other one of said axes of mirror symmetry.

12. A display device according to claim 1, wherein the lenses of each array have second meridians that extend parallel to the optical axis of the waveguide.

13. A display device according to claim 1, wherein the lenses of each array having parallel second meridians that extend at a non-zero-acute angle to the optical axis of the waveguide.

14. A display device according to claim 13, wherein the array of pixels are arranged in an aperture with a shape having two perpendicular axes of mirror symmetry, and the optical element is arranged to rotate the viewing windows around the normal to the spatial light modulator; and the output viewing, windows extend at an angle in a range from 65 to 115 degrees, 80 to 100 degrees or 90 degrees relative to one of said axes of the shape of the aperture.

15. A display device according to claim 1, wherein the first and second arrays of lenses are formed by a common piece of material within which the respective focal planes are disposed.

16. A display device according to claim 1, wherein the first guide surface is arranged to guide light by total internal reflection and the second guide surface has a plurality of light extraction features inclined to reflect light guided through the waveguide in directions allowing exit through the first guide surface of the output light.

17. A display device according to claim 16, wherein the second guide surface has intermediate regions between the light extraction features that are arranged to direct light through the waveguide without extracting it.

18. A display device according to claim 17, wherein the intermediate regions of the second guide surface extend parallel to the first guide surface.

19. A display device according to claim 17, wherein the light extraction features are reflective facets extending laterally to the intermediate regions and the second guide surface has a stepped shape with reflective facets and the intermediate regions.

20. A display device according to claim 16, wherein the extraction features of the waveguide are curved along the direction in which they are elongated.

21. A display device according to claim 1, wherein the first guide surface is arranged to guide light by total internal reflection and the second guide surface is substantially planar and inclined at an angle to reflect light in directions that break the total internal reflection for outputting light through the first guide surface,
the display device further comprising a deflection element extending across the first guide surface of the waveguide for deflecting light towards the normal to the spatial light modulator.

22. A display device according to claim 1, wherein the waveguide has a reflective end facing the input end for reflecting light input through the input end back through the waveguide, the waveguide being arranged to output light through the first guide surface after reflection from the reflective end.

23. A display device according to claim 1, further comprising:
an array of light sources at different input positions across the input end of the waveguide; and
a control system arranged to selectively operate the light sources to direct light into viewing windows corresponding to said output directions.

24. A display device according to claim 1, wherein the first and second arrays of lenses are curved along the direction in which they are elongated.

25. A display apparatus, comprising:
a transmissive spatial light modulator comprising an array of pixels arranged to modulate light passing therethrough;
a waveguide having an input end, and first and second opposed guide surfaces for guiding, light along the waveguide, the first and second opposed guide surfaces extending from the input end across the spatial light modulator, wherein the waveguide is arranged to output light through the first guide surface for supply through the spatial light modulator, the waveguide being arranged to direct input light from different input positions across the input end in output directions relative to the normal to the first guide surface that are dependent on said input position;
an optical element disposed between the waveguide and the spatial light modulator, comprising, first and second arrays of lenses, the lenses each having a positive optical power in respective first meridians and no optical power in respective second meridians perpendicular to the first meridians, the first and second arrays of lenses being arranged with respective focal planes that extend perpendicular to the normal to the spatial light modulator between the first and second arrays of lenses, the lenses of each array having parallel second meridians;
an array of light sources at different input positions across the input end of the waveguide; and
a control system arranged to selectively operate the light sources to direct light into viewing windows corresponding to said output directions;
wherein the control system is arranged to control the light sources so that, when light is directed from a given light source into a given viewing window, in the event that the light from the given light source is directed into a viewing window other than the given viewing window by splitting through different lenses of the second array, a further, separated light source is operated to direct compensatory light into the given viewing window.

26. A display apparatus according to claim 25, the display apparatus being an autostereoscopic display apparatus wherein the control system is further arranged to control the display apparatus to display temporally multiplexed left and right images and synchronously to direct the displayed images into viewing windows in positions corresponding to left and right eyes of an observer.

27. A display apparatus according to claim 26, wherein the control system further comprises a sensor system arranged to detect the position of an observer across the display apparatus, and
the control system is arranged to direct the displayed images into viewing windows in positions corresponding to left and right eyes of an observer, in dependence on the detected position of the observer.

28. A display apparatus according to claim 25, the display apparatus being, a dual view display apparatus, wherein the control system is arranged to direct the same displayed image into viewing windows in at least first and second viewing positions.

* * * * *